(12) United States Patent
Smith et al.

(10) Patent No.: US 11,535,207 B2
(45) Date of Patent: Dec. 27, 2022

(54) COMPRESSED-GAS DISTRIBUTION ASSOCIATED WITH VEHICLE

(71) Applicant: Change Energy Services, Oakville (CA)

(72) Inventors: Gordon Rymal Smith, Oakville (CA); Allan Wallace Davidson, Collingwood (CA)

(73) Assignee: Change Energy Services, Oakville (CA)

( * ) Notice: Subject to any disclaimer, the term of this patent is extended or adjusted under 35 U.S.C. 154(b) by 855 days.

(21) Appl. No.: 16/199,155

(22) Filed: Nov. 24, 2018

(65) Prior Publication Data

US 2020/0164840 A1    May 28, 2020

(51) Int. Cl.
*F17C 5/00* (2006.01)
*B60S 5/02* (2006.01)
(Continued)

(52) U.S. Cl.
CPC .............. *B60S 5/02* (2013.01); *F17C 5/007* (2013.01); *F17C 9/02* (2013.01); *F17C 5/06* (2013.01);
(Continued)

(58) Field of Classification Search
CPC .... B60S 5/02; F17C 5/007; F17C 5/06; F17C 9/02; F17C 11/007; F17C 2205/0111;
(Continued)

(56) References Cited

U.S. PATENT DOCUMENTS 2,367,285 A    1/1945  Brandt
5,400,253 A *  3/1995  O'Connor .............. G07F 9/002
                                                     705/413
(Continued)

FOREIGN PATENT DOCUMENTS

CN         202865194         4/2013
CN         203176713         9/2013
(Continued)

OTHER PUBLICATIONS

"Alternative Fuel: CNG LNG & LPG Vehicle and Fueling System Solutions", Parker Hannifin Corporation, https://www.parker.com/literature/Parflex/B-Parflex%20PDF%20and%20Images/Parker_CNG_FINAL_Single-lr.pdf, published Sep. 2017, retrieved Nov. 23, 2017.
(Continued)

*Primary Examiner* — Nicolas A Arnett
(74) *Attorney, Agent, or Firm* — Forsgren Fisher; James M. Urzedowski; Daniel A. Tysver

(57) ABSTRACT

A fluid-distribution assembly has controllable components. The fluid-distribution assembly also has a vehicle-fuelling connection configured to be selectively connectable to a first compressed-natural-gas tank of a first compressed-natural-gas-powered vehicle. The fluid-distribution assembly also has a fuel-storage connection configured to be selectively connectable to a fuel storage assembly. The fluid-distribution assembly is configured to be electrically connected to a controller assembly. The controller assembly is configured to monitor and control operations of the controllable components of the fluid-distribution assembly. The controllable components of the fluid-distribution assembly are configured to selectively distribute, under control by way of the controller assembly, a fluid flow of a compressed natural gas
(Continued)

between the first compressed-natural-gas tank and the fuel storage assembly.

17 Claims, 33 Drawing Sheets

(51) Int. Cl.
*F17C 9/02* (2006.01)
*F17C 11/00* (2006.01)
*F17C 5/06* (2006.01)
*F25J 1/00* (2006.01)

(52) U.S. Cl.
CPC ..... *F17C 11/007* (2013.01); *F17C 2205/0111* (2013.01); *F17C 2205/0335* (2013.01); *F17C 2221/033* (2013.01); *F17C 2223/0123* (2013.01); *F17C 2225/0123* (2013.01); *F17C 2250/0636* (2013.01); *F17C 2265/065* (2013.01); *F17C 2270/0139* (2013.01); *F25J 1/0022* (2013.01)

(58) Field of Classification Search
CPC ...... F17C 2205/0335; F17C 2205/0142; F17C 2205/0176; F17C 2221/033; F17C 2221/035; F17C 2223/0123; F17C 2223/0153; F17C 2223/033; F17C 2223/036; F17C 2225/0123; F17C 2225/0153; F17C 2225/033; F17C 2225/036; F17C 2250/0636; F17C 2250/0452; F17C 2265/065; F17C 2270/0139; F25J 1/0022
See application file for complete search history.

(56) References Cited

U.S. PATENT DOCUMENTS

| | | | |
|---|---|---|---|
| 5,694,985 A | | 12/1997 | Diggins |
| 5,810,058 A * | | 9/1998 | Kountz ..................... F17C 5/06 141/2 |
| 6,763,680 B2 | | 7/2004 | Fischer et al. |
| 6,786,245 B1 * | | 9/2004 | Eichelberger ............ F17C 5/06 141/2 |
| 8,151,834 B2 * | | 4/2012 | Kurita ....................... B60S 5/02 141/105 |
| 8,662,115 B2 * | | 3/2014 | Mori ......................... F17C 5/06 141/2 |
| 9,046,218 B2 * | | 6/2015 | Macaluso ................. F17C 5/06 |
| 9,182,080 B2 | | 11/2015 | Morris et al. |
| 9,649,590 B2 | | 5/2017 | Albright et al. |
| 9,708,235 B2 | | 7/2017 | Khurram et al. |
| 9,765,933 B2 * | | 9/2017 | Lambrix .................. F17C 5/007 |
| 10,400,954 B2 * | | 9/2019 | Okuno ...................... F17C 5/06 |
| 10,718,468 B2 * | | 7/2020 | Petit ......................... F17C 7/00 |
| 10,753,539 B2 * | | 8/2020 | Allidieres ................. F17C 5/06 |
| 2006/0118175 A1 * | | 6/2006 | Mathison .................. F17C 5/04 137/256 |
| 2016/0069124 A1 | | 3/2016 | Mendoza et al. |
| 2016/0097363 A1 * | | 4/2016 | Murray, Sr. .............. F17C 5/02 137/13 |
| 2018/0259127 A1 * | | 9/2018 | Manousiouthakis ..... F17C 5/02 |

FOREIGN PATENT DOCUMENTS

| | | |
|---|---|---|
| CN | 204127653 | 1/2015 |
| CN | 105299442 | 2/2016 |

OTHER PUBLICATIONS

"CNG Feasibility Study Facility and Fleet Conversion", The Kansas City Area Transportation Authority, http://www.kcata.org/documents/uploads/CNGFeasibility_Study5.11_.2012_.pdf, published May 2012, retrieved Nov. 23, 2017.

"Defueling NGVS Ensuring Safety", Winkelmann Flowform Technology, http://cng.us.com/wp-content/uploads/2015/09/Defueling-NGVs-Safely.pdf, published Sep. 2015, retrieved Nov. 23, 2017.

"Gaseous Fuel Vehicle Procurement Best Practices Guide", National Association of Regional Councils, https://static1.squarespace.com/static/57a0a284d2b857f883096ab0/V58594bd9c534a5dba5fe012a/1482247132192/Gaseous+Fuel+Vehicle+Procurement+Best+Practices+Guide.pdf, published 2016, retrieved Nov. 23, 2017.

"Permitting CNG and LNG Stations Best Practices Guide for Host Sites and Local Permitting Authorities", Clean Fuel Connection, Inc. http://www.baaqmd.gov/~/media/files/strategic-incentives/alt-fuels/cng-and-lng-best-practices-9-30-14-final.pdf, published Sep. 30, 2014, retrieved Nov. 23, 2017.

Davidson, et al., "Technical Guideline for the Design and Operation of Facilities Used for Indoor Repair, Storage and Cargo Handling for Vehicles Fueled By Compressed Natural Gas and Liquefied Natural Gas", http://www.cngva.org/media/53844/05-25-12_technical_guideline_re_cng-lng-safe facilities.pdf, published May 25, 2012.

Havrilla, et al., "How to Make Maintenance Facilities CNG Compliant", https://www.vehicleservicepros.com/on-the-vehicle/powertrain/fuels/article/11210836/how-to-make-fleet-maintenance-facilities-cng-compliant-for-compressed-natural-gas, published Dec. 12, 2013, retrieved Nov. 23, 2017.

Kelly, et al., "Compressed Natural Gas Vehicle Maintenance Facility Modification Handbook", https://www.nrel.gov/docs/fy17osti/67371.pdf, published Sep. 2017, retrieved Nov. 23, 2017.

Komuniecki, "Making the Shift To Natural Gas: Best Practices for Fleets", http://www.westport.com/file_library/files/webinar/2013-08-08_MakingtheShifttoNaturalGas.pdf, published Aug. 8, 2013, retrieved Nov. 23, 2017.

Laughlin, et al., "Case Study Compressed Natural Gas Refuse Fleet", https://www.afdc.energy.gov/uploads/publication/casestudy_cng_refuse_feb2014.pdf, published Feb. 2014, retrieved Nov. 23, 2017.

Lengle, "Safety Upgrades for Maintenance Facilities Servicing Commercial Fleet CNG/LNG Vehicles: Guideline for Fleet Operators in British Columbia", https://www.fortisbc.com/NaturalGas/Business/NaturalGasVehicles/Howwecanhelp/Incentives/MaintenanceFacilityUpgradeIncentives/Documents/GuidlineNGTMaintenanceFacilityUpgradeGuideline_July_4_2013.pdf, published Jul. 4, 2013, retrieved Nov. 23, 2017.

Mika, "Exploring the Total Cost of CNG", http://www.government-fleet.com/article/print/story/2013/04/exploring-the-total-cost-of-cng.aspx, published Apr. 2013, retrieved Nov. 23, 2017.

Pate, "Defueling-NGVS-Safely", http://cng.us.com/wp-content/uploads/2015/09/Defueling-NGVs-Safely.pdf, published Sep. 2015, retrieved Nov. 23, 2017.

Smith, et al., "Costs Associated With Compressed Natural Gas Vehicle Fueling Infrastructure", https://www.afdc.energy.gov/uploads/publication/cng_infrastructure_costs.pdf, published Sep. 2014, retrieved Nov. 23, 2017.

Whyatt, "Issues Affecting Adoption of Natural Gas Fuel in Light- and Heavy-Duty Vehicles", https://pdfs.semanticscholar.org/87fb/554ae999bd2ed86469d64b752a76ea21 dd63.pdf, published Sep. 2010, retrieved Nov. 23, 2017.

Yoshida, "Compressed Natural Gas Fuel System Users' Manual", http://www.agilityfuelsolutions.com/assets/pdf/Manual%20ENP-314%20Rev%20B%20CNG%20Users%20Manual.pdf, published Jul. 2017, retrieved Nov. 23, 2017.

Yoshida, "Field Service Bulletin Safely Working on CNG Fuel Systems", http://www.agilityfuelsolutions.com/assets/pdf/ENP-391-Rev-A-Safely-Working-on-CNG-Fuel-Systems.pdf, published Jul. 28, 2015, retrieved Nov. 23, 2017.

\* cited by examiner

[operation 7.2] Refuelling Operations
[operation 7.2.2.2.a] Refuelling Compressor Flow for LPS

[operation 7.2] Refuelling Operations
[operation 7.2.2.2.b] Refuelling Compressor Flow for MPS

[operation 7.2] Refuelling Operations
[operation 7.2.2.2.c] Refuelling - Compressor Flow for HPS

[operation 7.2] Refuelling Operations
[operation 7.2.2.3] Termination of Refuelling

OPERATING LOGIC ACTUATOR TRUTH TABLE

| Valve Config. # | Condition/Situation | Actuator 1 | 2 | 3 | 4 | 5 | 6 | 7 | 8 | 9 | 10 | 11 |
|---|---|---|---|---|---|---|---|---|---|---|---|---|
| 1 | Defuel from Vehicle to Storage 1 | | O | | | | O | | | | O | O |
| 2 | Defuel from Vehicle to Storage 2 | | O | | | | O | O | | | | |
| 3 | Defuel from Vehicle to Storage 3 | | O | O | | | | | | | | |
| 4 | Defuel from Vehicle to Compressor to Storage 1 | | | | O | | | | | O | | O |
| 5 | Defuel from Vehicle to Compressor to Storage 2 | | | | O | | | | O | | O | O |
| 6 | Defuel from Vehicle to Compressor to Storage 3 | | | O | O | | O | | | | O | O |
| 7 | Free Flow from Storage 3 to Storage 1 | | | | O | | | O | | | O | O |
| 8 | Free Flow from Storage 2 to Storage 1 | | | | | | | | O | | O | O |
| 9 | Free Flow from Storage 3 to Storage 2 | | | | O | | | O | O | | | |
| 10 | Compress from Storage 3 to Storage 1 | | | | O | O | | | | O | | O |
| 11 | Compress from Storage 2 to Storage 1 | | | | | O | O | O | | O | | O |
| 12 | Compress from Storage 3 to Storage 2 | | | | O | O | O | | | | O | O |
| 13 | Refuel from Storage 3 to Vehicle | O | O | | | | | | | | | |
| 14 | Refuel from Storage 2 to Vehicle | O | | | | | O | O | | | | |
| 15 | Refuel from Storage 1 to Vehicle | O | | | | | O | | | | O | O |
| 16 | Refuel from Storage 3 to Compressor to Vehicle | | | O | O | | | | O | | | |
| 17 | Refuel from Storage 2 to Compressor to Vehicle | | | | | O | O | O | O | | | |
| 18 | Refuel from Storage 1 to Compressor to Vehicle | | | | | O | O | | O | | O | O |
| 19 | Initial Free Flow between Vehicles | O | O | | | | | | | | | |
| 20 | Compressor Flow between Vehicles | O | | | O | | O | | | | O | O |

NOTES:
1. Empty cell indicates the valve is closed
2. "0" indicates the valve is open
3. Actuator 1 to 11 corresponds to Valve C-09.1 to C-09.11

FIG. 10P

STATUS ANNUNCIATION MATRIX

| Visual (V) |
|---|
| 1 = solid green |
| 2 = pulsating green |
| 3 = solid amber |
| 4 = pulsating amber |
| 5 = alternating green / amber |
| 6 = pulsating red |
| 7 = pulsating white strobe |
| 8 = pulsating blue |

| Audible (A) |
|---|
| 1 = chirping horn |
| 2 = klaxon |
|  |

FIG. 10Q

STATUS ANNUNCIATION MATRIX

| Event | Site Annunciations | | | | Optional Remote Annunciation | | | | | | | | | |
|---|---|---|---|---|---|---|---|---|---|---|---|---|---|---|
| | CFR Beacon | | CFR HMI | | Garage Beacon | | CTC | | Fire | | Other (1) | | Other (2) | |
| | V | A | V | A | V | A | V | A | V | A | V | A | V | A |
| GLOBAL SHUTDOWNS | | | | | | | | | | | | | | |
| E-Stops | | | | | | | | | | | | | | |
| 1. Defuel E-Stop | 6 | 1 | 6 | | | | | | | | | | | |
| 1. Refuel E-Stop | 6 | 1 | 6 | | | | | | | | | | | |
| 1. PCC E-Stop | 6 | 1 | 6 | | | | | | | | | | | |
| 1. Compressor E-Stop | 6 | 1 | 6 | | | | | | | | | | | |
| Fire Pull Box | | | | | | | | | | | | | | |
| | | | | | | | | | | | | | | |
| Safety Instruments | | | | | | | | | | | | | | |
| Fire Sensor | | | | | | | | | | | | | | |
| Gas Sensor @ 40% | 6 | 1 | 6 | | | | | | | | | | | |
| Heat / Smoke Sensor | 6 | 1 | 6 | | | | | | | | | | | |
| Other | | | | | | | | | | | | | | |
| Process Instruments | | | | | | | | | | | | | | |
| Compressor | | | | | | | | | | | | | | |
| • Low inlet P | | | | | | | | | | | | | | |
| • Hi inlet P | | | | | | | | | | | | | | |
| • Hi outlet P | | | | | | | | | | | | | | |
| • Lo oil P | | | | | | | | | | | | | | |
| • Vibration | | | | | | | | | | | | | | |
| • ? | | | | | | | | | | | | | | |
| Gas Control Panel | | | | | | | | | | | | | | |
| • Hi inlet P | | | | | | | | | | | | | | |
| • ? | | | | | | | | | | | | | | |
| LOCAL SHUTDOWNS | | | | | | | | | | | | | | |
| N/A | | | | | | | | | | | | | | |
| PROCESS CONDITIONS | | | | | | | | | | | | | | |
| Normal | | | | | | | | | | | | | | |
| 1-Standby | 1 | | 1 | | | | | | | | | | | |
| 2-Fill in Progress | 2 | | 2 | | | | | | | | | | | |
| Pause | | | | | | | | | | | | | | |
| 1- Process temporarily interrupted | 4 | | 4 | | | | | | | | | | | |
| Non-Shutdown Faults | | | | | | | | | | | | | | |
| 1- Gas sensor @ 20% | 5 | | 5 | | | | | | | | | | | |

FIG. 10R

COMPRESSED-GAS DISTRIBUTION ASSOCIATED WITH VEHICLE

TECHNICAL FIELD

This document relates to the technical field of (and is not limited to) an apparatus configured to distribute a compressed gas associated with a compressed-gas vehicle, such as (and not limited to) distributing a compressed gas between a compressed-gas vehicle and a compressed-gas fuel storage assembly (and a method associated with the apparatus).

BACKGROUND

From time to time, repair is provided to a compressed-natural-gas vehicle configured to operate under compressed natural gas (CNG), liquefied petroleum gas (LPG or propane), etc., and any equivalent thereof.

SUMMARY

For a repair on a compressed-natural-gas vehicle, the compressed-natural-gas tank (LPG tank or CNG tank) is to be removed at a position located outside (exterior) of a qualified vehicle-repair facility before the vehicle may enter (enters) into the interior of the repair facility. Once the vehicle is repaired, then the vehicle may be moved from the interior (of the repair facility) to the exterior (of the repair facility), and then the tank is reattached to the vehicle (once the vehicle is positioned outside of, or exterior of, the repair facility).

In addition, a safety label placed on the compressed-natural-gas vehicle may specify to not park the vehicle in an enclosed space or building when repair may be required (such as, after a collision). The safety labels indicates to have the vehicle inspected and repaired by a trained technician inconveniently outside of the vehicle-repair facility (for the case where the fuel tank is not removed from the vehicle).

A known approach to solve this problem is to use a safety requirement, such as the provision of a flammable gas detection system (calibrated to a specific gas). In the event of a gas leak, the gas detection system emits an audible and/or a visual alarm, automatically opens any vents to the outside (of the repair facility), and automatically shuts off the operations of the equipment as the vehicle-repair facility. However, this approach may not be enough to satisfactorily resolve the problem.

It will be appreciated that there exists a need to mitigate (at least in part) at least one problem associated with the existing vehicle repair facilities (also called the existing technology). After much study of the known systems and methods with experimentation, an understanding (at least in part) of the problem and its solution has been identified (at least in part) and is articulated (at least in part) as follows:

What may be needed is an apparatus that does not require the removal of a compressed-natural-gas tank (LPG tank or CNG tank, etc.) from a compressed-natural-gas vehicle before the vehicle may enter (enters the interior of) a repair facility.

What may be needed is an apparatus that selectively distributes (is configured to distribute) a fluid flow of a fluid fuel (such as, a compressed gas fuel, natural gas, etc.) between (such as, bidirectionally between) a compressed-natural-gas fuel storage assembly and a compressed-natural-gas tank of a compressed-natural-gas-powered vehicle.

To mitigate, at least in part, at least one problem associated with the existing technology, there is provided (in accordance with a first major aspect) an apparatus. The apparatus includes (and is not limited to) a fluid-distribution assembly having controllable components. The fluid-distribution assembly also has a vehicle-fuelling connection configured to be selectively connectable to a first compressed-natural-gas tank of a first compressed-natural-gas-powered vehicle. The fluid-distribution assembly also has a fuel-storage connection configured to be selectively connectable to a fuel storage assembly (also called a compressed-natural-gas fuel storage assembly). The fluid-distribution assembly is configured to be electrically connected to a controller assembly. The controller assembly is configured to monitor and control operations of the controllable components of the fluid-distribution assembly. The controllable components of the fluid-distribution assembly are configured to selectively distribute, under control by way of the controller assembly, a fluid flow of a compressed natural gas between (such as, bidirectionally between) the first compressed-natural-gas tank (of the first compressed-natural-gas-powered vehicle) and the fuel storage assembly. By utilizing the apparatus, it may not be required (not necessary) to remove the first compressed-natural-gas tank from the first compressed-natural-gas-powered vehicle before the first compressed-natural-gas-powered vehicle may enter (enters the interior of) a repair facility.

To mitigate, at least in part, at least one problem associated with the existing technology, there is provided (in accordance with a second major aspect) an apparatus. The apparatus includes (and is not limited to) a controller assembly configured to be electrically connected to controllable components of a fluid-distribution assembly. The controller assembly is also configured to monitor and control operations of the controllable components of the fluid-distribution assembly. The fluid-distribution assembly also has a vehicle-fuelling connection configured to be selectively connectable to a first compressed-natural-gas tank of a first compressed-natural-gas-powered vehicle. The fluid-distribution assembly also has a fuel-storage connection configured to be selectively connectable to a fuel storage assembly (also called a compressed-natural-gas fuel storage assembly). The controllable components of the fluid-distribution assembly are configured to selectively distribute, under control by way of the controller assembly, a fluid flow of a compressed natural gas between (bidirectionally between) the first compressed-natural-gas tank (of the first compressed-natural-gas-powered vehicle) and the fuel storage assembly. In accordance with a preferred embodiment, the controller assembly includes a processor assembly, and a memory assembly (a non-transitory computer-readable storage medium). The memory assembly includes a controller-executable program that is executable by the processor assembly. This is done in such a way that the processor assembly is urged to perform monitoring and controlling operations on the controllable components of the fluid-distribution assembly. By utilizing the apparatus, it is not required to remove the first compressed-natural-gas tank from the first compressed-natural-gas-powered vehicle before the first compressed-natural-gas-powered vehicle may enter (enters the interior of) a repair facility.

To mitigate, at least in part, at least one problem associated with the existing technology, there is provided (in accordance with a third major aspect) an apparatus. The apparatus includes (and is not limited to) a memory assembly (non-transitory computer-readable medium) including and not limited to a controller-executable program. The controller-executable program, when executed by the processor assembly of a controller assembly, causes the processor assembly to perform monitoring and controlling operations of (on) the controllable components of a fluid-distribution assembly. The controller assembly is configured to be electrically connected to the controllable components of the fluid-distribution assembly. The fluid-distribution assembly has a vehicle-fuelling connection configured to be selectively connectable to a first compressed-natural-gas tank of a first compressed-natural-gas-powered vehicle. The fluid-distribution assembly also has a fuel-storage connection configured to be selectively connectable to a fuel storage assembly (also called a compressed-natural-gas fuel storage assembly). The controllable components of the fluid-distribution assembly are configured to selectively distribute, under control by way of the controller assembly, a fluid flow of a compressed natural gas between (bidirectionally between) the first compressed-natural-gas tank (of the first compressed-natural-gas-powered vehicle) and the fuel storage assembly. By utilizing the apparatus, it is not required to remove the first compressed-natural-gas tank from the first compressed-natural-gas-powered vehicle before the first compressed-natural-gas-powered vehicle may enter (enters the interior of) a repair facility.

To mitigate, at least in part, at least one problem associated with the existing technology, there is provided (in accordance with a fourth major aspect) a controller-implemented method. The controller-implemented method, when executed by a processor assembly of a controller assembly, causes a processor assembly to perform operations of (on) the controllable components of a fluid-distribution assembly. The controller assembly is configured to be electrically connected to the controllable components of the fluid-distribution assembly. The fluid-distribution assembly has a vehicle-fuelling connection configured to be selectively connectable to a first compressed-natural-gas tank of a first compressed-natural-gas-powered vehicle. The fluid-distribution assembly also has a fuel-storage connection configured to be selectively connectable to a fuel storage assembly (also called a compressed-natural-gas fuel storage assembly). The controller-implemented method includes, and is not limited to, urging the controllable components of the fluid-distribution assembly to selectively distribute, under control by way of the controller assembly, a fluid flow of a compressed natural gas between (bidirectionally between) the first compressed-natural-gas tank (of the first compressed-natural-gas-powered vehicle) and the fuel storage assembly. By utilizing the controller-implemented method, it may not be required (not necessary) to remove the first compressed-natural-gas tank from the first compressed-natural-gas-powered vehicle before the first compressed-natural-gas-powered vehicle may enter (enters the interior of) a repair facility.

To mitigate, at least in part, at least one problem associated with the existing technology, there is provided (in accordance with a fifth major aspect) an apparatus including and not limited to: (a) a compressed-natural-gas vehicle repair facility defining an interior space therein (in which the interior space is configured to receive a first compressed-natural-gas-powered vehicle); and (b) a fuel storage assembly positioned exteriorly of the compressed-natural-gas vehicle repair facility; and (c) a fluid-distribution assembly positioned in the interior space of the compressed-natural-gas vehicle repair facility; and (d) a controller assembly positioned in the interior space of the compressed-natural-gas vehicle repair facility. The fluid-distribution assembly has controllable components. The controller assembly is configured to be electrically connected to controllable components of a fluid-distribution assembly. The fluid-distribution assembly also has a vehicle-fuelling connection configured to be selectively connectable to a first compressed-natural-gas tank of the first compressed-natural-gas-powered vehicle. The fluid-distribution assembly also has a fuel-storage connection configured to be selectively connectable to the fuel storage assembly. The fluid-distribution assembly is configured to be electrically connected to the controller assembly. The controller assembly is configured to monitor and control operations of the controllable components of the fluid-distribution assembly. The controllable components of the fluid-distribution assembly are configured to selectively distribute, under control by way of the controller assembly, a fluid flow of a compressed natural gas between the first compressed-natural-gas tank and the fuel storage assembly. By utilizing the controller-implemented method, it is not required to remove the first compressed-natural-gas tank from the first compressed-natural-gas-powered vehicle before the first compressed-natural-gas-powered vehicle may enter (enters the interior of) a repair facility.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify potentially key features or possible essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 10P depicts a schematic view of an embodiment of the operating logic of an actuator truth table utilized by a controller assembly of the apparatus of FIG. 1; and FIG. 10Q and FIG. 10R depict schematic views of embodiments of a status annunciation matrix utilized by a controller assembly of the apparatus 1100 of FIG. 1.

Figure 1:
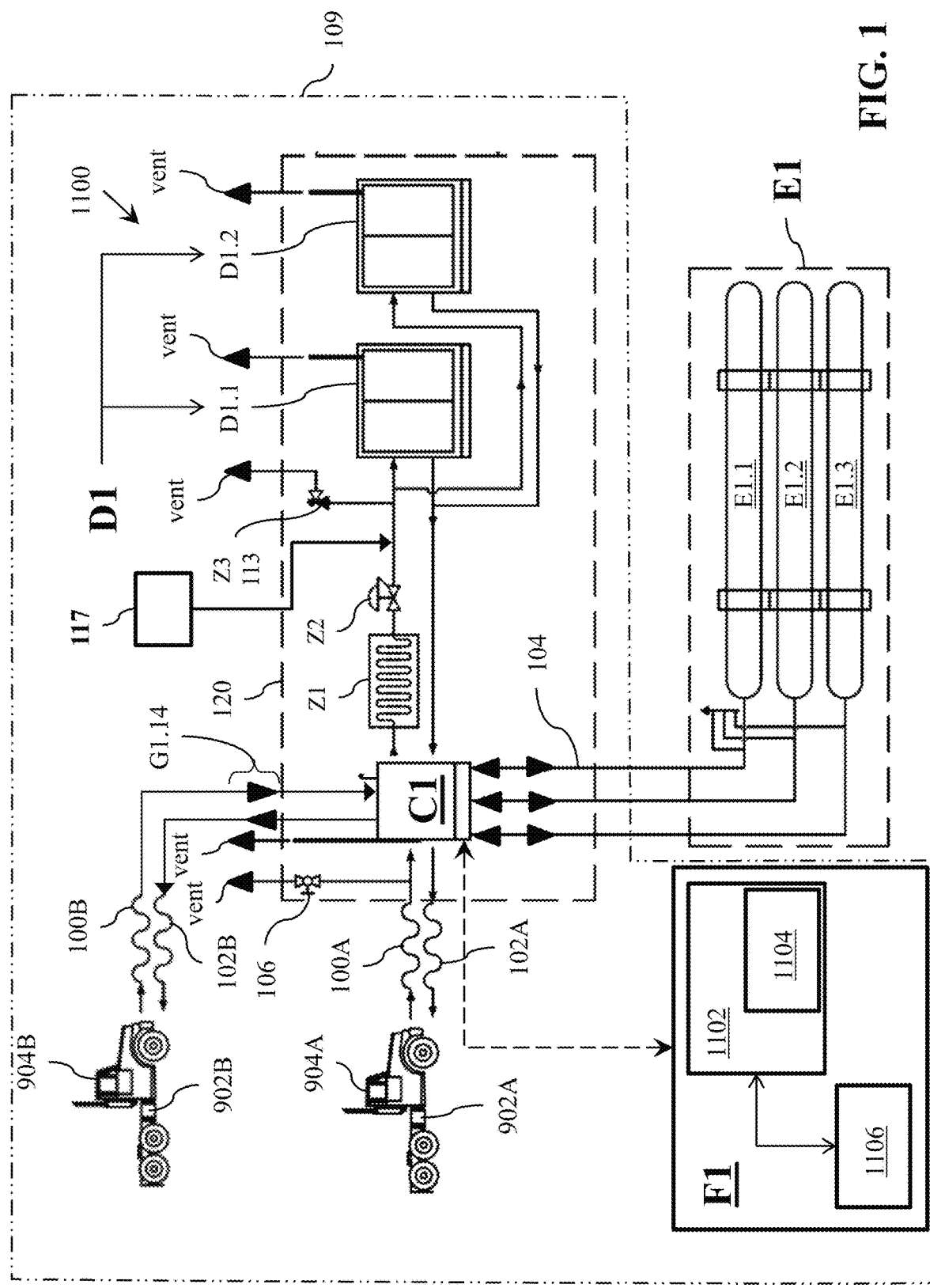
FIG. 1, FIG. 2, FIG. 3, FIG. 4A and FIG. 4B depict schematic views of embodiments of an apparatus configured to distribute a compressed gas (a fluid fuel, a compressed gas fuel) associated with a compressed-gas vehicle, such as (and not limited to) distributing (such as, recycling) a compressed gas (a fluid fuel) between a compressed-gas vehicle and a compressed-gas fuel storage assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

LISTING OF REFERENCE NUMERALS USED
IN THE DRAWINGS defuelling station (B-1)
refuelling station (B-2)
defuelling nozzle (B1.1)
refuelling nozzle (B1.2)
defuelling tube (B2.1)
refuelling hose (B2.2)
bypass defuelling valve (B3.1)
refuelling valve (B3.2)
defuelling line (B4.1)
refuelling line (B4.2)
fluid-distribution assembly (C1)
defuelling-post connection (C1.1)
input compressor connection (C1.2)
output compressor connection (C1.3)
refuelling connection (C1.4)
indoor defuelling connection (C1.5)
first storage connection (C1.6)
second storage connection (C1.7)
third storage connection (C1.8)
vent (C1.9)
indoor defuelling subassembly (C1.10)
tubing structure (C1.11)
first emergency stop (C2.1)
second emergency stop (C2.2)
defuelling valve (C3.1)
refuelling valve (C3.2)
indoor refuelling valve (C3.3)
first storage valve (C4.1)
second storage valve (C4.2)
third storage valve (C4.3)
drain valve (C5)
vent stack (C6)
first pressure gauge (C7.1)
second pressure gauge (C7.2)
third pressure gauge (C7.3)
fourth pressure gauge (C7.4)
fifth pressure gauge (C7.5)
sixth pressure gauge (C7.6)
seventh pressure gauge (C7.7)
eighth pressure gauge (C7.8)
first pressure transmitter (C8.1)
second pressure transmitter (C8.2)
third pressure transmitter (C8.3)
fourth pressure transmitter (C8.4)
fifth pressure transmitter (C8.5)
first controllable valve (C9.1)
second controllable valve (C9.2)
third controllable valve (C9.3)
fourth controllable valve (C9.4)
fifth controllable valve (C9.5)
sixth controllable valve (C9.6)
seventh controllable valve (C9.7)
eighth controllable valve (C9.8)
ninth controllable valve (C9.9)
tenth controllable valve (C9.10)
eleventh controllable valve (C9.11)
twelfth controllable valve (C9.12)
thirteenth controllable valve (C9.13)
fourteenth controllable valve (C9.14)
first check valve (C10.1)
second check valve (C10.2)
third check valve (C10.3)
fourth check valve (C10.4)
first control valve (C11.1)
second control valve (C11.2)
third control valve (C11.3)
fourth control valve (C11.4)
fifth control valve (C11.5)
sixth control valve (C11.6)
seventh control valve (C11.7)
eighth control valve (C11.8)
ninth control valve (C11.9)
tenth control valve (C11.10)
eleventh control valve (C11.11)
twelfth control valve (C11.12)
thirteenth control valve (C11.13)
pressure relief valve (C12)
pressure regulator (C13)
compressor assembly (D1)
first compressor (D1.1)
second compressor (D1.2)
first emergency stop (D2.1)
second emergency stop (D2.2)
first venting valve (D3.1)
second venting valve (D3.2)
first input valve (D4.1)
second input valve (D4.2)
first bleed valve (D5.1)
second bleed valve (D5.2)
first strainer (D6.1)
second strainer (D6.2)
first output valve (D7.1)
second output valve (D7.2)
fuel storage assembly (E1)
first fuel storage assembly (E1.1)
second fuel storage assembly (E1.2)

third fuel storage assembly (E1.3)
controllable valve (E1.4)
controller assembly (F1)
power section (F2)
controller section (F3)
communications section (F4)
indoor defuelling system (G1)
coupler (G1.1)
flexible hose (G1.2)
hose coupler (G1.3)
hose coupler (G1.4.1)
hose coupler (G1.4.$n$)
bleed valve (G1.5.1)
bleed valve (G1.5.$n$)
valve (G1.6.1)
valve (G1.6.$n$)
check valve (G1.7.1)
check valve (G1.7$n$)
pressure gage (G1.8)
tube (G1.9)
emergency stop (G1.10)
status beacon (G1.11)
start switch (G1.12)
gas detector (G1.13)
auxiliary vehicle defuelling port (G1.14)
defuel receptacle (G2)
portable defuelling hose (G3)
connection (G4)
heat exchanger (Z1)
pressure regulator (Z2)
pressure relief valve (Z3)
first defuelling hose 100A
second defuelling hose 100B
first fuelling hose 102A
second fuelling hose 102B
tubing structure 104
vent valve 106
compressed-natural-gas vehicle repair facility 109
gas-source connection 117
skid assembly 120
fuel-storage connection 123
vehicle-fuelling connection 129
gas dryer 901
first compressed-natural-gas tank 902A
second compressed-natural-gas tank 902B
first compressed-natural-gas-powered vehicle 904A
second compressed-natural-gas-powered vehicle 904B
apparatus 1100
memory assembly 1102
controller-executable program 1104
processor assembly 1106

DETAILED DESCRIPTION OF THE
EXEMPLARY EMBODIMENTS

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the claim is defined by the claims (in which the claims may be amended during patent examination after the filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1, FIG. 2, FIG. 3, FIG. 4A and FIG. 4B depict schematic views of embodiments of an apparatus 1100 configured to distribute a compressed gas (a fluid fuel, a compressed gas (a fluid fuel, a compressed gas fuel) associated with a compressed-gas vehicle, such as (and not limited to) distributing (recycling, moving, moving back and forth, etc.) a compressed gas (a fluid fuel) between a compressed-gas vehicle and a compressed-gas fuel storage assembly.

Referring to the embodiments as depicted in FIG. 1, FIG. 2, FIG. 3, FIG. 4A and FIG. 4B, the apparatus 1100 includes (and is not limited to), in accordance with a first major embodiment, a synergistic combination of a fluid-distribution assembly (C1), and a controller assembly (F1). The fluid-distribution assembly (C1) may be referred to as a gas-control assembly panel, a fuelling-and-defuelling station, and any equivalent thereof.

Referring to the embodiments as depicted in FIG. 1, FIG. 2, FIG. 3, FIG. 4A and FIG. 4B, the apparatus 1100 includes (and is not limited to), in accordance with a second major embodiment, a fluid-distribution assembly (C1). The fluid-distribution assembly (C1) is configured to be electrically connected to a controller assembly (F1). In this case, the fluid-distribution assembly (C1) and the controller assembly (F1) are provided separately (from different vendors).

Referring to the embodiments as depicted in FIG. 1, FIG. 2, FIG. 3, FIG. 4A and FIG. 4B, the apparatus 1100 includes (and is not limited to), in accordance with a third major embodiment, a controller assembly (F1). The controller assembly (F1) is configured to be electrically connected to a fluid-distribution assembly (C1). In this case, the fluid-distribution assembly (C1) and the controller assembly (F1) are provided separately (from different vendors).

Figure 2:
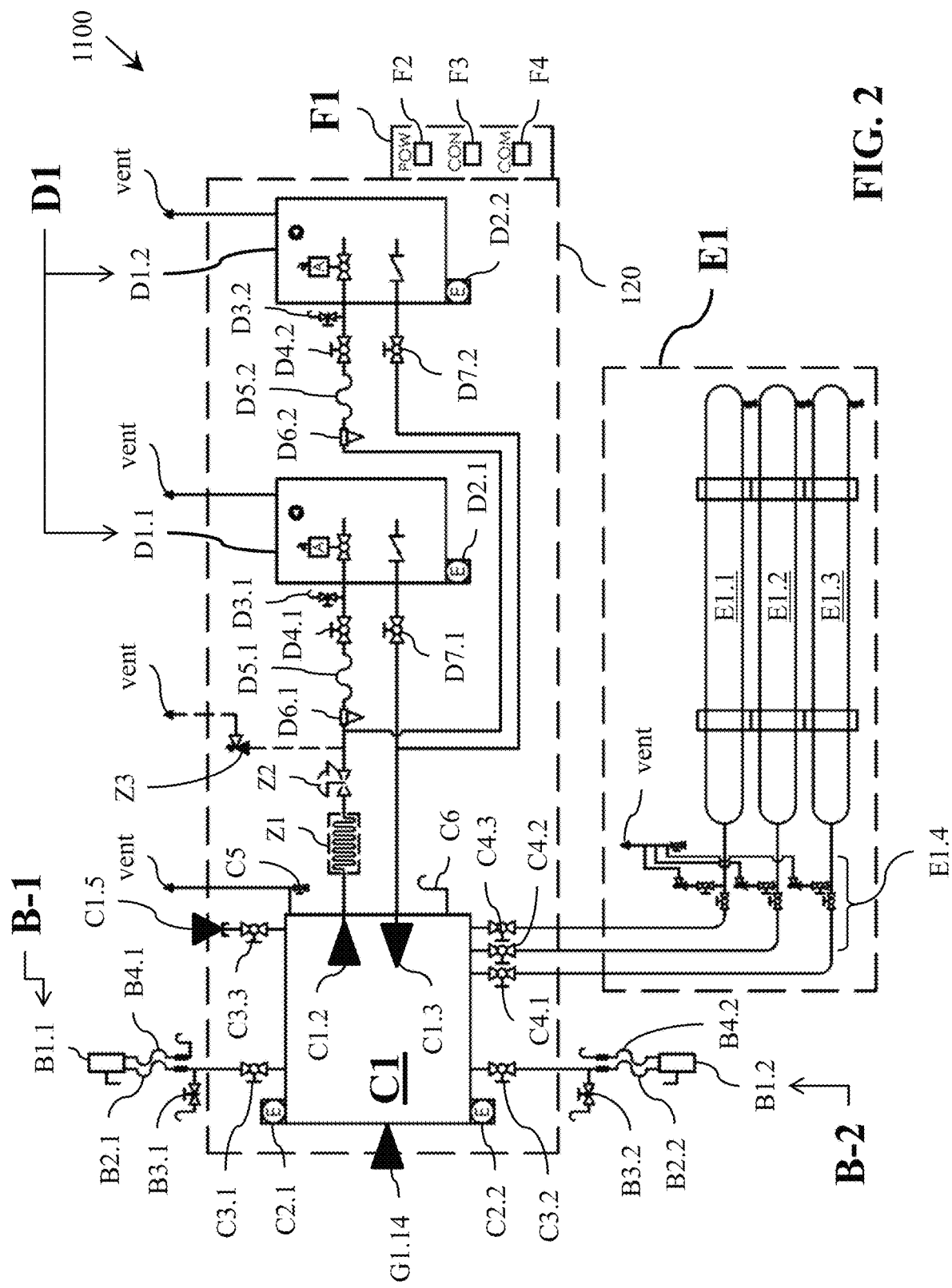
Figure 3:
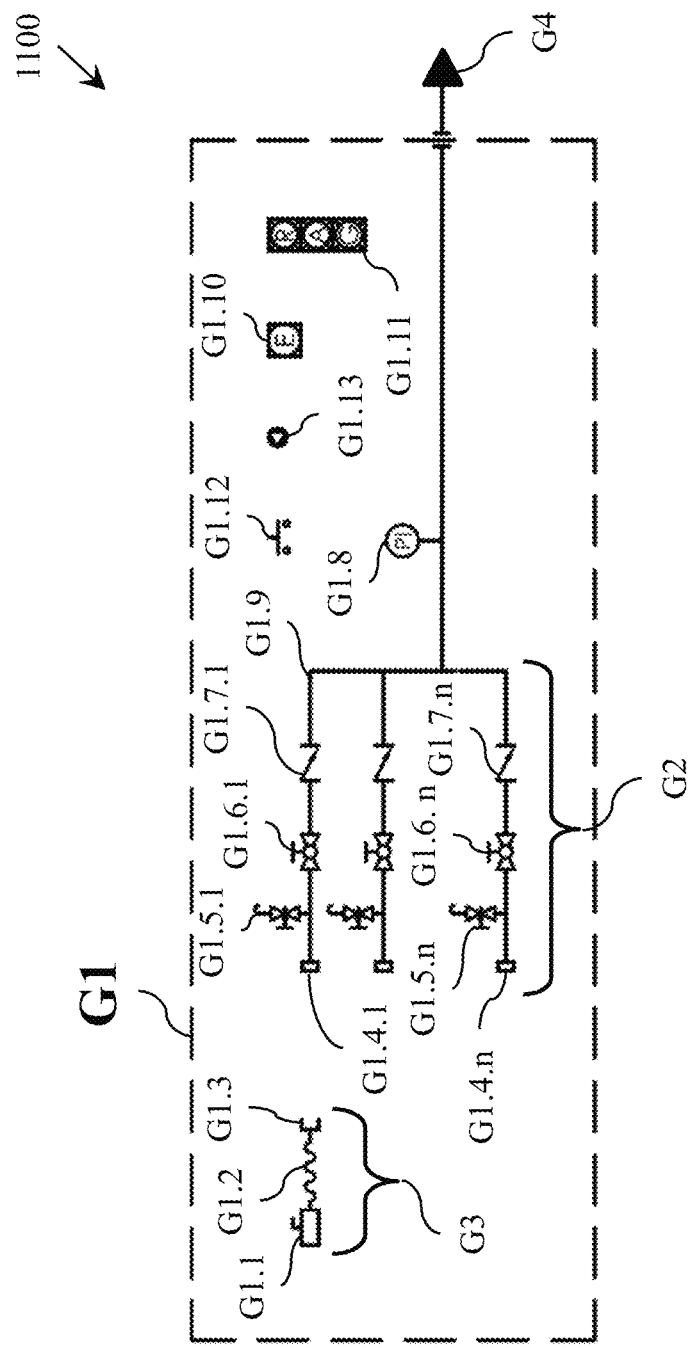
Figure 4A:
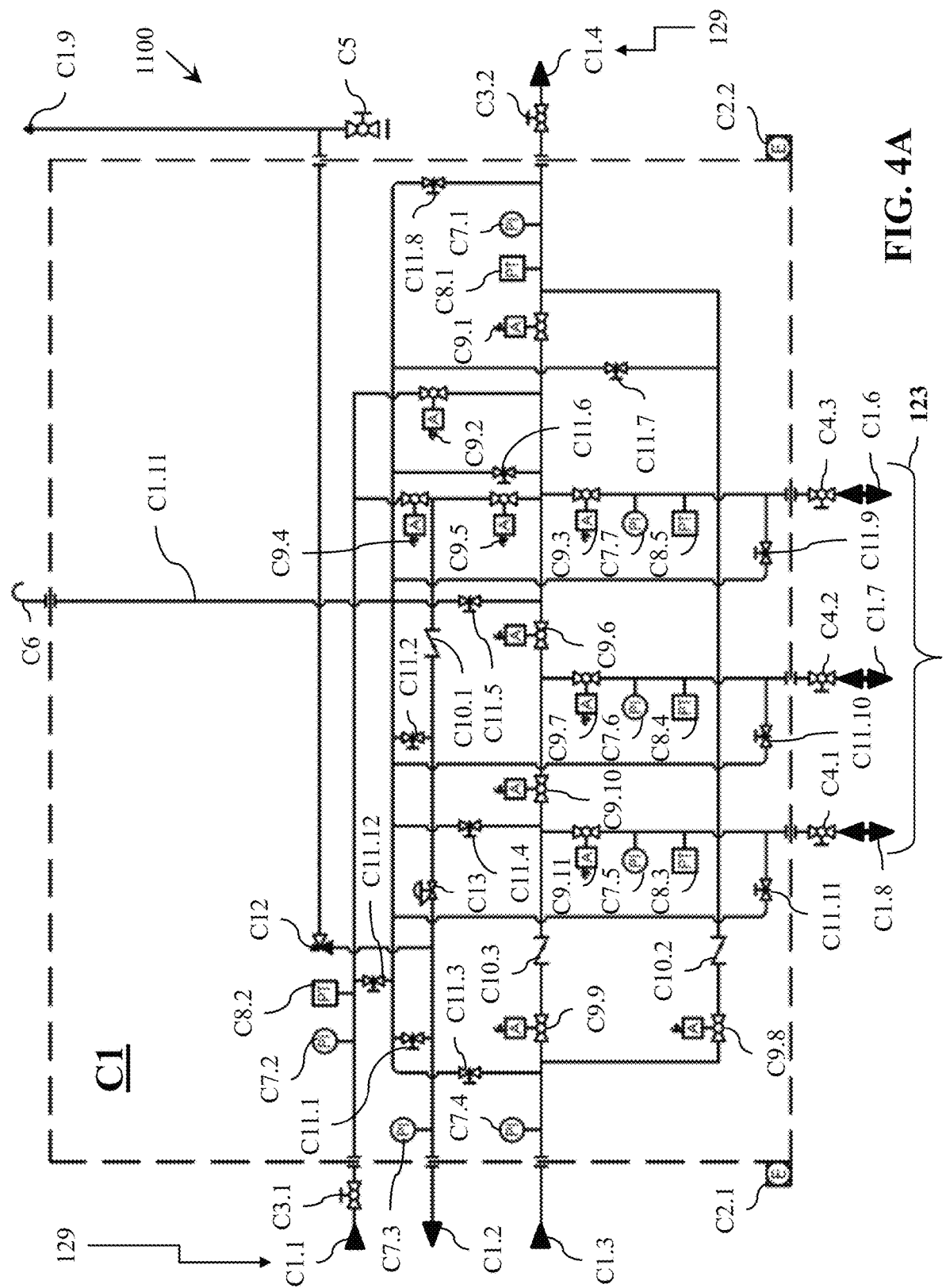

Referring to the embodiments as depicted in FIG. 1, FIG. 2, FIG. 3, FIG. 4A and FIG. 4B, the apparatus 1100 includes (and is not limited to), in accordance with a fourth major embodiment, a fluid-distribution assembly (C1) having components or controllable components. The controllable components may include, for instance, controllable valves, sensors, pressure sensors, and components that may be monitored and/or controlled, etc., in which the controllable components are depicted in the embodiments of FIG. 4A and/or FIG. 4B. In this case, the fluid-distribution assembly (C1) and the controller assembly (F1) are provided separately (that is, may be supplied by or from different equipment vendors). The fluid-distribution assembly (C1) also has a vehicle-fuelling connection 129 configured to be selectively connectable to a first compressed-natural-gas tank 902A of a first compressed-natural-gas-powered vehicle 904A. At least one embodiment of the vehicle-fuelling connection 129 is depicted in FIG. 4A. The vehicle-fuelling connection 129 may include, for instance, a defuelling-post connection (C1.1) and/or a refuelling connection (C1.4), and/or a bidirectional fuelling post, etc., both depicted in the embodiment of FIG. 4A. The fluid-distribution assembly (C1) also has a fuel-storage connection 123 configured to be selectively connectable to a fuel storage assembly (E1). The fuel storage assembly (E1) may include a compressed-natural-gas fuel storage assembly. The fluid-distribution assembly (C1) is configured to be electrically connected to a controller assembly (F1). The controller assembly (F1) is configured to monitor and control operations of controllable components of the fluid-distribution assembly (C1). The controllable components of the fluid-distribution assembly (C1) are configured to selectively distribute, under control by way of the controller assembly (F1), a fluid flow of a compressed natural gas between (such as, bidirectionally between) the first compressed-natural-gas tank 902A (of the first compressed-natural-gas-powered vehicle 904A) and the fuel storage assembly (E1). The meaning of selectively distribute may include selective exchange, selective recycle, and/or selective bidirectional recycle. By utilizing the apparatus 1100, it is not required to remove the first compressed-natural-gas tank 902A from the first compressed-natural-gas-powered vehicle 904A before the first compressed-natural-gas-powered vehicle 904A may enter (enters) a repair facility.

Referring to the embodiments as depicted in FIG. 1, FIG. 2, FIG. 3, FIG. 4A and FIG. 4B, the apparatus 1100 includes (and is not limited to), in accordance with a fifth major embodiment, a controller assembly (F1) configured to be electrically connected to controllable components of a fluid-distribution assembly (C1). For this case, the fluid-distribution assembly (C1) and the controller assembly (F1) are provided separately (made by, and/or supplied from, different vendors or suppliers). The controller assembly (F1) is also configured to monitor and control operations of the controllable components of the fluid-distribution assembly (C1). The fluid-distribution assembly (C1) also has a vehicle-fuelling connection configured to be selectively connectable to a first compressed-natural-gas tank 902A of a first compressed-natural-gas-powered vehicle 904A. The vehicle-fuelling connection may include, for instance, a defuelling-post connection (C1.1) and a refuelling connection (C1.4), both depicted in FIG. 4A. The fluid-distribution assembly (C1) also has a fuel-storage connection 123 configured to be selectively connectable to a fuel storage assembly (E1). The fuel storage assembly (E1) may include a compressed-natural-gas fuel storage assembly, etc. The controllable components of the fluid-distribution assembly (C1) are configured to selectively distribute, under control by way of the controller assembly (F1), a fluid flow of a compressed natural gas between (such as, a bidirectional flow between) the first compressed-natural-gas tank 902A (of the first compressed-natural-gas-powered vehicle 904A) and the fuel storage assembly (E1). In accordance with a preferred embodiment, the controller assembly (F1) includes a processor assembly 1106, and a memory assembly 1102 (a non-transitory computer-readable storage medium). The memory assembly 1102 includes a controller-executable program 1104 (computer-executable instructions) that are executable by the processor assembly 1106. This is done in such a way that the processor assembly 1106 is urged to perform monitoring and controlling operations on the controllable components of the fluid-distribution assembly (C1). The meaning of selectively distribute may include selective exchange, selective recycle, and/or selective bidirectional recycling. By utilizing the apparatus 1100, it is not required to remove the first compressed-natural-gas tank 902A from the first compressed-natural-gas-powered vehicle 904A before the first compressed-natural-gas-powered vehicle 904A may enter (enters) a repair facility.

Referring to the embodiments as depicted in FIG. 1, FIG. 2, FIG. 3, FIG. 4A and FIG. 4B, the apparatus 1100 includes (and is not limited to), in accordance with a sixth major embodiment, a memory assembly 1102 including and not limited to a controller-executable program 1104 (computer-executable instructions). The memory assembly 1102 includes, for instance, a non-transitory computer-readable medium. The controller-executable program 1104 includes, for instance, computer-executable instructions. The controller-executable program 1104, when executed by the processor assembly 1106 of a controller assembly (F1), causes the processor assembly 1106 to perform monitoring and controlling operations of (on) the controllable components of a fluid-distribution assembly (C1). In this case, the fluid-distribution assembly (C1) and the controller assembly (F1) are provided separately (provided by or supplied by different vendors or manufacturers or suppliers, etc.). The controller assembly (F1) is configured to be electrically connected to the controllable components of the fluid-distribution assembly (C1). The fluid-distribution assembly (C1) has a vehicle-fuelling connection configured to be selectively connectable to a first compressed-natural-gas tank 902A of a first compressed-natural-gas-powered vehicle 904A. Embodiments of the vehicle-fuelling connection may include, for instance, a defuelling-post connection (C1.1) and a refuelling connection (C1.4), both depicted in FIG. 4A. The fluid-distribution assembly (C1) also has a fuel-storage connection 123 configured to be selectively connectable to a fuel storage assembly (E1) (also called a compressed-natural-gas fuel storage assembly). The fuel storage assembly (E1) includes a compressed-natural-gas fuel storage assembly. The controllable components of the fluid-distribution assembly (C1) are configured to selectively distribute, under control by way of the controller assembly (F1), a fluid flow of a compressed natural gas between (bidirectionally between) the first compressed-natural-gas tank 902A (of the first compressed-natural-gas-powered vehicle 904A) and the fuel storage assembly (E1). The meaning of selectively distribute may include selective exchange, selective recycle, and/or selective bidirectional recycling. By utilizing the apparatus 1100, it is not required to remove the first compressed-natural-gas tank 902A from the first compressed-natural-gas-powered vehicle 904A before the first compressed-natural-gas-powered vehicle 904A may enter (enters) a repair facility.

Referring to the embodiments as depicted in FIG. 1, FIG. 2, FIG. 3, FIG. 4A and FIG. 4B, in accordance with a seventh major embodiment, there is provided a controller-implemented method that, when executed by a processor assembly 1106 of a controller assembly (F1), causes a processor assembly 1106 to perform operations of (on) the controllable components of a fluid-distribution assembly (C1). The controller assembly (F1) is configured to be electrically connected to the controllable components of the fluid-distribution assembly (C1). The fluid-distribution assembly (C1) has a vehicle-fuelling connection (the vehicle-fuelling connection may include, for instance, a defuelling-post connection (C1.1) and a refuelling connection (C1.4)) configured to be selectively connectable to a first compressed-natural-gas tank 902A of a first compressed-natural-gas-powered vehicle 904A, and in which the fluid-distribution assembly (C1) also has a fuel-storage connection 123 configured to be selectively connectable to a fuel storage assembly (E1) (also called a compressed-natural-gas fuel storage assembly). The controller-implemented method includes, and is not limited to, urging the controllable components of the fluid-distribution assembly (C1) to selectively distribute (selectively exchange, recycle, bidirectional recycling), under control by way of the controller assembly (F1), a fluid flow of a compressed natural gas between (bidirectionally between) the first compressed-natural-gas tank 902A (of the first compressed-natural-gas-powered vehicle 904A) and the fuel storage assembly (E1). The meaning of selectively distribute may include selective exchange, selective recycle, and/or selective bidirectional recycling. By utilizing controller-implemented method, it is not required to remove the first compressed-natural-gas tank 902A from the first compressed-natural-gas-powered vehicle 904A before the first compressed-natural-gas-powered vehicle 904A may enter (enters) a repair facility.

Referring to the embodiments as depicted in FIG. 1, in accordance with an eighth major embodiment, there is provided an apparatus 1100 including and not limited to a synergistic combination of a compressed-natural-gas vehicle repair facility 109, a fuel storage assembly (E1), a fluid-distribution assembly (C1); and a controller assembly (F1). The compressed-natural-gas vehicle repair facility 109 defines (provides) an interior space therein. The interior space is configured to receive a first compressed-natural-gas-powered vehicle 904A. The first compressed-natural-gas-powered vehicle 904A is positionable in the interior space of the compressed-natural-gas vehicle repair facility 109. The fuel storage assembly (E1) is positioned exteriorly of the compressed-natural-gas vehicle repair facility 109.

The fluid-distribution assembly (C1) is positioned in the interior space of the compressed-natural-gas vehicle repair facility 109. The controller assembly (F1) is positioned in the interior space of the compressed-natural-gas vehicle repair facility 109. The fluid-distribution assembly (C1) has controllable components. The controller assembly (F1) is configured to be electrically connected to controllable components of a fluid-distribution assembly (C1). The fluid-distribution assembly (C1) also has a vehicle-fuelling connection 129 configured to be selectively connectable to a first compressed-natural-gas tank 902A of the first compressed-natural-gas-powered vehicle 904A. The fluid-distribution assembly (C1) also has a fuel-storage connection 123 configured to be selectively connectable to the fuel storage assembly (E1). The fluid-distribution assembly (C1) is configured to be electrically connected to the controller assembly (F1). The controller assembly (F1) is configured to monitor and control operations of the controllable components of the fluid-distribution assembly (C1). The controllable components of the fluid-distribution assembly (C1) are configured to selectively distribute, under control by way of the controller assembly (F1), a fluid flow of a compressed natural gas between the first compressed-natural-gas tank 902A and the fuel storage assembly (E1). By utilizing controller-implemented method, it is not required to remove the first compressed-natural-gas tank 902A from the first compressed-natural-gas-powered vehicle 904A before the first compressed-natural-gas-powered vehicle 904A may enter (enters) a repair facility.

Referring to the embodiments as depicted in FIG. 1, FIG. 2, FIG. 3, FIG. 4A and FIG. 4B, the fluid-distribution assembly (C1) is configured to selectively distribute (selectively exchange, recycle, bidirectional recycling) the fluid flow of a compressed natural gas between (bidirectionally between) a first compressed-natural-gas tank 902A (of a first compressed-natural-gas-powered vehicle 904A) and a fuel storage assembly (E1) (also called a compressed-natural-gas fuel storage assembly). For instance, the compressed natural gas may include compressed natural gas (CNG), liquefied natural gas (LNG), liquefied petroleum gas LPG (mainly propane), etc., and any equivalent thereof. For instance, the first compressed-natural-gas-powered vehicle 904A (such as, a truck, a bus, a car, etc.) may include a natural gas vehicle (NGV). The natural gas vehicle (NGV) is an alternative fuel vehicle that uses compressed natural gas (CNG), liquefied natural gas (LNG) or LPG (mainly propane). For instance, in a natural gas powered vehicle, energy is released by combustion of essentially methane gas (CH4) fuel with oxygen (O2) from the air to carbon dioxide (CO2) and water vapor (H2O) in an internal combustion engine. Methane is the cleanest burning hydrocarbon and many contaminants present in natural gas are removed at source. For instance, VOLVO (TRADEMARK) and GENERAL MOTORS Heavy Truck Corporation manufacture an NGV refuse hauler called the XPEDITOR (TRADEMARK) refuse hauler vehicle (available in LNG and CNG versions). The first compressed-natural-gas-powered vehicle 904A may be referred to as a CNG-powered vehicle. For instance, the fuel storage assembly (E1), of the type that may be installed in a vehicle fuelling station, etc., may include storage systems supplied by CNG CENTER (TRADEMARK) based in Texas, USA).

Referring to the embodiments as depicted in FIG. 1, FIG. 2, FIG. 3, FIG. 4A and FIG. 4B, preferably, the fluid-distribution assembly (C1) is configured to selectively distribute (selectively exchange, recycle, bidirectional recycling) the fluid flow of the compressed natural gas from (A) the first compressed-natural-gas tank 902A to the fuel storage assembly (E1) (also called a compressed-natural-gas fuel storage assembly), and (B) the fuel storage assembly (E1) to the first compressed-natural-gas tank 902A. The controller assembly (F1) is configured to control operations of the fluid-distribution assembly (C1). The controller assembly (F1) may be referred to as (or is called) a power-control-communications panel, and any equivalent thereof.

Figure 4B:
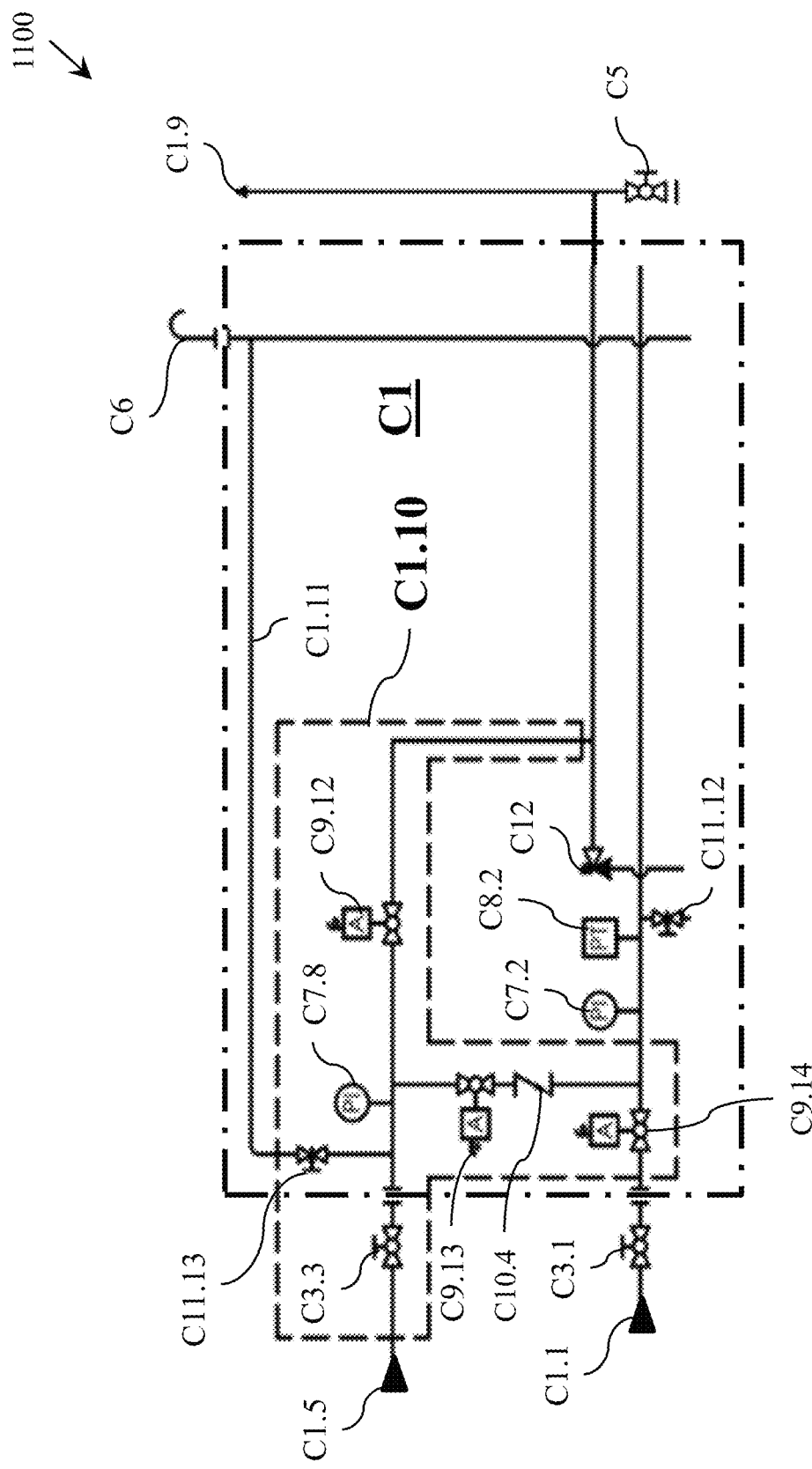

Referring to the embodiments as depicted in FIG. 4A and FIG. 4B, the fluid-distribution assembly (C1) has (includes) a collection of controllable valves, and also has (includes) a network of fluid pipes (also called a tubing structure 104 or a stainless steel tubing, etc.) with connections or connection portals (such as, a defuelling-post connection (C1.1)). The controllable valves may include controllable actuators or actuators, sensors, monitoring sensors, etc. For instance, the controllable valve may include the MODEL SERIES 291 valve manufactured by EMERSON (TRADEMARK) based in New Jersey, USA. For instance, the fluid pipes may include the MODEL R149 pipe manufactured by TITE-FLEX (TRADEMARK) based in Massachusetts, USA.

Referring to the embodiments as depicted in FIG. 4A and FIG. 4B, preferably the fluid-distribution assembly (C1) includes sensors (monitoring sensors) configured to monitor (such as, measure the pressure within a given tube or conduit, etc.) the status of the states (operation states, conditions, process parameters) of (associated with) the fluid-distribution assembly (C1). The embodiments of the sensors are depicted in FIG. 4A and FIG. 4B. The sensors of the fluid-distribution assembly (C1) are configured to be in electrical communication with (electrically connectable with, either electrically wired to or wirelessly connected with) the controller assembly (F1). The controller-executable program 1104 includes programmed coded instructions configured to direct the controller assembly (F1) to read (receive) the outputs of (that is, the measurement data provided by) the sensors (such as, pressure transducers, pressure sensors, temperature sensors, etc.), and any equivalent thereof.

Referring to the embodiments as depicted in FIG. 4A and FIG. 4B, preferably the fluid-distribution assembly (C1) includes actuators (controllable valves) configured to control the operational states (that is, the flow of fluid fuel) of the fluid-distribution assembly (C1). Embodiments of the actuators are depicted in FIG. 4A and/or FIG. 4B. The actuators of the fluid-distribution assembly (C1) are configured to be in electrical communication with (electrically connectable with, either electrically wired to or wirelessly connected with) the controller assembly (F1). The controller-executable program 1104 of the controller assembly (F1) includes programmed coded instructions configured to direct the controller assembly (F1) to control operations of the actuators (such as a controllable valve, etc.).

Referring to the embodiments as depicted in FIG. 4A and FIG. 4B, preferably the collection of controllable valves are configured to selectively control (recycle) the fluid flow of the compressed natural gas, via the network of fluid pipes and the connection portals from (A) the first compressed-natural-gas tank 902A to the fuel storage assembly (E1), and (B) the fuel storage assembly (E1) to the first compressed-natural-gas tank 902A. Preferably, the controller assembly (F1) is configured to selectively control operations of (such as for selective opening and closing of) each controllable valve of the collection of controllable valves (such as, the valve motors of the valves) of the fluid-distribution assembly (C1). It will be appreciated that the preferred embodiments of the collection of controllable valves and the network of fluid pipes with the connection portals are depicted in FIG. 4A and FIG. 4B. The network of fluid pipes fluidly connect (are configured to connect or interconnect) the collection of controllable valves with the connection portals. The connection portals (also called fluid connection or connection) may include input ports (one-way flow input ports), output ports (one-way flow output ports), and/or bidirectional ports (bidirectional flow of fluid as either selective input flow or selective output flow via a single port or portal).

Referring to the embodiments as depicted in FIG. 1, FIG. 2, FIG. 3, FIG. 4A and FIG. 4B, the connection portals of the network of fluid pipes are configured to be, preferably, connected to (configured to be connectable with) the fuel storage assembly (E1). The connection portals of the network of fluid pipes of the fluid-distribution assembly (C1) are configured to be selectively connectable with, and disconnectable from, a first compressed-natural-gas tank 902A of a first compressed-natural-gas-powered vehicle 904A. Once the connection portals of the network of fluid pipes are connected, the compressed natural gas is selectively flowable, via the fluid-distribution assembly (C1), from (A) the first compressed-natural-gas tank 902A to the fuel storage assembly (E1), and (B) the fuel storage assembly (E1) to the first compressed-natural-gas tank 902A. The collection of controllable valves are configured to selectively control the bidirectional flow, via the fluid-distribution assembly (C1), of the compressed natural gas between (A) the first compressed-natural-gas tank 902A to the fuel storage assembly (E1), and (B) the fuel storage assembly (E1). Once the connection portals of the network of fluid pipes are connected, the collection of controllable valves, in use, selectively control the bidirectional flow, via the fluid-distribution assembly (C1), of the compressed natural gas between (A) the first compressed-natural-gas tank 902A to the fuel storage assembly (E1), and (B) the fuel storage assembly (E1).

Referring to the embodiments as depicted in FIG. 1, FIG. 2, FIG. 3, FIG. 4A and FIG. 4B, at least some of the connection portals of the network of fluid pipes of the fluid-distribution assembly (C1) are also configured to selectively fluidly connect to the first compressed-natural-gas tank 902A of the first compressed-natural-gas-powered vehicle 904A. This is done in such a way that the compressed natural gas may selectively flow, via the fluid-distribution assembly (C1), between the fluid-distribution assembly (C1) and the first compressed-natural-gas tank 902A.

Referring to the embodiments as depicted in FIG. 1, FIG. 2, FIG. 3, FIG. 4A and FIG. 4B, for instance, the controller assembly (F1) may include (in accordance with a preferred embodiment) a computer system having at least one computer processor unit, an industrial computer system, a programmable logic controller, hard-wired relays, timers and sequencers, etc., and any equivalent thereof. The programmable logic controller (PLC) or programmable controller is an industrial digital computer which has been ruggedized and adapted for the control of a process or activity that requires a relatively higher reliability control and/or process fault diagnosis. The PLC is an example of a hard real-time system since the system output results are produced in response to input conditions within a limited time (otherwise unintended operations may result). For instance, the computer processor (processing unit) of the controller assembly (F1) is (includes) an electronic circuit which performs operations on a data source, usually computer memory or some other data stream. An example of the computer processor may include the INTEL (TRADEMARK) PENTIUM III (TRADEMARK) processor manufactured by INTEL CORP (based in California, USA). An example of the PLC may include the SIMATIC S7-1500 (TRADEMARK) PLC manufactured by SIEMENS (based in Munich, Germany).

Referring to the embodiments as depicted in FIG. 1, FIG. 2, FIG. 3, FIG. 4A and FIG. 4B, the controller assembly (F1) (as depicted in FIG. 1 and FIG. 2) is configured to be in electrical communication with the collection of controllable valves of the fluid-distribution assembly (C1) (as depicted in FIG. 3, FIG. 4A and FIG. 4B). The controller assembly (F1) is configured to electrically control the operations of the collection of controllable valves of the fluid-distribution assembly (C1). This is done in such a way that the compressed natural gas is selectively flowable between (selectively bidirectional flow between) the fluid-distribution assembly (C1) and the first compressed-natural-gas tank 902A.

Referring to the embodiments as depicted in FIG. 1 and FIG. 2, preferably the controller assembly (F1) includes a memory assembly 1102 configured to receive and tangibly store a controller-executable program 1104. The memory assembly 1102 refers to the computer hardware integrated circuits that store information for immediate use by the controller assembly (F1). The memory assembly 1102 may include random-access memory (RAM), and/or any type of addressable semiconductor memory (i.e. integrated circuits consisting of silicon-based transistors) either volatile computer memory and/or non-volatile computer memory, etc. Examples of non-volatile memory are flash memory, read-only Memory (ROM), PROM, EPROM and EEPROM memory. Examples of volatile memory may include dynamic random-access memory (DRAM), static random-access memory (SRAM), etc., and any equivalent thereof Referring to the embodiments as depicted in FIG. 1 and FIG. 2, preferably the controller-executable program 1104 may include programmed coded instructions. The programmed coded instructions are configured to be readable by, and executable by, the controller assembly (F1). The memory assembly 1102 is configured to receive and tangibly store the controller-executable program 1104. The controller-executable program 1104 includes coded instructions (programmed coded instructions) configured to be readable by, and executable by, the controller assembly (F1). The controller-executable program 1104 is configured to urge the controller assembly (F1) to perform (execute) predetermined controller operations. The embodiments of the predetermined controller operations are depicted in FIG. 10A, FIG. 10B, FIG. 10C, FIG. 10D and FIG. 10E (which depict the flow charts of embodiments of the defuelling operations). The embodiments of the predetermined controller operations are depicted in FIG. 10F, FIG. 10G, FIG. 10H, FIG. 10I and FIG. 10J (which depict the flow charts of embodiments of the refuelling operations). The embodiments of the predetermined controller operations are depicted in FIG. 10K and FIG. 10L (which depict the flow charts of embodiments of simulflow (simultaneous flow) operations).

Referring to the embodiments as depicted in FIG. 1 and FIG. 2, equivalents to the controller-executable program 1104 may include (and are not limited to): (A) machine-language code, (B) assembly-language code, and/or (C) source code formed in a high-level computing language understood by humans. The high-level language of the source code is compiled into either an executable machine code file or a non-executable machine-code object file. Other equivalents to the controller-executable program 1104 include: (A) an application-specific integrated circuit and any equivalent thereof, and/or (B) a field-programmable gate array (FPGA) and any equivalent thereof. It will be appreciated that the predetermined controller operations (computing method) include an operating step of computing, using a processor unit (such as, the processor assembly 1106) of the controller assembly (F1), to provide computing functions and/or calculations (comparisons, etc.). Computing hardware and other operating components are utilized and are suitable for performing the computing processes of the embodiments and are not intended to limit the applicable environments. It will be appreciated that the person of skill in the art will immediately appreciate that the embodiments may be practiced with other computer system configurations, including set-top boxes, hand-held devices, multiprocessor systems, microprocessor-based or programmable consumer electronics, network computers, minicomputers, mainframe computers, and the like. The controller assembly (F1) may include, for instance, a processing unit (such as the processor assembly 1106), which may include a conventional microprocessor such as an Intel (TRADEMARK) Pentium (TRADEMARK) microprocessor or Motorola (TRADEMARK) Power PC (TRADEMARK) microprocessor. It will be appreciated that the person of skill in the art will immediately appreciate that the embodiments of the controller assembly (F1) may be practiced with other computer system configurations, including set-top boxes, hand-held devices, multiprocessor systems, microprocessor-based or programmable consumer electronics, network computers, minicomputers, mainframe computers, and the like, etc. The memory assembly 1102 may include (or is called) a computer-readable medium or a machine-readable medium, etc. It will be appreciated that the person of skill in the art will immediately appreciate and recognize that the memory assembly 1102 may include any type of storage device that is accessible by a processor (the processor assembly 1106 or by other data processing systems). The memory assembly 1102 may be embodied on a magnetic hard disk or an optical disk having executable instructions to cause the processor assembly 1106 to perform a computing method (operational steps or computing operations, etc.). Computer hardware (operating components and any equivalent thereof) suitable for performing the processes of the embodiments are not intended to limit the applicable environments.

Referring to the embodiments as depicted in FIG. 1 and FIG. 2, the fluid-distribution assembly (C1) is spaced apart from the first compressed-natural-gas tank 902A of the first compressed-natural-gas-powered vehicle 904A. The first compressed-natural-gas tank 902A, in use, contains a compressed natural gas. The fluid-distribution assembly (C1) is configured to selectively fluidly couple to, and to fluidly decouple from, the first compressed-natural-gas tank 902A. The fluid-distribution assembly (C1) is also configured to selectively fluidly exchange (selectively provide or convey, or selectively receive) the compressed natural gas with the first compressed-natural-gas tank 902A.

Referring to the embodiments as depicted in FIG. 1 and FIG. 2, the controller assembly (F1) is spaced apart from the fluid-distribution assembly (C1). The controller assembly (F1) is electrically connected to the controllable valves of the collection of controllable valves of the fluid-distribution assembly (C1).

Referring to the embodiments as depicted in FIG. 1 and FIG. 2, the controller assembly (F1) is spaced apart from the fluid-distribution assembly (C1) and a compressor assembly (D1). The compressor assembly (D1) is a machine used to supply air or other gas at increased pressure.

The controller assembly (F1) is configured to electrically control, and monitor, the operations of the fluid-distribution assembly (C1) and the compressor assembly (D1).

Referring to the embodiment as depicted in FIG. 1, the fluid-distribution assembly (C1) is also configured to selectively fluidly couple to, and be in fluid communication (either directly or indirectly) with, a fuel storage assembly (E1), in which the fuel storage assembly (E1) is located in a spaced-apart relationship with the fluid-distribution assembly (C1). The fluid-distribution assembly (C1) is also configured to selectively fluidly exchange (selectively provide or convey, selectively receive, selectively recycle, selectively distribute, and/or selectively bidirectional recycling) the compressed natural gas fuel with the fuel storage assembly (E1).

Referring to the embodiment as depicted in FIG. 1 and FIG. 2, the fuel storage assembly (E1) includes a first fuel storage assembly (E1.1) (such as, a low pressure tank), a second fuel storage assembly (E1.2) (such as, a medium pressure tank), and a third fuel storage assembly (E1.3) (such as, a high pressure tank). The fluid-distribution assembly (C1) is also configured to selectively fluidly exchange the compressed fuel (such as, natural gas fuel) with the first fuel storage assembly (E1.1), the second fuel storage assembly (E1.2), and the third fuel storage assembly (E1.3). The fuel storage assembly (E1) may be referred to as a natural gas storage assembly, and any equivalent thereof.

Referring to the embodiment as depicted in FIG. 1 and FIG. 2, the fluid-distribution assembly (C1) is also configured to selectively fluidly couple to, and be in fluid communication (either directly or indirectly) with, a compressor assembly (D1). The compressor assembly (D1) is located in a spaced-apart relationship with the fluid-distribution assembly (C1). The fluid-distribution assembly (C1) is configured to selectively fluidly exchange (selectively provide or convey, or selectively receive) the compressed natural gas fuel with the compressor assembly (D1). Preferably, the compressor assembly (D1) includes a first compressor (D1.1) and a second compressor (D1.2) that is spaced apart from the first compressor (D1.1). The compressor assembly (D1) may be referred to as a natural gas compressor, and any equivalent thereof.

Referring to the embodiment as depicted in FIG. 1, the fluid-distribution assembly (C1) is also configured to selectively fluidly couple to, and be in fluid communication (either directly or indirectly) with, a gas-source connection 117 (leading to a gas source, such as a utility gas line, etc.). The gas-source connection 117 may be referred to as an external gas supply, an external gas source, an installed gas line, etc.). The gas-source connection 117 is located in a spaced-apart relationship with the fluid-distribution assembly (C1). The fluid-distribution assembly (C1) is configured to selectively fluidly receive the compressed natural gas fuel from the gas-source connection 117. Preferably, the gas-source connection 117 is configured to fluidly provide, under pressure, the compressed natural gas fuel to the fluid-distribution assembly (C1) via the compressor assembly (D1).

Referring to the embodiment as depicted in FIG. 1, the fluid-distribution assembly (C1) is also configured to selectively fluidly couple to, and be in fluid communication (either directly or indirectly), with a heat exchanger (Z1). The heat exchanger (Z1) is optional. The heat exchanger (Z1) may be called an air and/or gas heat exchanger, etc., and any equivalent thereof. The fluid-distribution assembly (C1) is configured to selectively fluidly exchange (selectively provide or convey, or selectively receive) the compressed natural gas fuel with the heat exchanger (Z1). The heat exchanger (Z1) is configured to selectively fluidly couple to, and be in fluid communication (either directly or indirectly) with the compressor assembly (D1). The heat exchanger (Z1) is configured to manage thermal energy (add heat to, etc.) of the compressed natural gas fuel that flows between the fluid-distribution assembly (C1) and the compressor assembly (D1), or that flows from the fluid-distribution assembly (C1) to the compressor assembly (D1), etc.

Referring to the embodiment as depicted in FIG. 1, the compressor assembly (D1) is in fluid communication (either directly or indirectly) with a pressure regulator (Z2) (also called a pressure regulator assembly). The pressure regulator (Z2) is configured to regulate the pressure of the compressed natural gas fuel to be received by the compressor assembly (D1). The pressure regulator (Z2) is in fluid communication with the heat exchanger (Z1) (either directly or indirectly).

Referring to the embodiment as depicted in FIG. 1, the fluid-distribution assembly (C1) includes a second defuelling hose 100B. The fluid-distribution assembly (C1) is fluidly connected to, and is in fluid communication with, the second defuelling hose 100B. The fluid-distribution assembly (C1) also includes a second fuelling hose 102B. The fluid-distribution assembly (C1) is fluidly connected to, and is in fluid communication with, a second fuelling hose 102B (also called a second flexible fuelling hose assembly).

Referring to the embodiment as depicted in FIG. 1, the fluid-distribution assembly (C1) is locatable in a spaced-apart relationship with (to) a second compressed-natural-gas tank 902B of a second compressed-natural-gas-powered vehicle 904B, in which the second compressed-natural-gas tank 902B, in use, contains the compressed natural gas. The fluid-distribution assembly (C1) is also configured to selectively fluidly couple to, and fluidly decouple from, the second compressed-natural-gas tank 902B. The fluid-distribution assembly (C1) is also configured to selectively fluidly exchange (selectively provide or convey, or selectively receive) the compressed natural gas with the second compressed-natural-gas tank 902B. The fluid-distribution assembly (C1) is configured to direct the flow (fluid flow) of the compressed-natural-gas fuel between the second compressed-natural-gas tank 902B of the second compressed-natural-gas-powered vehicle 904B and the first compressed-natural-gas tank 902A of the first compressed-natural-gas-powered vehicle 904A.

Referring to the embodiment as depicted in FIG. 1, the fluid-distribution assembly (C1) includes a first defuelling hose 100A (also called a first flexible defuelling hose assembly), and the fluid-distribution assembly (C1) is fluidly connected to, and is in fluid communication with, the first defuelling hose 100A. The fluid-distribution assembly (C1) also includes a first fuelling hose 102A (also called a first flexible fuelling hose assembly), and the fluid-distribution assembly (C1) is fluidly connected to, and is in fluid communication with, the first fuelling hose 102A. The fluid-distribution assembly (C1) is also configured to selectively fluidly receive the compressed natural gas from the first compressed-natural-gas tank 902A (once the first defuelling hose 100A is selectively fluidly coupled to the first compressed-natural-gas tank 902A). The fluid-distribution assembly (C1) is also configured to selectively fluidly provide (convey) the compressed natural gas to the first compressed-natural-gas tank 902A (once the first fuelling hose 102A is selectively fluidly coupled to the first compressed-natural-gas tank 902A). The first defuelling hose 100A is configured to selectively fluidly couple to, and fluidly decouple from, the fuel portal of the first compressed-natural-gas tank 902. The first fuelling hose 102A is configured to selectively fluidly couple to, and fluidly decouple from, the fuel portal of the first compressed-natural-gas tank 902. The first defuelling hose 100A is also configured to selectively fluidly receive the compressed natural gas from the fuel portal of the first compressed-natural-gas tank 902A (once the first defuelling hose 100A is fluidly coupled to the fuel portal and once the first fuelling hose 102A is fluidly decoupled from the fuel portal). The first fuelling hose 102A is configured to selectively fluidly provide the compressed natural gas to the fuel portal of the first compressed-natural-gas tank 902A (once the first fuelling hose 102A is fluidly coupled to the fuel portal and once the first defuelling hose 100A is fluidly decoupled from the fuel portal).

Referring to the embodiment as depicted in FIG. 1, a vent valve 106 (such as a ball valve, etc.) is in fluid communication with the first defuelling hose 100A. The vent valve 106 is also in fluid communication with the atmosphere. The vent valve 106 is configured to selectively vent the contents of the first defuelling hose 100A to atmosphere. The vent valve 106 may be called a ball valve, etc., and any equivalent thereof.

Referring to the embodiment as depicted in FIG. 1, a pressure relief valve (Z3) is fluidly connected to the compressor assembly (D1). The pressure relief valve (Z3) is configured to relieve (remove) excess internal pressure from (of) the compressor assembly (D1).

Referring to the embodiment as depicted in FIG. 1, a skid assembly 120 supports the controller assembly (F1), the fluid-distribution assembly (C1), and the compressor assembly (D1). The skid assembly 120 may be referred to as a CNG fuel recycler skid, a compressed natural gas fuel recycler skid, and any equivalent thereof.

Referring to the embodiment as depicted in FIG. 1, a tubing structure 104 is configured to fluidly connect the components of the apparatus 1100. The tubing structure 104 may be called a stainless steel tubing, etc., and any equivalent thereof.

Referring to the embodiment as depicted in FIG. 1, the fluid-distribution assembly (C1) is configured to be fluidly connected to an auxiliary vehicle defuelling port (G1.14), which is an optional technical feature. The auxiliary vehicle defuelling port (G1.14) is configured to selectively fluidly convey the fluid fuel from the second compressed-natural-gas tank 902B of the second compressed-natural-gas-powered vehicle 904B to the fluid-distribution assembly (C1). Preferably, once the fluid-distribution assembly (C1) receives the fluid fuel from the second compressed-natural-gas tank 902B (via the auxiliary vehicle defuelling port (G1.14)), the fluid-distribution assembly (C1) provides the flow of the fluid fuel (that was received from the second compressed-natural-gas tank 902B) to the first compressed-natural-gas tank 902A (of the first compressed-natural-gas-powered vehicle 904A), thereby bypassing the placement of the fluid fuel in (to) the fuel storage assembly (E1) (if so desired).

Referring to the embodiment as depicted in FIG. 1, the auxiliary vehicle defuelling port (G1.14) is also configured to selectively fluidly convey the fluid fuel from the fluid-distribution assembly (C1) to the second compressed-natural-gas tank 902B of the second compressed-natural-gas-powered vehicle 904B. The fluid-distribution assembly (C1) is configured to selectively fluidly convey the fluid fuel, via the auxiliary vehicle defuelling port (G1.14), from the second compressed-natural-gas tank 902B (of the second compressed-natural-gas-powered vehicle 904B) to the first compressed-natural-gas tank 902A (of the first compressed-natural-gas-powered vehicle 904A). The fluid-distribution assembly (C1) is configured to selectively fluidly convey the fluid fuel, via the auxiliary vehicle defuelling port (G1.14), from the second compressed-natural-gas tank 902B (of the second compressed-natural-gas-powered vehicle 904B) to the first compressed-natural-gas tank 902A (of the first compressed-natural-gas-powered vehicle 904A). The purpose of the auxiliary vehicle defuelling port (G1.14) is to avoid (provide an alternative transfer flow path) the transfer of fluid fuel to and from the fuel storage assembly (E1) and/or to and from the compressor assembly (D1), and/or the gas-source connection 117 (that is, to provide an alternative flow path of fluid fuel).

Referring to the embodiment as depicted in FIG. 1, the fluid-distribution assembly (C1) is configured to receive a flow of fluid fuel from the first compressed-natural-gas tank 902A of the first compressed-natural-gas-powered vehicle 904A. For this case, the fluid-distribution assembly (C1) may selectively convey the flow of fluid fuel to any one of (A) the second compressed-natural-gas tank 902B of the second compressed-natural-gas-powered vehicle 904B, (B) the compressor assembly (D1), or (C) the fuel storage assembly (E1). It will be appreciated that the fluid flow depends on the operations of the controller assembly (F1) (that is, on the execution of preprogrammed operations by the controller assembly (F1); specifically, depending on execution of preprogrammed operations of the controller assembly (F1) for the control of the controllable components of the fluid-distribution assembly).

Referring to the embodiment as depicted in FIG. 1, the fluid-distribution assembly (C1) is configured to receive a flow of fluid fuel from the second compressed-natural-gas tank 902B of the second compressed-natural-gas-powered vehicle 904B, in which case the fluid-distribution assembly (C1), depending on the operation (on the execution of preprogrammed operations) of the controller assembly (F1), may convey the flow of fluid fuel to any one of (A) the first compressed-natural-gas tank 902A of the first compressed-natural-gas-powered vehicle 904A, (B) the compressor assembly (D1), or (C) the fuel storage assembly (E1).

Referring to the embodiment as depicted in FIG. 1, the fluid-distribution assembly (C1) is configured to receive a flow of fluid fuel from the compressor assembly (D1), in which case the fluid-distribution assembly (C1), depending on the operation (on the execution of preprogrammed operations) of the controller assembly (F1), may convey the flow of fluid fuel to any one of (A) the first compressed-natural-gas tank 902A of the first compressed-natural-gas-powered vehicle 904A, (B) the second compressed-natural-gas tank 902B of the second compressed-natural-gas-powered vehicle 904B, or (C) the fuel storage assembly (E1).

Referring to the embodiment as depicted in FIG. 1, the fluid-distribution assembly (C1) is configured to receive a flow of fluid fuel from the fuel storage assembly (E1). For this case, the fluid-distribution assembly (C1), depending on the operation (on the execution of preprogrammed operations) of the controller assembly (F1), may convey the flow of fluid fuel to any one of (A) the first compressed-natural-gas tank 902A of the first compressed-natural-gas-powered vehicle 904A, (B) the second compressed-natural-gas tank 902B of the second compressed-natural-gas-powered vehicle 904B, or (C) the compressor assembly (D1).

Referring to the embodiment as depicted in FIG. 1, the fluid-distribution assembly (C1) is configured to receive a flow of fluid fuel from the gas-source connection 117, in which case the fluid-distribution assembly (C1), depending on the operation (on the execution of preprogrammed operations) of the controller assembly (F1), may convey the flow of fluid fuel to the compressor assembly (D1), and then to any one of (A) the fuel storage assembly (E1), (B) the first compressed-natural-gas tank 902A (of the first compressed-natural-gas-powered vehicle 904A, or (C) the second compressed-natural-gas tank 902B of the second compressed-natural-gas-powered vehicle 904B.

Referring to the embodiment as depicted in FIG. 2, the fluid-distribution assembly (C1) is configured to be placed on, and secured to, the skid assembly 120 (if so desired). The skid assembly 120 is placed on (and/or secured to) a working surface.

Referring to the embodiment as depicted in FIG. 2, the fluid-distribution assembly (C1) is configured to be fluidly connectable (either directly or indirectly) to a defuelling station (B-1). The defuelling station (B-1) is configured to selectively defuel (remove fluid fuel) from the first compressed-natural-gas tank 902A (of the first compressed-natural-gas-powered vehicle 904A, as depicted in FIG. 1).

Referring to the embodiment as depicted in FIG. 2, the defuelling station (B-1) includes a defuelling valve (C3.1). The defuelling valve (C3.1) is configured to selectively control (shut off or turn on) the flow of fluid fuel between the fluid-distribution assembly (C1) and the components of the defuelling station (B-1). For instance, the defuelling valve (C3.1) includes, preferably, a one-way valve, a ball valve, etc., and any equivalent thereof. The defuelling valve (C3.1) is configured to be opened and closed by pressure applied on a ball that fits into a cup-shaped opening, etc.

Referring to the embodiment as depicted in FIG. 2, the defuelling station (B-1) further includes a defuelling nozzle (B1.1) configured to be selectively fluidly connectable (either directly or indirectly) to (and disconnectable from) a compressed-natural-gas tank (such as, the first compressed-natural-gas tank 902A of the first compressed-natural-gas-powered vehicle 904A, as depicted in FIG. 1).

Referring to the embodiment as depicted in FIG. 2, the defuelling station (B-1) further includes a defuelling tube (B2.1) fluidly connected to the defuelling nozzle (B1.1). The defuelling tube (B2.1) fluidly connects the defuelling nozzle (B1.1) to the defuelling valve (C3.1).

Referring to the embodiment as depicted in FIG. 2, the defuelling station (B-1) further includes a bypass defuelling valve (B3.1). The bypass defuelling valve (B3.1) is fluidly connected to the defuelling valve (C3.1) and the defuelling tube (B2.1). The bypass defuelling valve (B3.1) is provided for maintenance of the defuelling station (B-1).

Referring to the embodiment as depicted in FIG. 2, the defuelling station (B-1) further includes a defuelling line (B4.1) fluidly connected to the defuelling nozzle (B1.1). The defuelling nozzle (B1.1) is provided for maintenance of the defuelling station (B-1).

Referring to the embodiment as depicted in FIG. 2, the fluid-distribution assembly (C1) is configured to be fluidly connectable (either directly or indirectly) to a refuelling station (B-2). The refuelling station (B-2) is configured to provide fuel to the first compressed-natural-gas tank 902A (of the first compressed-natural-gas-powered vehicle 904A, as depicted in FIG. 1).

Referring to the embodiment as depicted in FIG. 2, the refuelling station (B-2) includes a refuelling valve (C3.2). The refuelling valve (C3.2) includes, preferably, a one-way valve, a ball valve, etc., and any equivalent thereof. The refuelling valve (C3.2) is configured to selectively control (shut off or turn on) the flow of fluid fuel between the fluid-distribution assembly (C1) and the components of the refuelling station (B-2).

Referring to the embodiment as depicted in FIG. 2, the refuelling station (B-2) further includes a refuelling nozzle (B1.2) configured to be selectively fluidly connectable (either directly or indirectly) to (and disconnectable from) a compressed-natural-gas tank (such as, the first compressed-natural-gas tank 902A of the first compressed-natural-gas-powered vehicle 904A, as depicted in FIG. 1).

Referring to the embodiment as depicted in FIG. 2, the refuelling station (B-2) further includes a refuelling hose (B2.2) configured to be fluidly connectable (either directly or indirectly) to the refuelling nozzle (B1.2).

Referring to the embodiment as depicted in FIG. 2, the refuelling station (B-2) further includes a refuelling valve (B3.2). The refuelling valve (B3.2) is fluidly connectable (either directly or indirectly) to the refuelling valve (C3.2) and to the refuelling hose (B2.2). The refuelling valve (B3.2) is provided for maintenance purposes.

Referring to the embodiment as depicted in FIG. 2, the refuelling station (B-2) further includes a refuelling line (B4.2). The refuelling line (B4.2) is provided for maintenance purposes.

Referring to the embodiment as depicted in FIG. 2, the fluid-distribution assembly (C1) includes at least one emergency stop, such as a first emergency stop (C2.1) and/or a second emergency stop (C2.2). The emergency stop is configured to shut down the operations of (at least a part of, or preferably all of, the operations of) the components of the apparatus 1100 and/or the fluid-distribution assembly (C1).

Referring to the embodiment as depicted in FIG. 2, the fluid-distribution assembly (C1) is configured to be fluidly connected to (in fluid communication with) an auxiliary vehicle defuelling port (G1.14), which is an optional technical feature. The auxiliary vehicle defuelling port (G1.14) is also depicted in the embodiment of FIG. 1. The auxiliary vehicle defuelling port (G1.14) is configured to selectively fluidly convey the fluid fuel from the second compressed-natural-gas tank 902B of the second compressed-natural-gas-powered vehicle 904B to the fluid-distribution assembly (C1). Preferably, once the fluid-distribution assembly (C1) receives the fluid fuel from the second compressed-natural-gas tank 902B (via the auxiliary vehicle defuelling port (G1.14)), the fluid-distribution assembly (C1) provides the flow of the fluid fuel (that was received from the second compressed-natural-gas tank 902B) to the first compressed-natural-gas tank 902A (of the first compressed-natural-gas-powered vehicle 904A), thereby bypassing the placement of the fluid fuel in (to) the fuel storage assembly (E1) (if so desired).

Referring to the embodiment as depicted in FIG. 2, the fluid-distribution assembly (C1) is configured to be fluidly connectable (either directly or indirectly) to a first storage valve (C4.1), a second storage valve (C4.2) and a third storage valve (C4.3).

Referring to the embodiment as depicted in FIG. 2, the first storage valve (C4.1) is fluidly connectable (either directly or indirectly) to the third fuel storage assembly (E1.3) of the fuel storage assembly (E1). The third fuel storage assembly (E1.3) may include a relatively higher pressure storage tank. The first storage valve (C4.1) is configured to selectively control (shut off or turn on) the flow of fluid fuel between the fluid-distribution assembly (C1) and the third fuel storage assembly (E1.3).

Referring to the embodiment as depicted in FIG. 2, the second storage valve (C4.2) is fluidly connectable (either directly or indirectly) to the second fuel storage assembly (E1.2) of the fuel storage assembly (E1). The second fuel storage assembly (E1.2) may include a medium pressure storage tank. The second storage valve (C4.2) is configured to selectively control (shut off or turn on) the flow of fluid fuel between the fluid-distribution assembly (C1) and the second fuel storage assembly (E1.2).

Referring to the embodiment as depicted in FIG. 2, the third storage valve (C4.3) is fluidly connectable (either directly or indirectly) to the first fuel storage assembly (E1.1) of the fuel storage assembly (E1). The first fuel storage assembly (E1.1) may include a relatively lower pressure storage tank. The third storage valve (C4.3) is configured to selectively control (shut off or turn on) the flow of fluid fuel between the fluid-distribution assembly (C1) and the first fuel storage assembly (E1.1).

Referring to the embodiment as depicted in FIG. 2, it will be appreciated that the controllable valve (E1.4) is utilized for interfacing and fluidly connecting the components of the fuel storage assembly (E1) to the first storage valve (C4.1), the second storage valve (C4.2) and the third storage valve (C4.3). The controllable valve (E1.4) may be fluidly connected to a vent, etc., for safety purposes (if required for safety purposes).

Referring to the embodiment as depicted in FIG. 2, the fluid-distribution assembly (C1) is configured to be fluidly connectable (either directly or indirectly) to a vent stack (C6). The vent stack (C6) may include a tube with a gooseneck configuration. The vent stack (C6) is configured to vent unwanted airborne fluid fuel from the interior of the fluid-distribution assembly (C1).

Referring to the embodiment as depicted in FIG. 2, the fluid-distribution assembly (C1) is configured to be fluidly connectable (either directly or indirectly) to a drain valve (C5), with an additional vent connection to the atmosphere (for safety purposes). The drain valve (C5) is configured to fluidly convey unwanted fluid fuel (spilled fuel or leaking fuel) from the interior of the fluid-distribution assembly (C1) (for safety purposes).

Referring to the embodiment as depicted in FIG. 2, the fluid-distribution assembly (C1) is configured to be fluidly connectable (either directly or indirectly) to an indoor defuelling connection (C1.5). The purpose of the indoor defuelling connection (C1.5) is to provide fluid fuel flow from indoor defuelling equipment (an indoor fuel port, a port for indoor defuelling of a vehicle) to the fluid-distribution assembly (C1). The indoor defuelling connection (C1.5) is configured to be fluidly connectable (either directly or indirectly) to an indoor defuelling subassembly (C1.10), which is depicted in the embodiment of FIG. 4B. An indoor refuelling valve (C3.3) is interposed between the indoor defuelling connection (C1.5) and the fluid-distribution assembly (C1). The indoor refuelling valve (C3.3) may be shut off to isolate the fluid-distribution assembly (C1) from any indoor fuelling equipment (as needed, for maintenance purposes, etc.).

Referring to the embodiment as depicted in FIG. 2, the fluid-distribution assembly (C1) is configured to be fluidly connected (either directly or indirectly) to an input compressor connection (C1.2) (the connection may be called a portal, etc.). The input compressor connection (C1.2) is configured to convey (either directly or indirectly) a flow a fluid fuel from the fluid-distribution assembly (C1) to the compressor assembly (D1).

Referring to the embodiment as depicted in FIG. 2, the fluid-distribution assembly (C1) is configured to be fluidly connected (either directly or indirectly) to an output compressor connection (C1.3). The output compressor connection (C1.3) is configured to convey (either directly or indirectly) fluid flow (flow of fluid fuel) from the compressor assembly (D1) to the fluid-distribution assembly (C1).

Referring to the embodiment as depicted in FIG. 2, the fluid-distribution assembly (C1) is configured to be fluidly connectable (either directly or indirectly) to a compressor assembly (D1). The compressor assembly (D1) is configured to provide added assistance in moving the flow of fluid fuel via the fluid-distribution assembly (C1), when needed. In accordance with a preferred embodiment, the compressor assembly (D1) includes (and is not limited to) a first compressor (D1.1) and a second compressor (D1.2), etc. The first compressor (D1.1) includes a first emergency stop (D2.1). Preferably, the first emergency stop (D2.1) is configured to stop operation of the apparatus 1100 (when actuated). The second compressor (D1.2) includes a second emergency stop (D2.2). Preferably the second emergency stop (D2.2) is configured to stop operation of the apparatus 1100 (when actuated). The first compressor (D1.1) and the second compressor (D1.2) are fluidly connected to a vent (for safety purposes).

Referring to the embodiment as depicted in FIG. 2, the input compressor connection (C1.2) is fluidly connected to a heat exchanger (Z1). The heat exchanger (Z1) is configured to manage the thermal energy of the fluid flowing through the input compressor connection (C1.2). The heat exchanger (Z1) is fluidly connected to a pressure regulator (Z2). The pressure regulator (Z2) is fluidly connected to a pressure relief valve (Z3). The pressure regulator (Z2) is configured to relieve the over pressure associated with the fluid flowing through the input compressor connection (C1.2). The pressure relief valve (Z3), which is a safety device, is fluidly connected to a vent. The pressure relief valve (Z3) is fluidly connected to (the input side of) the compressor assembly (D1).

Referring to the embodiment as depicted in FIG. 2, the pressure regulator (Z2) is also fluidly connected to the first compressor (D1.1). Preferably, the pressure regulator (Z2) is also fluidly connected to a first strainer (D6.1). The first strainer (D6.1) is configured to strain (filter) the flow of fluid fuel flowing through the first strainer (D6.1). The first strainer (D6.1) is fluidly connected to a first bleed valve (D5.1). The first bleed valve (D5.1) is fluidly connected to a first input valve (D4.1). The first input valve (D4.1) is fluidly connected to a first venting valve (D3.1). The first input valve (D4.1) is also fluidly connected to an input of the first compressor (D1.1). The output of the first compressor (D1.1) is fluidly connected to a first output valve (D7.1). The first output valve (D7.1) is fluidly connected (directly or indirectly) to the output compressor connection (C1.3).

Referring to the embodiment as depicted in FIG. 2, the pressure regulator (Z2) is also fluidly connected to an input of the second compressor (D1.2). Preferably, the pressure regulator (Z2) is also fluidly connected to a second strainer (D6.2). The second strainer (D6.2) is fluidly connected to a second bleed valve (D5.2). The second bleed valve (D5.2) is fluidly connected to a second input valve (D4.2). The second input valve (D4.2) is fluidly connected to a second venting valve (D3.2). The second venting valve (D3.2) is connected to a drain. The second input valve (D4.2) is also fluidly connected to an input of the second compressor (D1.2). The output of the second compressor (D1.2) is fluidly connected to a second output valve (D7.2). The second output valve (D7.2) is fluidly connected (directly or indirectly) to the output compressor connection (C1.3).

Referring to the embodiment as depicted in FIG. 2, the fluid-distribution assembly (C1) is in electrical communication with the controller assembly (F1) (either directly or indirectly, and either through wireless communication and/or wired communication). The controller assembly (F1) may include a power section (F2). The controller assembly (F1) may include a controller section (F3). The controller assembly (F1) may include a communications section (F4).

Referring to the embodiment as depicted in FIG. 3, an indoor defuelling system (G1) of FIG. 3 is configured to be fluidly connectable to the fluid-distribution assembly (C1), as depicted in FIG. 2, via the indoor defuelling connection (C1.5), which is also depicted in FIG. 2. The indoor defuelling system (G1) is an optional technical feature. The indoor defuelling system (G1) is vented to the atmosphere (for safety purposes). The indoor defuelling system (G1) includes a connection (G4) (also called a portal or fluid portal, etc.) configured to be fluidly connectable (either directly or indirectly) to the indoor defuelling connection (C1.5) of the fluid-distribution assembly (C1) of FIG. 2.

Referring to the embodiment as depicted in FIG. 3, the indoor defuelling system (G1) includes a portable defuelling hose (G3). The portable defuelling hose (G3) may be movable from service bay to service bay (as needed). The portable defuelling hose (G3) includes a coupler (G1.1). The coupler (G1.1) is configured to connect to the first compressed-natural-gas tank 902A (of the first compressed-natural-gas-powered vehicle 904A, as depicted in FIG. 1).

The coupler (G1.1) is connected to one end of a flexible hose (G1.2), and the flexible hose (G1.2) extends from the coupler (G1.1). A hose coupler (G1.3) is connected to another end of the flexible hose (G1.2). The hose coupler (G1.3) may include a female coupler with a poppet valve, etc.

Referring to the embodiment as depicted in FIG. 3, the indoor defuelling system (G1) further includes a defuel receptacle (G2). Preferably, there is a single defuel receptacle per service bay of the vehicle repair facility. The defuel receptacle (G2) includes a hose coupler (G1.4.1). The hose coupler (G1.4.1), preferably, includes a male connector with a poppet valve, etc. The hose coupler (G1.4.1) is connected to a bleed valve (G1.5.1). The bleed valve (G1.5.1) is connected to a drain (or vent). The hose coupler (G1.4.1) is also connected to a valve (G1.6.1). The valve (G1.6.1), or control valve, is connected to a check valve (G1.7.1). The check valve (G1.7.1) is connected to a tube (G1.9). The check valve (G1.7.1) is connected to a pressure gage (G1.8), via the tube (G1.9). The check valve (G1.7.1) is connected to the connection (G4).

Referring to the embodiment as depicted in FIG. 3, the indoor defuelling system (G1) may include several instances, such as an nth instance of the hose coupler (G1.4.$n$), an nth instance of the bleed valve (G1.5.$n$), an nth instance of the ball valve (G1.6.$n$), and an nth instance of the check valve (G1.7$n$).

Referring to the embodiment as depicted in FIG. 3, the indoor defuelling system (G1) further includes an emergency stop (G1.10). Actuation of the emergency stop (G1.10) stops operation of the components of the indoor defuelling system (G1). For instance, actuation of the emergency stop (G1.10) closes a twelfth controllable valve (C9.12), which is depicted in FIG. 4B. For instance, actuation of the emergency stop (G1.10) opens a thirteenth controllable valve (C9.13), which is depicted in FIG. 4B.

Referring to the embodiment as depicted in FIG. 3, the indoor defuelling system (G1) further includes a status beacon (G1.11). The status beacon (G1.11) is configured to indicate the present status of the apparatus 1100 (such as, a visual indicator to indicate that all systems are good, etc.).

Referring to the embodiment as depicted in FIG. 3, the indoor defuelling system (G1) further includes a start switch (G1.12). Activation of the start switch (G1.12) opens the twelfth controllable valve (C9.12), which is depicted in FIG. 4B.

Referring to the embodiment as depicted in FIG. 3, the indoor defuelling system (G1) further includes a gas detector (G1.13). The gas detector (G1.13) is configured to detect the unwanted emission of fluid fuel in the air, and to transmit a signal to the controller assembly (F1), and the controller assembly (F1) issues appropriate control signals in response to the detection of unwanted leakages as detected by the gas detector (G1.13).

Referring to the embodiment as depicted in FIG. 4A, the fluid-distribution assembly (C1) includes an emergency stop, such as, a first emergency stop (C2.1) and a second emergency stop (C2.2). The first emergency stop (C2.1) and the second emergency stop (C2.2) are utilized to stop the operations of at least one or more components (preferably, all of the components) of the apparatus 1100.

Referring to the embodiment as depicted in FIG. 4A, the fluid-distribution assembly (C1) further includes a defuelling-post connection (C1.1) (the connection may be called a portal, etc.). The defuelling-post connection (C1.1) is configured to receive a flow of fluid fuel from a defuelling post of the defuelling station (B-1) (which is depicted in FIG. 2).

The defuelling-post connection (C1.1) is connected to the defuelling valve (C3.1). Preferably, the defuelling valve (C3.1) includes a one-way valve, a ball valve, a one-way valve that is opened and closed by pressure on a ball, and the ball fits into a cup-shaped opening, etc. The defuelling valve (C3.1) is connected to a second pressure gauge (C7.2). The defuelling valve (C3.1) is also connected to a second pressure transmitter (C8.2). The defuelling valve (C3.1) is also connected to a twelfth control valve (C11.12). The defuelling valve (C3.1) is also connected to a second controllable valve (C9.2). The first control valve (C11.1) is configured to be controllable by the controller assembly (F1), etc.

Referring to the embodiment as depicted in FIG. 4A, the fluid-distribution assembly (C1) further includes an input compressor connection (C1.2) (the connection may be called a portal, etc.). The input compressor connection (C1.2) is configured to selectively provide a flow of fluid fuel from the compressor assembly (D1), which is depicted in FIG. 2. The input compressor connection (C1.2) is connected to a first control valve (C11.1). The first control valve (C11.1) may be controllable by the controller assembly (F1). The input compressor connection (C1.2) is also connected to a third pressure gauge (C7.3). The input compressor connection (C1.2) is also connected to a pressure relief valve (C12). A relief valve or pressure relief valve (PRV) is a type of safety valve used to control or limit the pressure in a system.

The input compressor connection (C1.2) is connected to a pressure regulator (C13). A pressure regulator is a control valve that reduces the input pressure of a fluid to a desired value at its output. The pressure regulator (C13) is also connected to a second control valve (C11.2). The second control valve (C11.2) may be controllable by the controller assembly (F1). The pressure regulator (C13) is also connected to a first check valve (C10.1). The second control valve (C11.2) is connected to a fourth controllable valve (C9.4). The second control valve (C11.2) is also connected to a fifth controllable valve (C9.5). A check value is configured to close to prevent backward flow of liquid (a fluid).

Referring to the embodiment as depicted in FIG. 4A, the fluid-distribution assembly (C1) includes a collection of controllable valves. Each of the controllable valves is configured to be electrically connected to the controller assembly (F1). The controllable valves are configured to be controllable by the controller assembly (F1) in accordance to a series of predetermined controller-executable instructions.

Referring to the embodiment as depicted in FIG. 4A, the fluid-distribution assembly (C1) includes a collection of sensors (transducers). The sensors may include a pressure sensor, such as a pressure transmitter, etc. Each sensor is configured to transmit (convey) a measure parameter (such as, a pressure measurement) to the controller assembly (F1). The controller assembly (F1) receives and utilizes the parameters measured by the sensors (in accordance to a series of predetermined controller-executable instructions) for the control of the operations (the modes of operation) of the apparatus 1100 and/or the fluid-distribution assembly (C1) (for instance, by controlling the controllable valves of the fluid-distribution assembly (C1), and/or by receiving signals via the HMI or the human machine interface).

Referring to the embodiment as depicted in FIG. 4A, the fluid-distribution assembly (C1) further includes an output compressor connection (C1.3) (the connection may be called a portal, etc.). The output compressor connection (C1.3) is configured to convey a flow of fluid fuel from the compressor assembly (D1) to the fluid-distribution assembly (C1). The output compressor connection (C1.3) is connected to a fourth pressure gauge (C7.4). The output compressor connection (C1.3) is also connected to a ninth controllable valve (C9.9). The ninth controllable valve (C9.9) is connected to a third check valve (C10.3). The third control valve (C11.3) may be controllable by the controller assembly (F1). The third check valve (C10.3) is connected to a tenth controllable valve (C9.10). The third check valve (C10.3) is also connected to a fourth control valve (C11.4). The fourth control valve (C11.4) may be controllable by the controller assembly (F1). The third check valve (C10.3) is also connected to an eleventh controllable valve (C9.11). The tenth controllable valve (C9.10) is connected to the sixth controllable valve (C9.6). The sixth controllable valve (C9.6) is connected to a fifth control valve (C11.5). The fifth control valve (C11.5) may be controllable by the controller assembly (F1). The fifth control valve (C11.5) is connected to the vent stack (C6). The vent stack (C6) includes a tube with a gooseneck configuration and a bulkhead fitting, etc. The sixth controllable valve (C9.6) is also connected to a sixth control valve (C11.6). The sixth control valve (C11.6) may be controllable by the controller assembly (F1). The output compressor connection (C1.3) is connected to an eighth controllable valve (C9.8). The eighth controllable valve (C9.8) is connected to a second check valve (C10.2). The second check valve (C10.2) is connected to a seventh control valve (C11.7). The seventh control valve (C11.7) may be controllable by the controller assembly (F1). The output compressor connection (C1.3) is connected to a third control valve (C11.3). The third control valve (C11.3) may be controllable by the controller assembly (F1).

Referring to the embodiment as depicted in FIG. 4A, the fluid-distribution assembly (C1) further includes a refuelling connection (C1.4) (the connection may be called a portal, etc.). The refuelling connection (C1.4) is configured to provide a flow of fluid fuel to the refuelling station (B-2) (as depicted in FIG. 2). The refuelling connection (C1.4) includes a refuelling valve (C3.2), which is also depicted in FIG. 2. The refuelling connection (C1.4) is connected to an eighth control valve (C11.8). The eighth control valve (C11.8) may be controllable by the controller assembly (F1). The refuelling connection (C1.4) is also connected to a first pressure gauge (C7.1). The refuelling connection (C1.4) is also connected to a first pressure transmitter (C8.1). The refuelling connection (C1.4) is also connected to a first controllable valve (C9.1).

Referring to the embodiment as depicted in FIG. 4A, the fluid-distribution assembly (C1) further includes a vent stack (C6). The vent stack (C6) is connected to the tubing structure (C1.11). The vent stack (C6) is connected to the fifth control valve (C11.5). The first pressure gauge (C7.1) is an example of a sensor configured to be electrically connectable to the controller assembly (F1). The controller assembly (F1) is configured to receive and to read the measurement provided by the first pressure gauge (C7.1), etc. The first pressure transmitter (C8.1) is an example of a sensor configured to be electrically connectable to the controller assembly (F1). The controller assembly (F1) is configured to receive and to read the measurement provided by the first pressure transmitter (C8.1).

Referring to the embodiment as depicted in FIG. 4A, the fluid-distribution assembly (C1) is configured to be connected to a drain valve (C5). The drain valve (C5) is connected to a vent (C1.9).

Referring to the embodiment as depicted in FIG. 4A, the fluid-distribution assembly (C1) is configured to connect to a fuel-storage connection 123. The fuel-storage connection 123 is configured to convey the flow of fluid fuel between the fluid-distribution assembly (C1) and the fuel storage assembly (E1). Preferably, the fuel-storage connection 123 is bidirectional (may accommodate a bidirectional fluid flow).

Referring to the embodiment as depicted in FIG. 4A, the fuel-storage connection 123 includes a first storage connection (C1.6) (the connection may be called a portal, etc.) for the first fuel storage assembly (E1.1). The first storage connection (C1.6) is configured to be fluidly connected to the first fuel storage assembly (E1.1). The first storage connection (C1.6) is connected to a third storage valve (C4.3). The third storage valve (C4.3) is connected to a ninth control valve (C11.9). The ninth control valve (C11.9) may be controllable by the controller assembly (F1). The third storage valve (C4.3) is also connected to a third controllable valve (C9.3). The third storage valve (C4.3) is also connected to a seventh pressure gauge (C7.7). The third storage valve (C4.3) is also connected to a fifth pressure transmitter (C8.5).

Referring to the embodiment as depicted in FIG. 4A, the fuel-storage connection 123 also includes a second storage connection (C1.7) (the connection may be called a portal, etc.) for the second fuel storage assembly (E1.2). The second storage connection (C1.7) is connected to a second storage valve (C4.2). The second storage valve (C4.2) is connected to a tenth control valve (C11.10). The tenth control valve (C11.10) may be controllable by the controller assembly (F1). The second storage valve (C4.2) is also connected to a second storage valve (C4.2). The second storage valve (C4.2) is also connected to a seventh controllable valve (C9.7). The second storage valve (C4.2) is also connected to a sixth pressure gauge (C7.6). The second storage valve (C4.2) is also connected to a fourth pressure transmitter (C8.4).

Referring to the embodiment as depicted in FIG. 4A, the fuel-storage connection 123 also includes a third storage connection (C1.8) (the connection may be called a portal, etc.) for a third fuel storage assembly (E1.3). The third storage connection (C1.8) is connected to a first storage valve (C4.1). The first storage valve (C4.1) is connected to an eleventh control valve (C11.11). The eleventh control valve (C11.11) may be controllable by the controller assembly (F1). The first storage valve (C4.1) is also connected to a fifth pressure gauge (C7.5). The first storage valve (C4.1) is also connected to a third pressure transmitter (C8.3). The first storage valve (C4.1) is also connected to an eleventh controllable valve (C9.11).

Referring to FIG. 4A, in accordance with a first operation mode of the fluid-distribution assembly (C1), the defuelling-post connection (C1.1) is configured to receive a flow of fluid fuel from the defuelling station (B-1) of FIG. 2. Depending on the state of the controllable valves (either the ON state or the OFF state, as set or controlled by the controller assembly (F1), the fluid fuel received from the defuelling station (B-1) of FIG. 2 may selectively flow from the defuelling-post connection (C1.1) to any one of: (A) the fuel storage assembly (E1) via the fuel-storage connection 123; and (B) the compressor assembly (D1) via the input compressor connection (C1.2); and (C) the refuelling connection (C1.4) (that is, to the tank of a vehicle that is fluidly connected to the refuelling connection (C1.4)). Sensors or detectors may be utilized by the controller assembly (F1) to assist in setting the state of the controllable valves of the fluid-distribution assembly (C1).

Referring to FIG. 4A, in accordance with a second operation mode of the fluid-distribution assembly (C1), the refuelling connection (C1.4) is configured to provide a flow of fluid fuel to the refuelling station (B-2) (as depicted in FIG. 2). Depending on the state of the controllable valves (either the ON state or the OFF state, as set or controlled by the controller assembly (F1), the fluid fuel to be provided to the refuelling station (B-2) of FIG. 2 may selectively flow to the defuelling-post connection (C1.1) from any one of: (A) the fuel storage assembly (E1) via the fuel-storage connection 123; and (B) the compressor assembly (D1) via the input compressor connection (C1.2); and (C) the defuelling-post connection (C1.1) (that is, from the tank of a vehicle that is fluidly connected to the defuelling-post connection (C1.1). Sensors or detectors may be utilized by the controller assembly (F1) to assist in setting the state of the controllable valves of the fluid-distribution assembly (C1).

Referring to FIG. 4A, in accordance with a third operation mode of the fluid-distribution assembly (C1), the fuel-storage connection 123 is configured to convey the flow of fluid fuel between the fluid-distribution assembly (C1) and the fuel storage assembly (E1). It will be appreciated that the conveyance of the flow of fluid fuel depends on the state of the controllable valves (either the ON state or the OFF state, as set or controlled by the controller assembly (F1). The fluid fuel to be exchanged with the fuel storage assembly (E1), via the fuel-storage connection 123, may selectively flow between the fluid-distribution assembly (C1) and any one of: (A) the first fuel storage assembly (E1.1) via the first storage connection (C1.6); and (B) the second fuel storage assembly (E1.2) via the second storage connection (C1.7); and (C) the third fuel storage assembly (E1.3) via the third storage connection (C1.8). Sensors or detectors may be utilized by the controller assembly (F1) to assist in setting the state of the controllable valves of the fluid-distribution assembly (C1).

Referring to FIG. 4A, in accordance with a fourth operation mode of the fluid-distribution assembly (C1), the input compressor connection (C1.2) is configured to convey (either directly or indirectly) a flow of fluid fuel from the fluid-distribution assembly (C1) to a compressor assembly (D1). The output compressor connection (C1.3) is configured to convey (either directly or indirectly) a fluid flow (flow of fluid fuel) from the compressor assembly (D1) to the fluid-distribution assembly (C1). Depending on the state of the controllable valves (either the ON state or the OFF state, as set or controlled by the controller assembly (F1), the fluid fuel to be exchanged with the compressor assembly (D1), via the input compressor connection (C1.2) or the output compressor connection (C1.3). Sensors or detectors may be utilized by the controller assembly (F1) to assist in setting the state of the controllable valves of the fluid-distribution assembly (C1).

Referring to the embodiment as depicted in FIG. 4B, the fluid-distribution assembly (C1) further includes an indoor defuelling subassembly (C1.10). The indoor defuelling subassembly (C1.10) is an optional technical feature. The indoor defuelling subassembly (C1.10) includes the defuelling-post connection (C1.1). The defuelling-post connection (C1.1) is configured to receive a flow of fluid fuel from the defuelling station (B-1) of FIG. 2.

Preferably, the defuelling-post connection (C1.1) is configured to provide (convey) a flow of fluid fuel from the defuelling valve (C3.1) of the defuelling station (B-1) of FIG. 2.

Referring to the embodiment as depicted in FIG. 4B, the indoor defuelling subassembly (C1.10) includes a fourteenth controllable valve (C9.14). The fourteenth controllable valve (C9.14) is connected to the defuelling valve (C3.1). The fourteenth controllable valve (C9.14) is also connected to the second pressure gauge (C7.2) (which is also depicted in FIG. 4A). The fourteenth controllable valve (C9.14) is also connected to the second pressure transmitter (C8.2). The fourteenth controllable valve (C9.14) is also connected to the twelfth control valve (C11.12). The twelfth control valve (C11.12) may be controllable by the controller assembly (F1).

Referring to the embodiment as depicted in FIG. 4B, the indoor defuelling subassembly (C1.10) further includes a fourth check valve (C10.4) connected to the fourteenth controllable valve (C9.14). The fourth check valve (C10.4) is connected to the thirteenth controllable valve (C9.13). The thirteenth controllable valve (C9.13) is connected to an eighth pressure gauge (C7.8). The thirteenth controllable valve (C9.13) is also connected to a twelfth controllable valve (C9.12).

Referring to the embodiment as depicted in FIG. 4B, the indoor defuelling subassembly (C1.10) further includes a thirteenth control valve (C11.13) connected to the thirteenth controllable valve (C9.13). The thirteenth control valve (C11.13) may be controllable by the controller assembly (F1). The thirteenth control valve (C11.13) is connected to the vent stack (C6) via the tubing structure (C1.11). The twelfth controllable valve (C9.12) is connected to the refuelling valve (C3.3). The refuelling valve (C3.3) is connected to the indoor defuelling connection (C1.5) of FIG. 2 (or FIG. 1, etc.).

Referring to FIG. 4B, in accordance with a fifth operation mode of the fluid-distribution assembly (C1), the fluid-distribution assembly (C1) is configured to be fluidly connectable (either directly or indirectly) to an indoor defuelling connection (C1.5) (the connection may be called a portal, etc.). The purpose of the indoor defuelling connection (C1.5) is to provide fluid fuel flow from the indoor defuelling system (G1), as depicted in FIG. 3, to the fluid-distribution assembly (C1), once the controller assembly (F1) has set the states of the controllable valves of the fluid-distribution assembly (C1) accordingly.

Figure 5A:
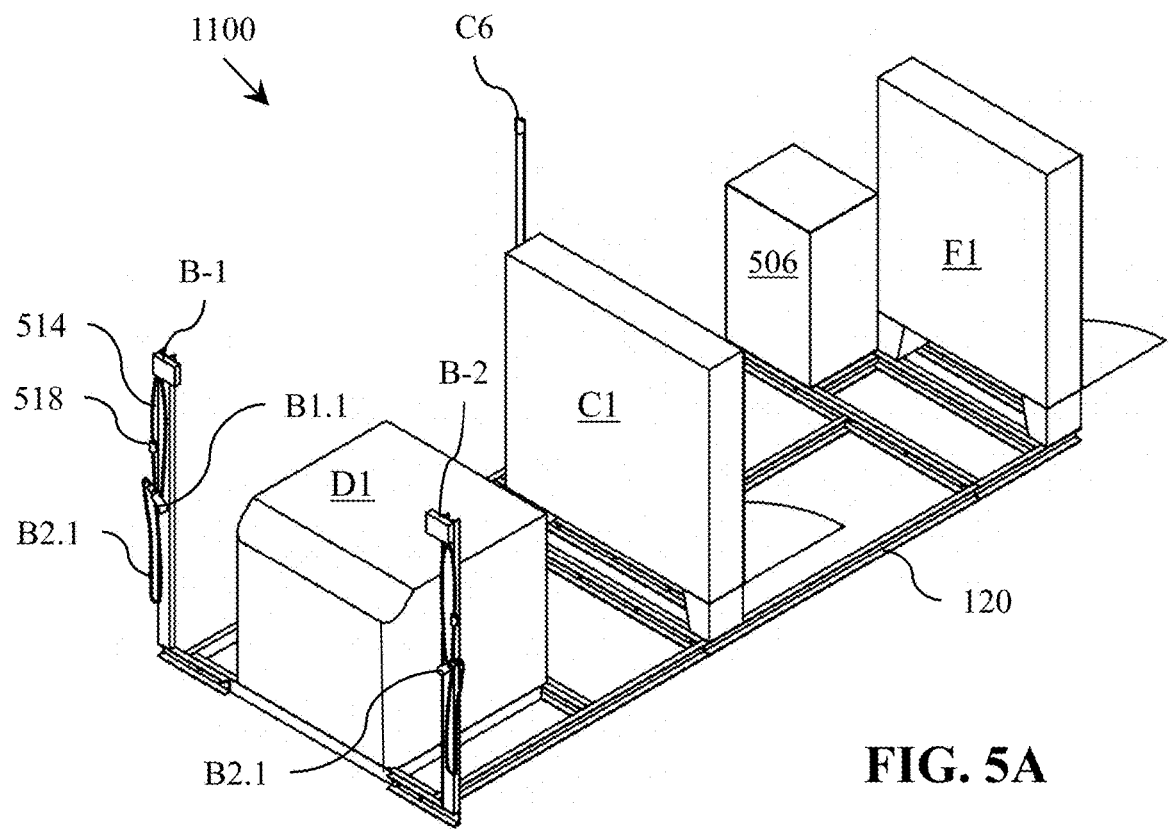
FIG. 5A (an isometric view), FIG. 5B (a plan view), FIG. 5C (a side elevation view) and FIG. 5D (an end elevation view) depict embodiments of the apparatus of FIG. 1.
Figure 5B:
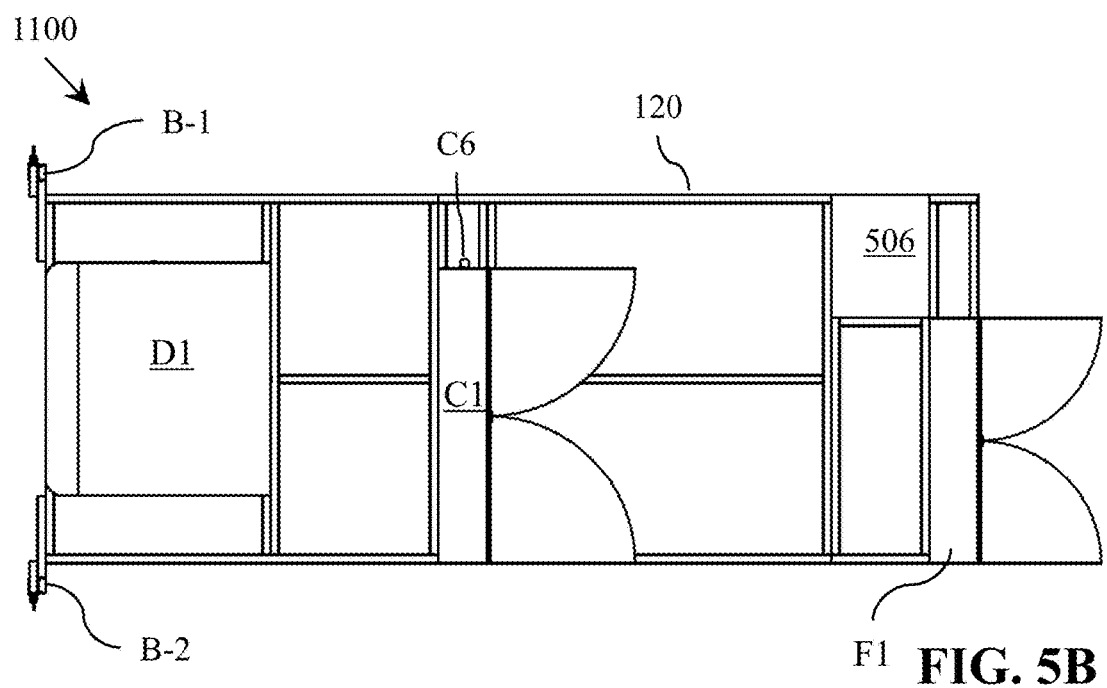
Figure 5C:
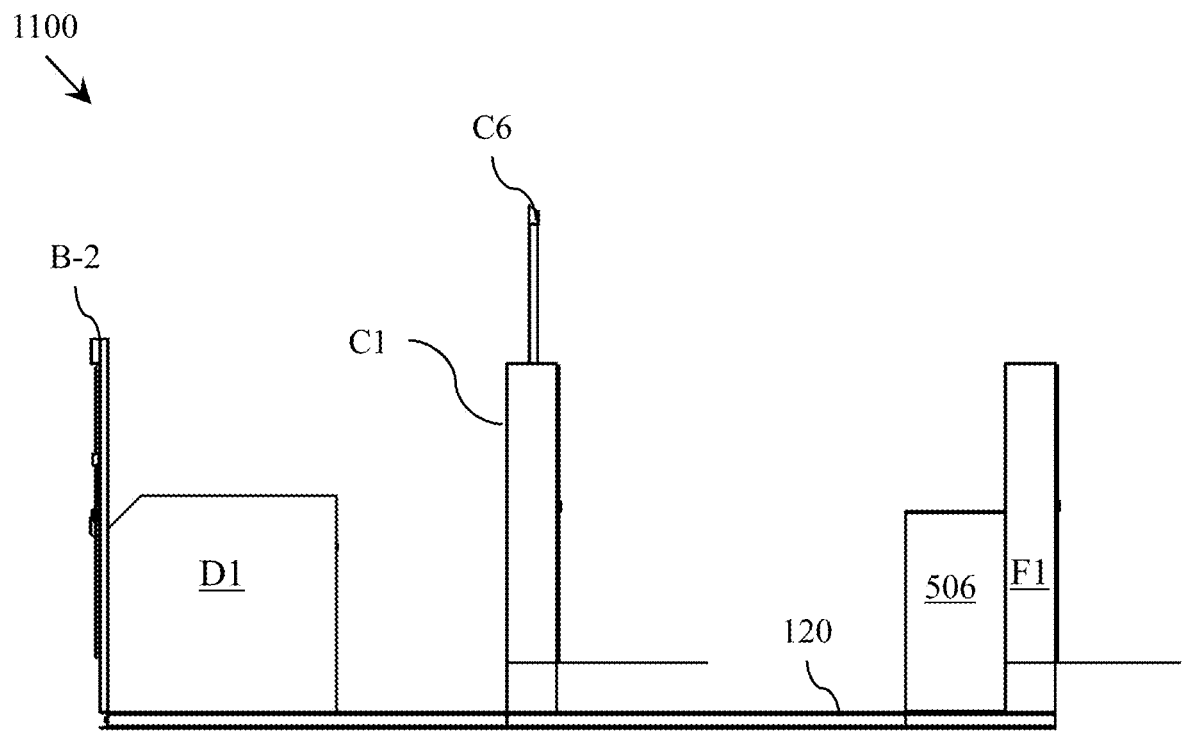
Figure 5D:
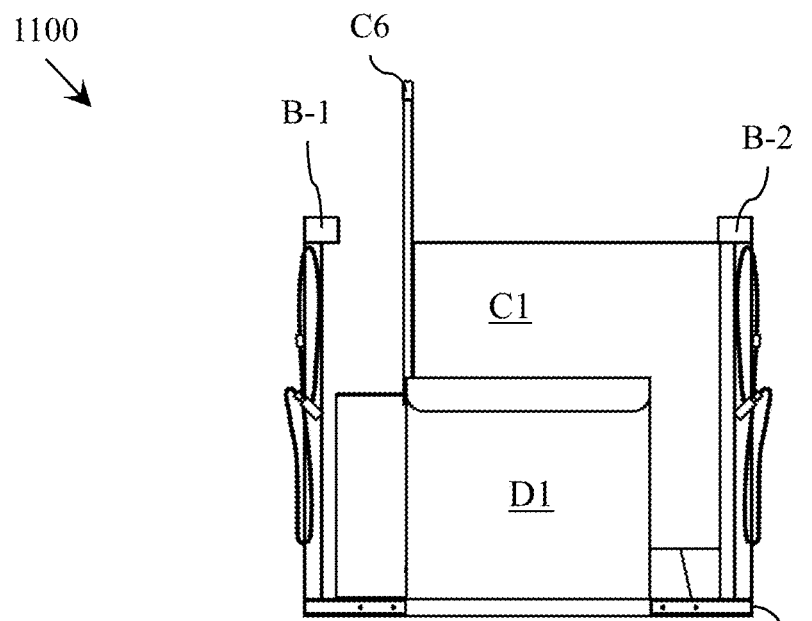

FIG. 5A (an isometric view), FIG. 5B (a plan view), FIG. 5C (a side elevation view) and FIG. 5D (an end elevation view) depict embodiments of the apparatus 1100 of FIG. 1. Referring to the embodiments as depicted in FIG. 5A, FIG. 5B, FIG. 5C and FIG. 5D, the apparatus 1100 is configured in a first physical layout arrangement (a relatively smaller footprint or size layout). The fuel storage assembly (E1) is not depicted in FIG. 5A to FIG. 5D (and is depicted in FIG. 1). The apparatus 1100 includes a skid assembly 120 having structural steel components, and, preferably, forming a rectangular tubular shape. The controller assembly (F1) is mounted to one end of the skid assembly 120. A transformer 506 is mounted proximate to the controller assembly (F1). The transformer 506 is connected to the electric utility, and provides power to components of the apparatus 1100. The fluid-distribution assembly (C1) is positioned about midsection of the skid assembly 120. The vent stack (C6) extends upwardly from the fluid-distribution assembly (C1). The compressor assembly (D1) is positioned at another end section of the skid assembly 120. The defuelling station (B-1) is supported by the skid assembly 120, and extends upwardly from the skid assembly 120. The defuelling station (B-1) provides the defuelling nozzle (B1.1). The defuelling tube (B2.1) extends from the defuelling nozzle (B1.1). A hose retractor 514 may be provided with a breakaway coupling 518 for the defuelling tube (B2.1). The refuelling station (B-2) is supported by the skid assembly 120, and extends upwardly from the skid assembly 120. The refuelling station (B-2) provides the defuelling tube (B2.1). It will be appreciated that FIG. 5B to FIG. 9D may depict most of the components, as depicted in FIG. 5A.

Figure 6A:
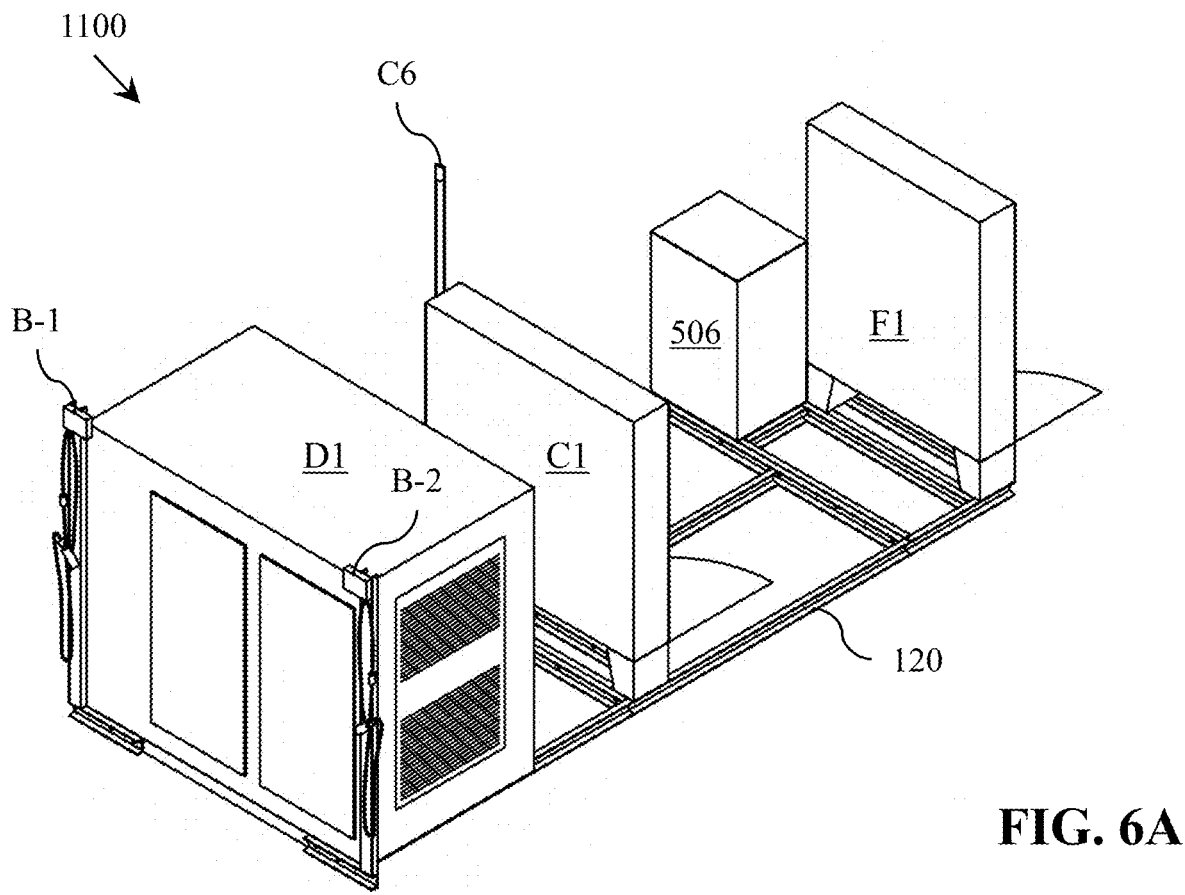
FIG. 6A (an isometric view), FIG. 6B (a plan view), FIG. 6C (a side elevation view) and FIG. 6D (an end elevation view) depict embodiments of the apparatus of FIG. 1.
Figure 6B:
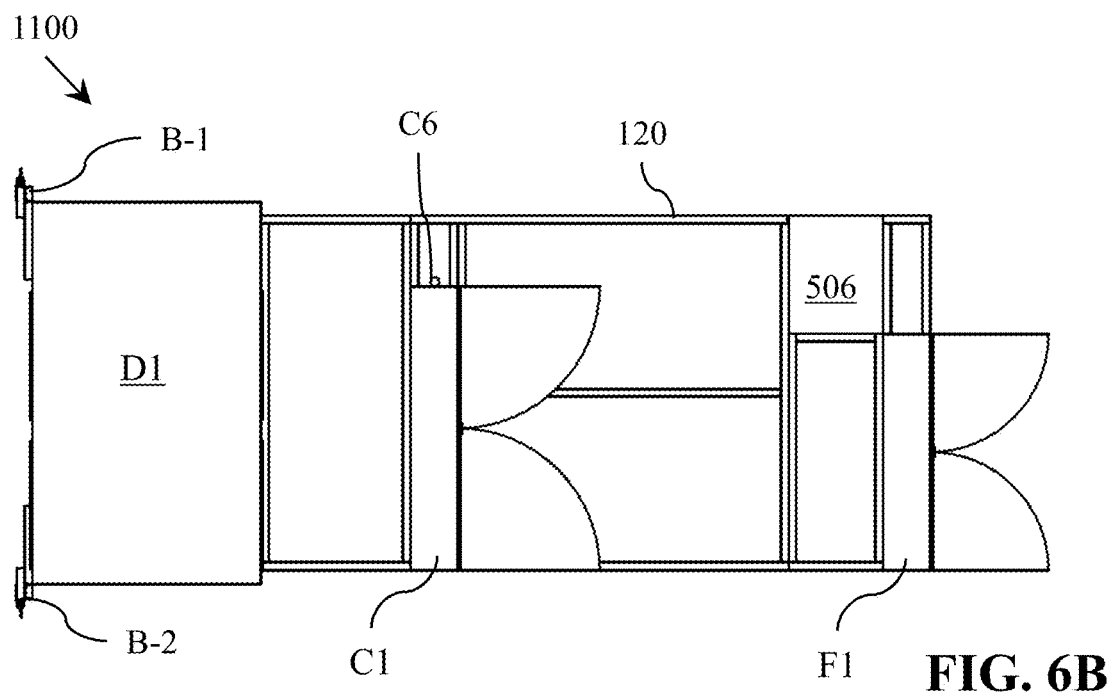
Figure 6C:
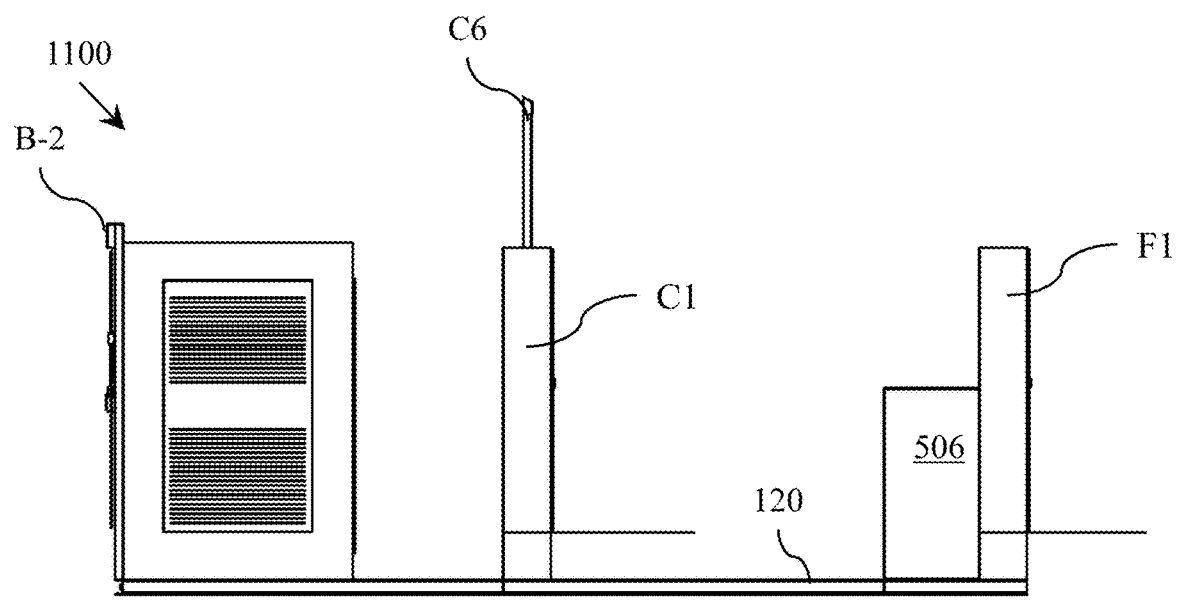
Figure 6D:
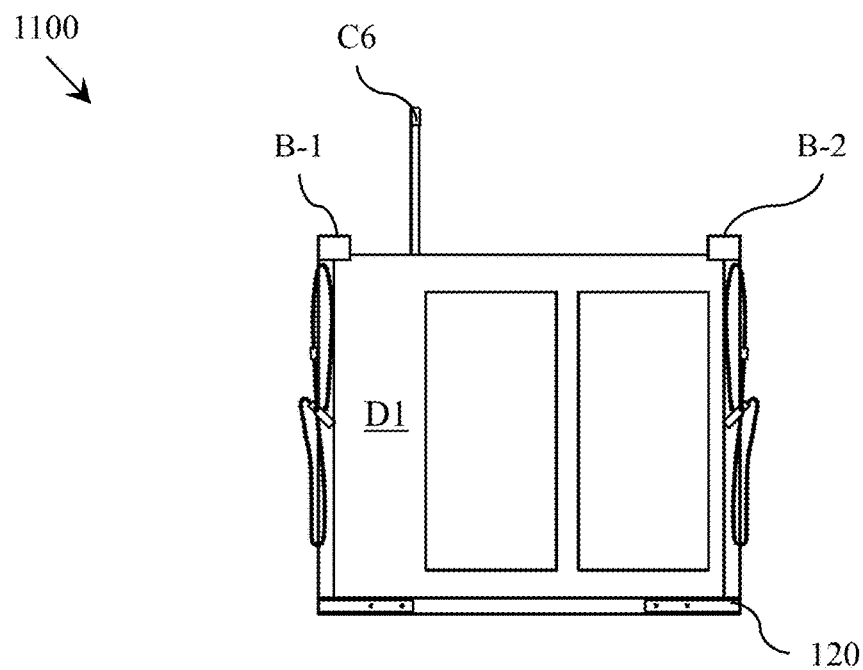

FIG. 6A (an isometric view), FIG. 6B (a plan view), FIG. 6C (a side elevation view) and FIG. 6D (an end elevation view) depict embodiments of the apparatus 1100 of FIG. 1. Referring to the embodiments as depicted in FIG. 6A, FIG. 6B, FIG. 6C and FIG. 6D, the apparatus 1100 is configured in a second physical layout arrangement (a relatively medium footprint or size layout).

Figure 7A:
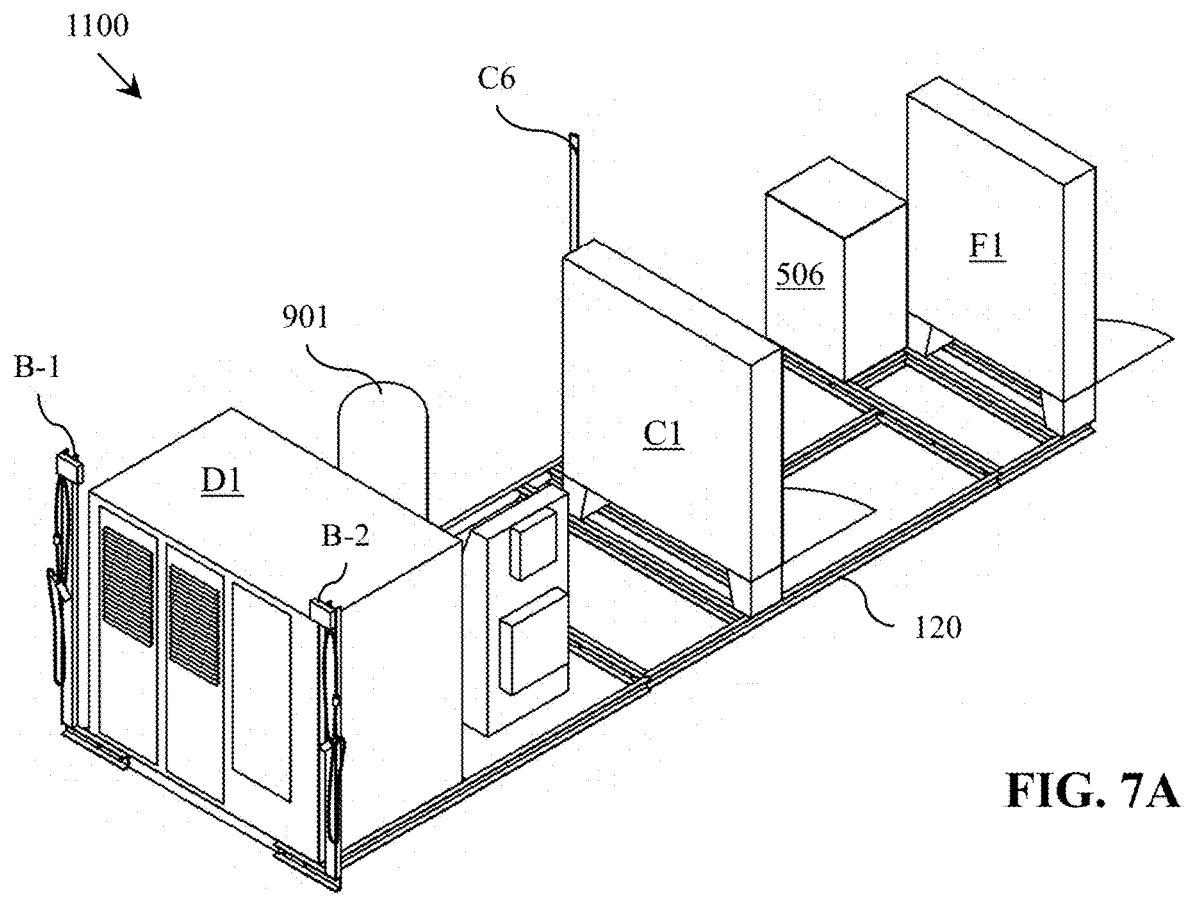
FIG. 7A (an isometric view), FIG. 7B (a plan view), FIG. 7C (a side elevation view) and FIG. 7D (an end elevation view) depict embodiments of the apparatus of FIG. 1.
Figure 7B:
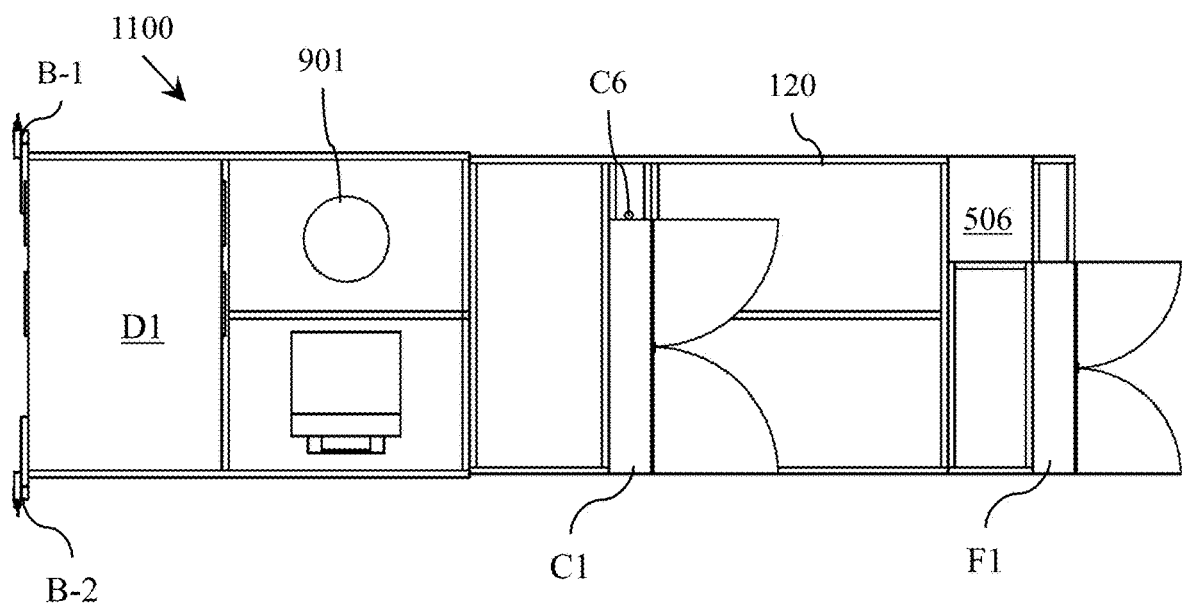
Figure 7C:
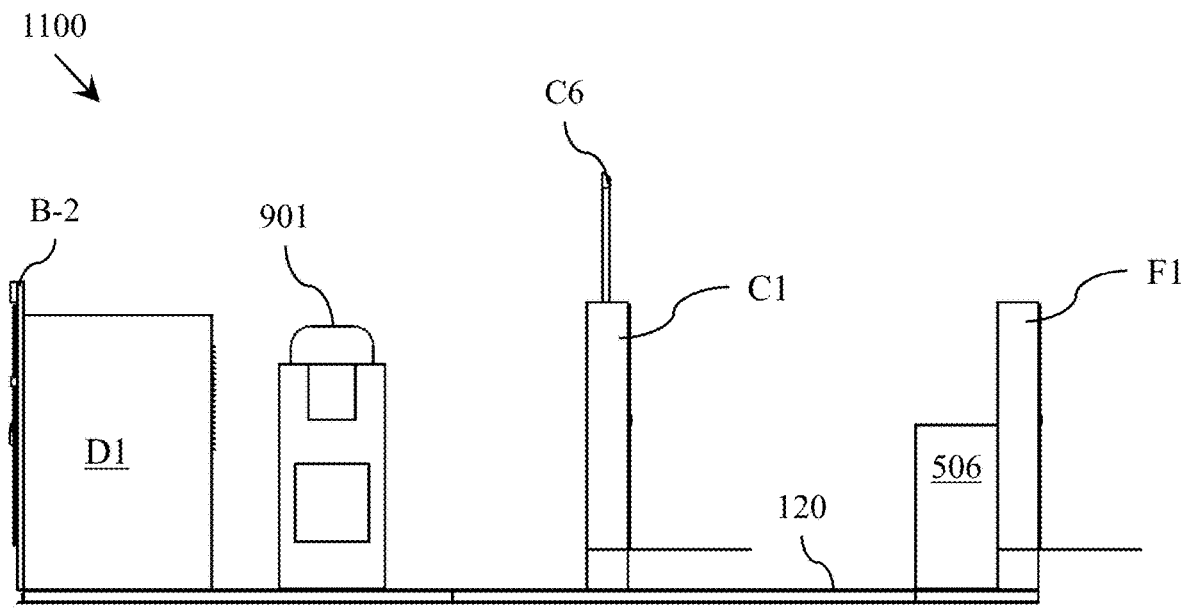
Figure 7D:
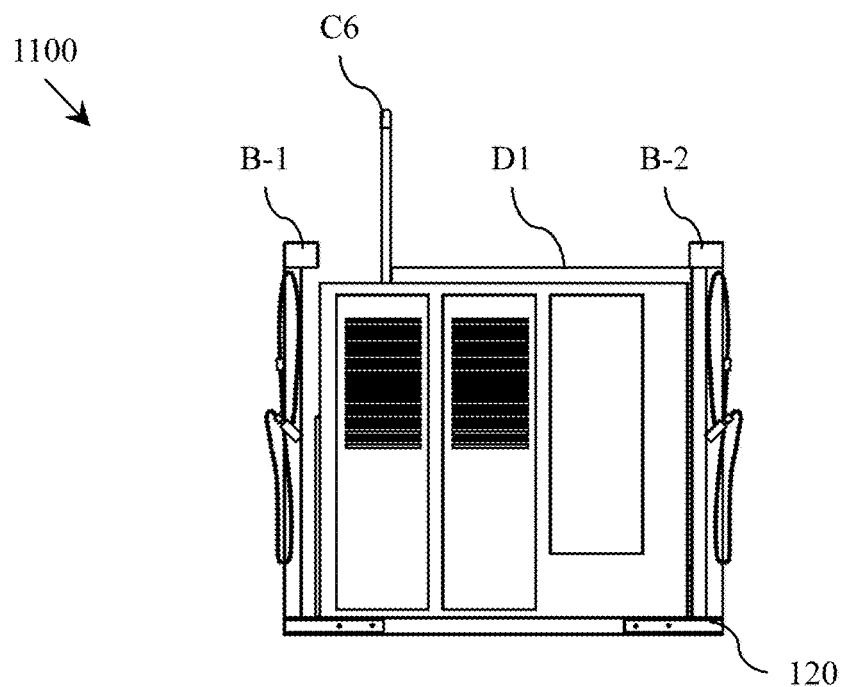

FIG. 7A (an isometric view), FIG. 7B (a plan view), FIG. 7C (a side elevation view) and FIG. 7D (an end elevation view) depict embodiments of the apparatus 1100 of FIG. 1. Referring to the embodiments as depicted in FIG. 7A, FIG. 7B, FIG. 7C and FIG. 7D, the apparatus 1100 is configured in a third physical layout arrangement (a relatively larger footprint or size layout). The apparatus further includes a gas dryer 901 configured to be fluidly connected to the compressor assembly (D1).

Figure 8A:
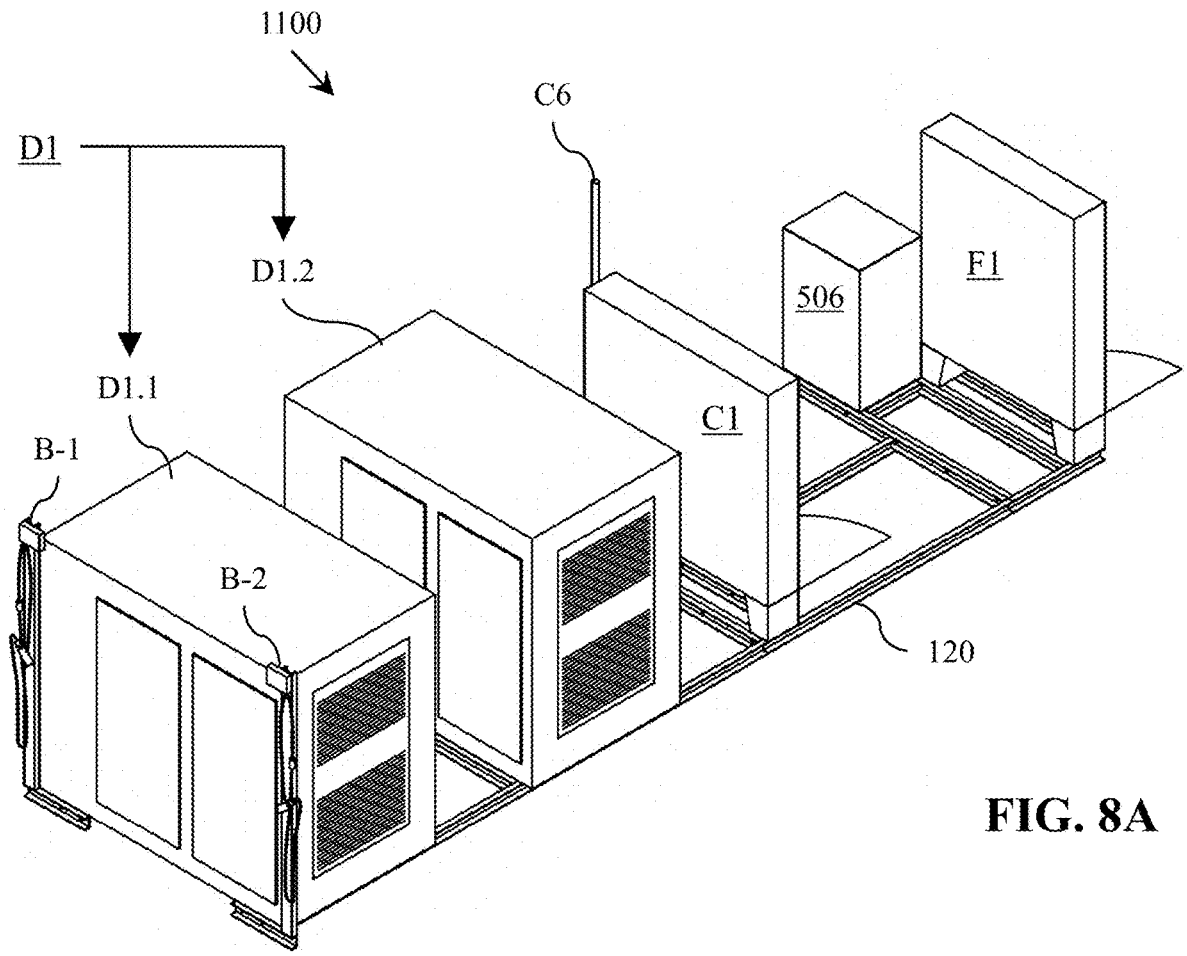
FIG. 8A (an isometric view), FIG. 8B (a plan view), FIG. 8C (a side elevation view) and FIG. 8D (an end elevation view) depict embodiments of the apparatus of FIG. 1.
Figure 8B:
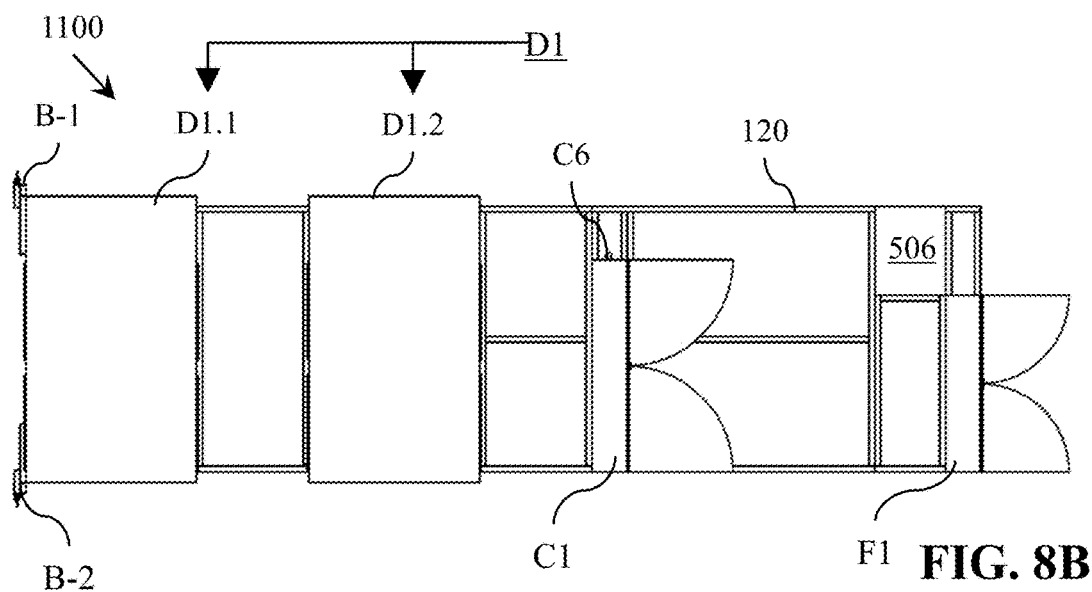
Figure 8C:
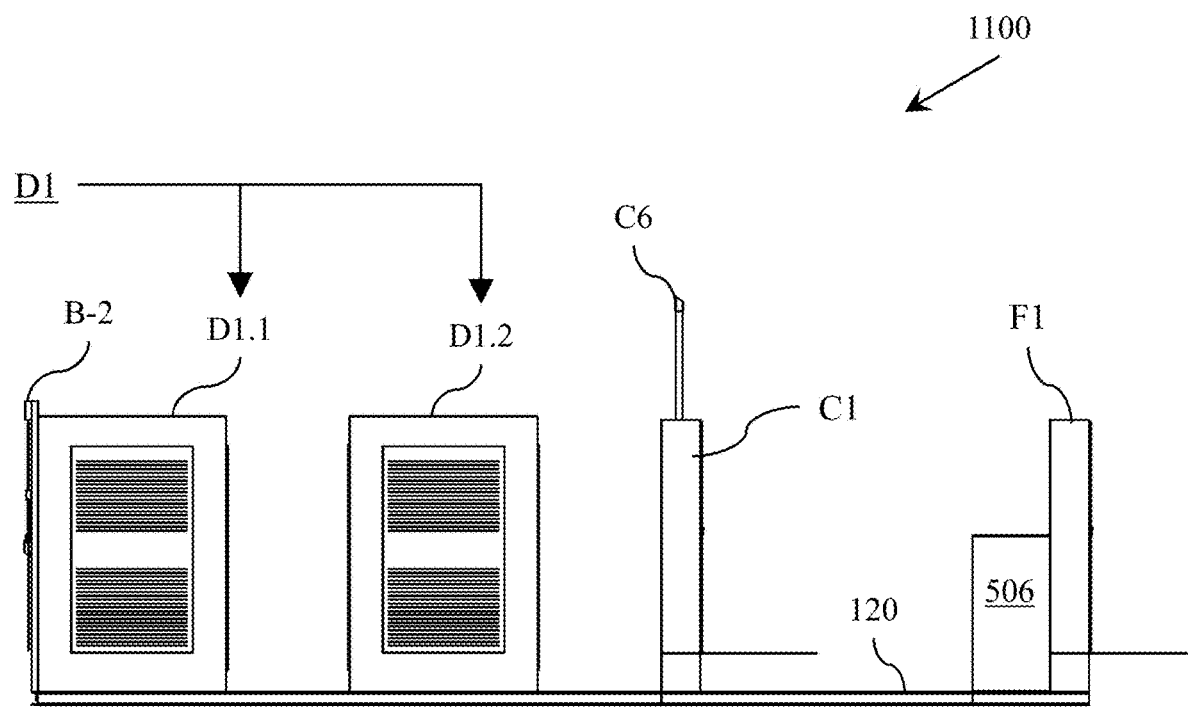
Figure 8D:
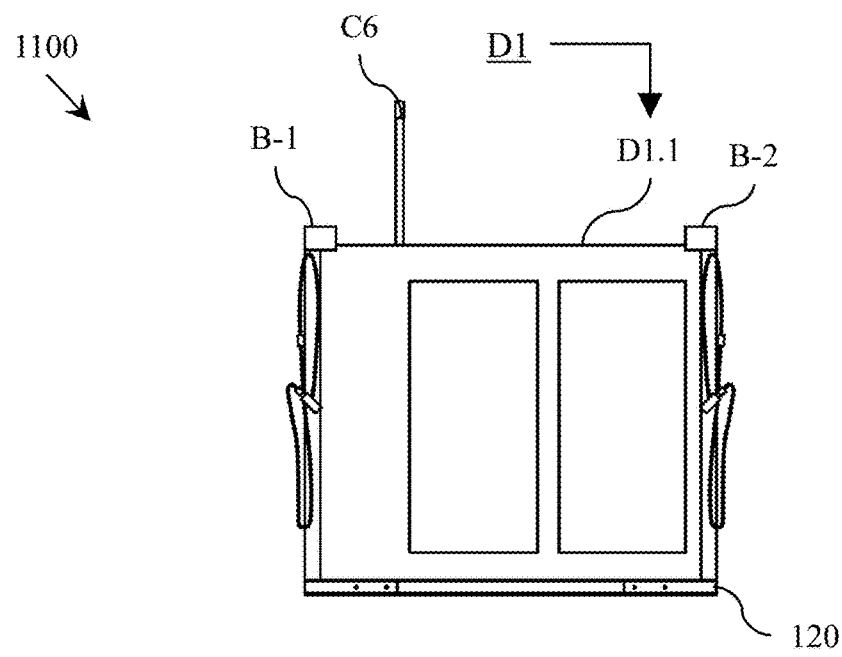

FIG. 8A (an isometric view), FIG. 8B (a plan view), FIG. 8C (a side elevation view) and FIG. 8D (an end elevation view) depict embodiments of the apparatus 1100 of FIG. 1. Referring to the embodiments as depicted in FIG. 8A, FIG. 8B, FIG. 8C and FIG. 8D, the apparatus 1100 is configured in a fourth physical layout arrangement (a relatively extra larger footprint or size layout).

Figure 9A:
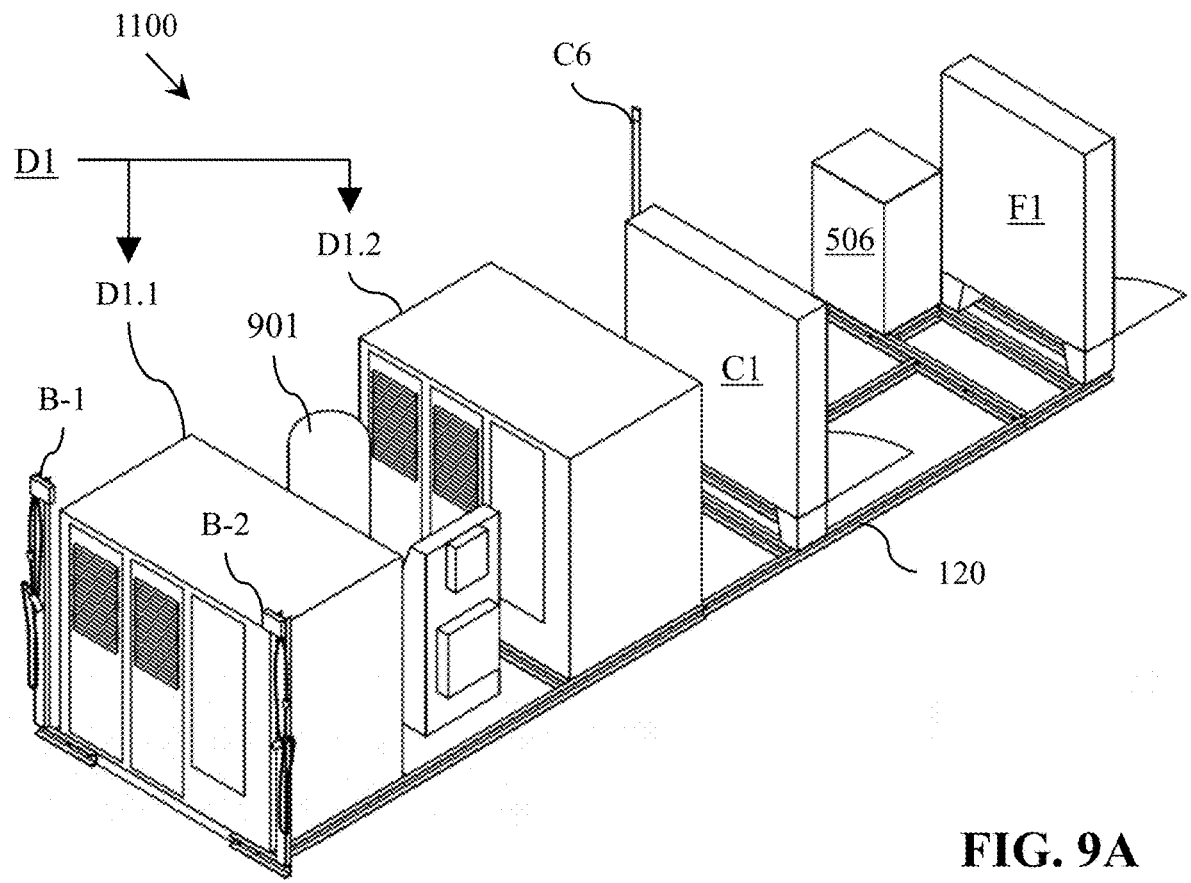
FIG. 9A (an isometric view), FIG. 9B (a plan view), FIG. 9C (a side elevation view) and FIG. 9D (an end elevation view) depict embodiments of the apparatus of FIG. 1.
Figure 9B:
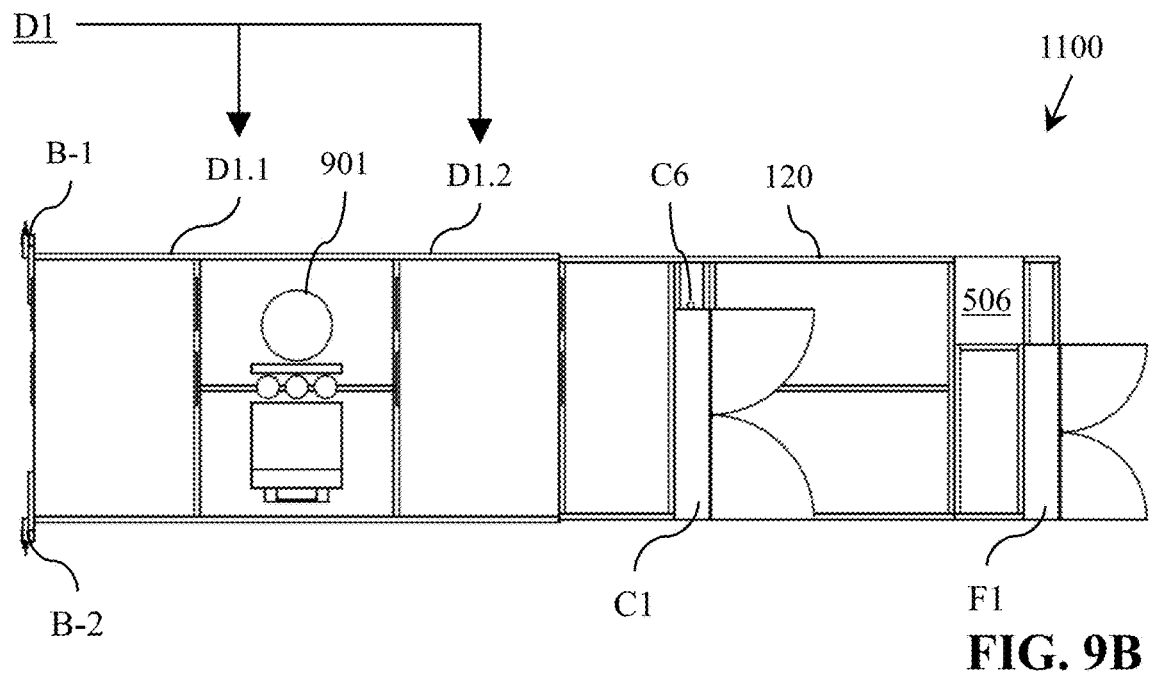
Figure 9C:
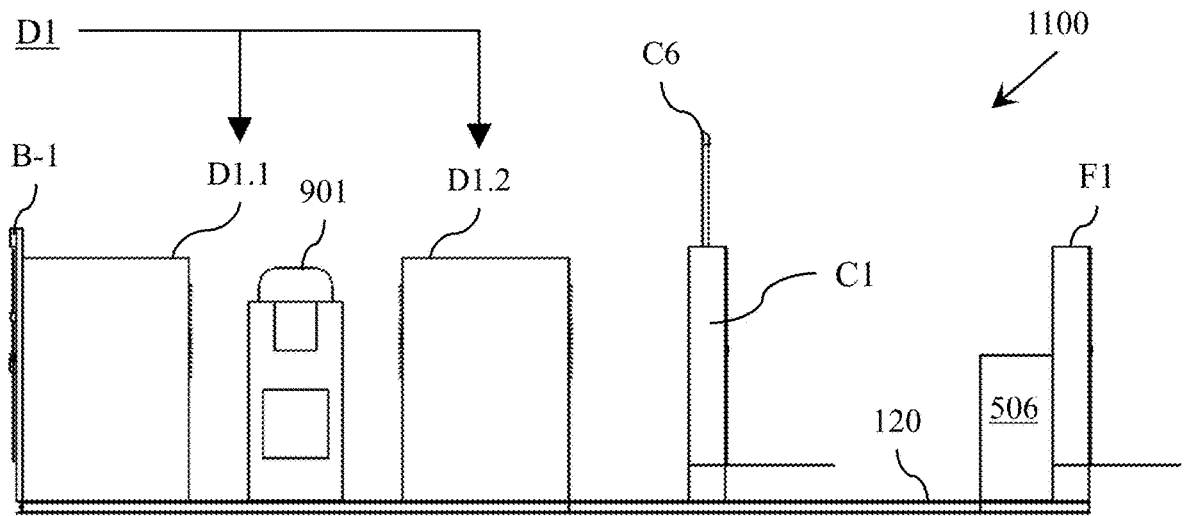
Figure 9D:
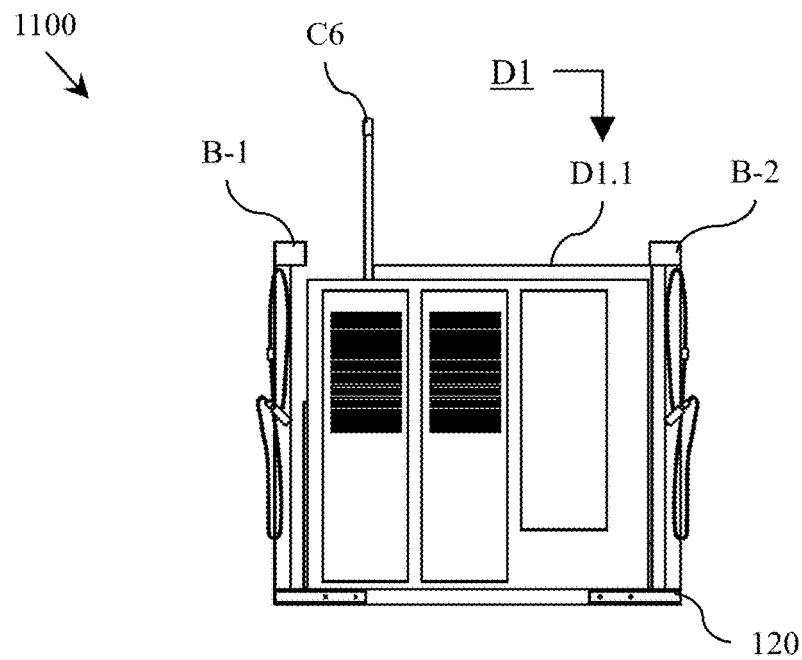

FIG. 9A (an isometric view), FIG. 9B (a plan view), FIG. 9C (a side elevation view) and FIG. 9D (an end elevation view) depict embodiments of the apparatus 1100 of FIG. 1. Referring to the embodiments as depicted in FIG. 9A, FIG. 9B, FIG. 9C and FIG. 9D, the apparatus 1100 is configured in a fifth physical layout arrangement (a relatively extra larger footprint or size layout). The apparatus 1100 includes the gas utility grid connection option. The apparatus further includes a gas dryer 901 configured to be fluidly connected to the compressor assembly (D1).

Figure 10A:
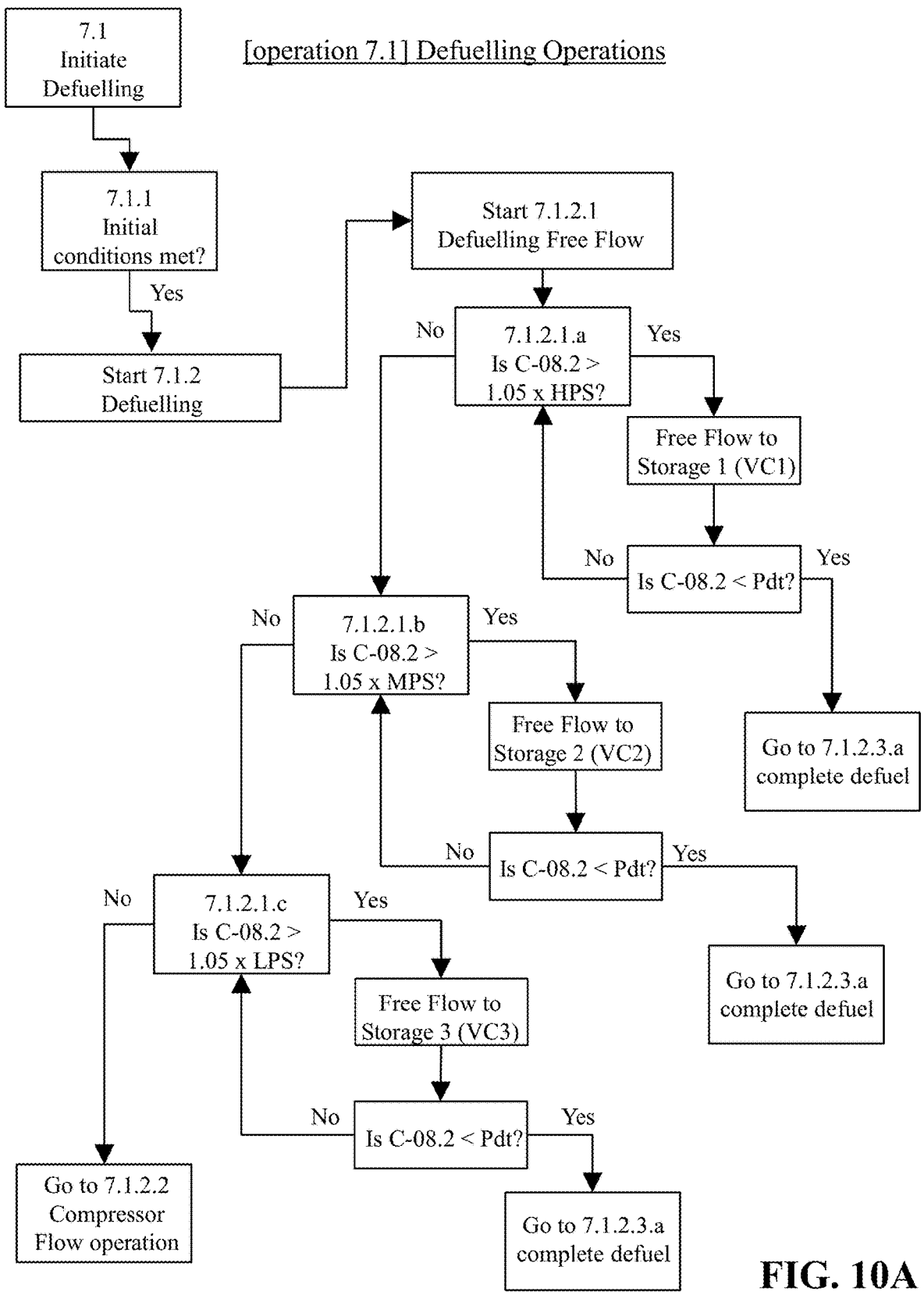
FIG. 10A, FIG. 10B, FIG. 10C, FIG. 10D and FIG. 10E depict schematic views (flow charts) of embodiments of the defuelling operations of the apparatus of FIG. 1.

FIG. 10A to FIG. 10R depict schematic views of embodiments related to the operations, the operating logic (flow charts) of an actuator truth table, and the status annunciation matrix of the apparatus 1100 of FIG. 1.

[Section 1.0] Introduction

The description for FIG. 10A to FIG. 10R provide embodiments for the operations, the operating logic of an actuator truth table, and the status annunciation matrix of the apparatus 1100 of any one of FIG. 1 to FIG. 4B.

[Section 2.0] Abbreviations and Acronyms

The following is a listing of abbreviations and acronyms:
AVI Additional Vehicle Identifier;
CFR CNG Fuel Recycler, such as the fluid-distribution assembly (C1);
HPS High Pressure Storage, such as the higher pressure storage tank, the third fuel storage assembly (E1.3);
LPS Low Pressure Storage, such as the low pressure storage tank, the first fuel storage assembly (E1.1);
MPS Medium Pressure Storage, such as the medium pressure storage tank, the second fuel storage assembly (E1.2);
Pdt Defuelling target pressure;
PIN Personal Identification Number;
Prt Refuelling target pressure;
Pscmax Maximum temperature compensated storage pressure;
Psmin Minimum storage pressure;
PT1 Refueller outlet pressure, such as for the refuelling station (B-2);
PT2 Defueller inlet pressure, such as for defuelling station (B-1);
PT3 Pressure in HPS (the third fuel storage assembly (E1.3));
PT4 Pressure in MPS (the second fuel storage assembly (E1.2));
PT5 Pressure in LPS (the first fuel storage assembly (E1.1));
Pvcf Maximum temperature compensated vehicle fill pressure;
SOP Standard Operating Procedure;
TT1 Ambient Temperature;
TT2 Defuelling gas temperature;
V2V Vehicle to Vehicle;
VCX Valve configuration X (See Truth Table); and
VPN Vehicle Plate Number;

It will be appreciated that the value for Pdt (Defuelling target pressure) may be about 15 psi or about 60 psig (a predetermined limit); Epsi may be a calculated pressure equivalent to about 900 SCF (Standard Cubic Foot) residual onboard vehicle.

[Section 3.0] Valve Configurations

The following provides a listing of the valve configurations:
VC1 Defuelling: Free flow from vehicle to HPS;
VC2 Defuelling: Free flow from vehicle to MPS;
VC3 Defuelling: Free Flow from vehicle to LPS;
VC4 Defuelling: Compressor flow from vehicle to HPS;
VC5 Defuelling: Compressor flow from vehicle to MPS;
VC6 Defuelling: Compressor flow from vehicle to LPS;
VC7 Optimizing: Free flow from LPS to HPS;
VC8 Optimizing: Free flow from MPS to HPS;
VC9 Optimizing: Free flow from LPS to MPS;
VC10 Optimizing: Compressor flow from LPS to HPS;
VC11 Optimizing: Compressor flow from MPS to HPS;
VC12 Optimizing: Compressor flow from LPS to MPS;
VC13 Refuelling: Free flow from LPS to vehicle;
VC14 Refuelling: Free flow from MPS to vehicle;
VC15 Refuelling: Free flow from HPS to vehicle;
VC16 Refuelling: Compressor flow from LPS to vehicle;
VC17 Refuelling: Compressor flow from MPS to vehicle;
VC18 Refuelling: Compressor flow from HPS to vehicle;
VC19 SIMULFLOW: Initial free flow between vehicles; and
VC20 SIMULFLOW: Compressor flow between vehicles;

[Section 4.0] Listing of HMI Commands

The following provides a listing of HMI commands:
AUTHORIZE DEFUEL; START DEFUEL;
STOP DEFUEL; AUTHORIZE REFUEL;
START REFUEL; STOP REFUEL;
AUTHORIZE SIMULFLOW; START SIMULFLOW;
PAUSE; ADD SIMULFLOW;
STOP SIMULFLOW; RESUME;
RESUME REFUEL; RESUME DEFUEL;
ENTER OPERATOR PIN; ENTER VPN;
RETAIL SALE; FULL FILL;
PART FILL; NNNN PSIG;

[Instruction 5.0] Operator Procedures (User Instructions)

The operator may be also called the user of the system. The computer system, such as the controller assembly (F1), and the operator interact with each other via the HMI.

[instruction 5.1] Operator instructions for using the fuel post for Defuel operation and Refuel operation for a Vehicle are as follows (preferably, operation of the system may be automated so that repair garage technicians (users or operators) have minimal operator interaction (interface) with the equipment of the system).

[instruction 5.1.1] Operator instructions for handling the Defuel and Refuel Post Equipment are as follows:

> Before defuelling or refuelling a vehicle, it may be preferred to have the operator ensure that the operator may be equipped with any required safety equipment as specified in the EHS manual. Preferably, the operator refrains from smoking within about 50 feet of the post at all times; and
>
> Operator to use the E-stop located at the Defuel/Refuel Post. In the event that the nearest E-stop cannot be safely actuated, the operator may use the E-stop located at the PCC Panel; and
>
> Post Safety Features include (A) self-grounding hoses, (B) breakaway couplers, and/or (C) hose retractors.

[instruction 5.1.2] Operator instructions for Defuelling operation are as follows:

[instruction 5.1.2.1] Operator instructions for Initial Defuelling operation are as follows:

> [instruction 5.1.2.1.1] Operator drives the vehicle into the single defuelling stall; and
>
> [instruction 5.1.2.1.2] Operator sets the parking brake of the vehicle; and
>
> [instruction 5.1.2.1.3] Operator performs vehicle shutdown procedure per OEM instructions.

[instruction 5.1.2.2] operator instructions for Defuelling Start Sequence are as follows:

> [instruction 5.1.2.2.1] Operator enters the Operator PIN via the HMI of the CFR; and
>
> [instruction 5.1.2.2.2] Operator selects the AUTHORIZE DEFUEL function when prompted at the HMI; and
>
> [instruction 5.1.2.2.3] Operator enters the VPN at the HMI; and
>
> [instruction 5.1.2.2.4] Operator removes the dust cap from the vehicle's nozzle receptacle; and
>
> [instruction 5.1.2.2.5] Operator removes the fuelling nozzle from the fill post; and
>
> [instruction 5.1.2.2.6] Operator confirms that the nozzle valve is in the VENT position; and
>
> [instruction 5.1.2.2.7] Operator connects the fuelling nozzle securely to the vehicle's nozzle receptacle using the slide ring mechanism on the end of the nozzle; and
>
> [instruction 5.1.2.2.8] Operator turns the nozzle's valve to the FILL position (clockwise rotation); and
>
> [instruction 5.1.2.2.9] Operator returns to the HMI, and enters the START DEFUEL command; and
>
> [instruction 5.1.2.2.10] Operator checks the HMI screen, in which the HMI screen indicates Defuelling in Progress; and
>
> [instruction 5.1.2.2.11] Operator waits for fuel to start flowing within a predetermined time limit (preferably within seconds); preferably, an audible alarm may be annunciated; and
>
> [instruction 5.1.2.2.12] Operator checks whether the Status beacon changes from solid green light to pulsating green light; and
>
> [instruction 5.1.2.2.13] Operator notes that the Defuelling duration may vary, depending on volume of fuel onboard vehicle and the volume of fuel stored in the storage module of the CFR; and
>
> [instruction 5.1.2.2.14] Operator departs the area; and
>
> [instruction 5.1.2.2.15] Operator checks whether the Status beacon changes from pulsating green light to solid green light to indicate that defuelling is complete.

[instruction 5.1.2.3] Operator instructions for Stop Defuelling Sequence instructions are as follows:

> [instruction 5.1.2.3.1] operator listens for a hissing sound as the operator approaches the CFR and the vehicle, in which the hissing sound may indicate a fuel leak; and
>
> [instruction 5.1.2.3.1.a] IF operator detects a hissing sound, THEN operator initiates the Emergency Response Procedure; and
>
> [instruction 5.1.2.3.1.b] IF operator does NOT detect a hissing sound, THEN operator continues forward with the stop Defuelling sequence; and
>
> [instruction 5.1.2.3.2] operator enters the Operator PIN via the HMI; and
>
> [instruction 5.1.2.3.3] operator initiates the STOP DEFUEL command via the HMI; and
>
> [instruction 5.1.2.3.4] operator turns the valve of the nozzle to the VENT position (such as, a counter clockwise rotation); and
>
> [instruction 5.1.2.3.5] operator listens for a loud popping sound as the gas trapped in the nozzle body vents out (to atmosphere); and
>
> [instruction 5.1.2.3.6] operator disconnects the fuelling nozzle from the vehicle and return the fuelling nozzle to a nozzle holder; and
>
> [instruction 5.1.2.3.7] operator moves (drives) the defuelled truck into the designated repair bay (note that for the case where a non-emergency problem occurs during the Start defuel Sequence and/or the Stop defuel Sequence, the operator may proceed to the PCC Panel and follow posted instructions).

[instruction 5.1.3] Operator Instructions for Refuelling are as follows:

[instruction 5.1.3.1] General Operator instructions for Refuelling are as follows:

> [instruction 5.1.3.1.1] operator drives the vehicle into the single refuelling stall (refuelling station); and
>
> [instruction 5.1.3.1.2] operator sets the parking brake of the vehicle; and
>
> [instruction 5.1.3.1.3] operator performs a vehicle shutdown procedure as per OEM instructions; and

[instruction 5.1.3.2] Operator Start Sequence Refuelling instructions are as follows:

> [instruction 5.1.3.2.1] operator enters (inputs) the Operator PIN via the HMI; and
>
> [instruction 5.1.3.2.2] operator selects the AUTHORIZE REFUEL function via the HMI once the HMI provides a prompt; and
>
> [instruction 5.1.3.2.3] operator enters the VPN via the HMI; and
>
> [instruction 5.1.3.2.4] operator removes the dust cap from the nozzle receptacle of the vehicle; and
>
> [instruction 5.1.3.2.5] operator removes the fuelling nozzle from the refuel post; and
>
> [instruction 5.1.3.2.6] operator confirms that the nozzle valve may be placed in the VENT position; and
>
> [instruction 5.1.3.2.7] operator connects the fuelling nozzle securely to the nozzle receptacle of the vehicle (such as by using a slide ring mechanism located on the end of the nozzle); and
>
> [instruction 5.1.3.2.8] operator turns the valve of the nozzle to the FILL position (such as, a clockwise rotation); and
>
> [instruction 5.1.3.2.9] operator returns to the HMI, and enters the START REFUEL command via the HMI; and
>
> [instruction 5.1.3.2.10] operator confirms, from an indication provided by the HMI screen, that Refuelling in Progress; and

[instruction 5.1.3.2.11] operator confirms that the fuel has started to flow within a predetermined time limit (preferably, within seconds); preferably, an audible alarm may be annunciated by the HMI; and

[instruction 5.1.3.2.12] operator confirms that the Status beacon has changed from a solid green light to a pulsating green light; and

[instruction 5.1.3.2.13] operator notes that refuelling duration may vary, depending on volume of fuel to be dispensed to the vehicle and/or the volume of fuel in the CNG storage module; and

[instruction 5.1.3.2.14] operator departs the area; and

[instruction 5.1.3.2.15] operator notes that the Status beacon may change from a pulsating green light to a solid green light once refuelling is complete.

[instruction 5.1.3.4] Operator instructions for Stop Defuelling Sequence are as follows:

[instruction 5.1.3.4.1] operator listens for a hissing sound as the operator approaches the CFR and the vehicle, in which the hissing sound may indicate a fuel leak; and

[instruction 5.1.3.4.1.1] IF the operator does detect (hear) the hissing sound, THEN the operator initiates the Emergency Response Procedure (preferably, via the HMI or via the E-stop); and

[instruction 5.1.3.4.1.1] IF the operator does NOT detect (hear) the hissing sound, THEN the operator may continue forward with the stop Defuelling sequence; and

[instruction 5.1.3.4.2] operator enters the Operator PIN via the HMI; and

[instruction 5.1.3.4.3] operator initiates the STOP REFUEL command via the HMI; and

[instruction 5.1.3.4.4] operator turns the valve of the nozzle to the VENT position (such as, a counter clockwise rotation); and

[instruction 5.1.3.4.5] operator may note that a loud popping sound may be detected for the case where the gas trapped in the nozzle body vents out; and

[instruction 5.1.3.4.6] operator disconnects the fuelling nozzle from the vehicle, and returns the fuelling nozzle to the nozzle holder; and

[instruction 5.1.3.4.7] operator installs the dust cap on the receptacle of the vehicle; and

[instruction 5.1.3.4.8] operator removes the truck from the Refuelling stall. Note that for the case where a non-emergency problem occurs during the Start defuelling Sequence or the Stop defuelling Sequence, operator proceeds to the CNG station electrical hut, and follows the posted instructions.

[instruction 5.1.4] Operator Instructions for SIMULFLOW are as follows (this involves simultaneously defuelling one vehicle and refuelling a second vehicle):

[instruction 5.1.4.1] operator drives the vehicle designated for defuelling to the single defuelling stall; and

[instruction 5.1.4.2] operator sets the parking brake; and

[instruction 5.1.4.3] operator performs the vehicle shutdown procedure per OEM instructions; and

[instruction 5.1.4.4] operator drives the vehicle designated for refuelling into the single refuelling stall; and

[instruction 5.1.4.5] operator sets the parking brake; and

[instruction 5.1.4.6] Perform vehicle shutdown procedure per OEM instructions.

[instruction 5.1.4.7] Operator Instructions for Full Start Sequence operation are as follows:

[instruction 5.1.4.7.i] operator follows these instructions for the case where two vehicles begin defuelling and/or refuelling at the same time;

[instruction 5.1.4.7.i.1] operator enters the Operator PIN via the HMI; and

[instruction 5.1.4.7.i.2] operator initiates the AUTHORIZE SIMULFLOW command via the HMI once the HMI provides the prompt;

[instruction 5.1.4.7.i.3] operator enters the VPN of the defuel vehicle when prompted by the HMI; and

[instruction 5.1.4.7.i.4] operator enters the VPN of the refuel vehicle when prompted by the HMI; and

[instruction 5.1.4.7.i.5] operator connects the defuel vehicle to the CFR, following the operating procedures (which may be called SOP or standard operating procedures) in accordance with [instruction 5.1.2] Operator instructions for Defuelling Operation; and

[instruction 5.1.4.7.i.6] operator connects the refuel vehicle to the CFR, following the SOP in accordance with [instruction 5.1.3] Operator Instructions for Refuelling Operation; and

[instruction 5.1.4.7.i.7] operator returns to the HMI, and enters the START SIMULFLOW command; and

[instruction 5.1.4.7.i.8] Operator waits and notes that the HMI screen indicates SIMULFLOW in Progress; and

[instruction 5.1.4.7.i.9] operator waits for fuel to start flowing within a predetermined time limit (preferably, within seconds); preferably, an audible alarm may be annunciated; and

[instruction 5.1.4.7.i.10] operator notes that the Status beacon changes from a solid green light to a pulsating green light; and

[instruction 5.1.4.7.i.11] operates notes that the SIMULFLOW duration may vary, depending on volume of fuel to be transferred; and

[instruction 5.1.4.7.i.12] operator departs the area; and

[instruction 5.1.4.7.i.13.a] operator notes that the Status beacon may change from a pulsating green light to an alternating green light and amber light IF defuelling is finished before refuelling OR IF refuelling is finished before defuelling;

[instruction 5.1.4.7.i.13.a] operator notes that the status beacon reverts to a pulsating green within 15 minutes and the system continues to defuel and/or refuel the second vehicle if the first vehicle is not removed from the CFR; and

[instruction 5.1.4.7.i.13.a] operator notes that the status beacon may change from a pulsating green light to a solid green light for the case where defuelling and refuelling are both finished.

[instruction 5.1.4.8] operator instructions for Split Start Sequence operation are as follows:

[instruction 5.1.4.8.1.i] operator follows these instructions for the case where defuelling may be in progress and another vehicle may be connected for refuelling; and

[instruction 5.1.4.8.i.1] operator enters the Operator PIN via the HMI; and

[instruction 5.1.4.8.i.2] operator initiates the PAUSE command via the HMI; and

[instruction 5.1.4.8.i.3] operator notes that the Status beacon switches from a pulsating green light to a pulsating amber light; and

[instruction 5.1.4.8.i.4] operator initiates the ADD SIMULFLOW command via the HMI; and

[instruction 5.1.4.8.i.5] operator enters the VPN of the refuel vehicle once the operator may be prompted by the HMI;

[instruction 5.1.4.816] operator connects the refuel vehicle to the CFR, and then the operator follow the SOP in accordance with [instruction 5.1.3] Operator Instructions for Refuelling Operation; and

[instruction 5.1.4.8.i.7.a] operator initiates the RESUME command via the HMI; and

[instruction 5.1.4.8.i.7b] operator initiates the START SIMULFLOW command via the HMI; and

[instruction 5.1.4.8.i.8] operator waits for SIMULFLOW operation to begin; and

[instruction 5.1.4.8.i.9] operator notes that the Status beacon changes from a pulsating amber light to a pulsating green light; and

[instruction 5.1.4.8.i.10] operator departs the area.

[instruction 5.1.4.9] for the case where refuelling may be in progress and another vehicle may be connected for defuelling, the operator follows the following instructions; and

[instruction 5.1.4.9.1] operator enters the Operator PIN via the HMI; and

[instruction 5.1.4.9.2] operator initiates the PAUSE command via the HMI; and

[instruction 5.1.4.9.3] operator notes that the Status beacon switches (changes) from a pulsating green light to a pulsating amber light; and

[instruction 5.1.4.9.4] operator initiates the ADD SIMULFLOW command via the HMI; and

[instruction 5.1.4.9.5] operator enters (provides) the VPN of the defuel vehicle to the HMI once prompted by the HMI; and

[instruction 5.1.4.9.6] operator connects the defuel vehicle to the CFR, and then the operator follows the SOP in accordance with [instruction 5.1.2] Operator instructions for Defuelling Operation; and

[instruction 5.1.4.9.7.a] operator initiates the RESUME command via the HMI; and

[instruction 5.1.4.9.7.b] operator initiates the START SIMULFLOW command via the HMI; and

[instruction 5.1.4.9.8] operator notes that the SIMULFLOW operation begins; and

[instruction 5.1.4.9.9] operator notes that the Status beacon changes from a pulsating amber light to a pulsating green light; and

[instruction 5.1.4.9.10] operator departs the area.

[instruction 5.1.4.10] Operator instructions for Full Stop Sequence operation are as follows:

[instruction 5.1.4.10.i] operator follows these instructions for the case where neither vehicle may be disconnected until both are finished (indicated by a solid green light at the status beacon);

[instruction 5.1.4.10.i.1] operator listens for a hissing sound as the operator approaches the CFR and the vehicle, in which the hissing sound may indicate a fuel leak; and

[instruction 5.1.4.10.i.1.a] IF operator detects the hissing sound, THEN operator initiates the Emergency Response Procedure; and

[instruction 5.1.4.10.i.1.a] IF operator does NOT detect the hissing sound, THEN, THEN the operator continues the Full Stop Sequence operation; and

[instruction 5.1.4.10.i.2] operator enters the Operator PIN via the HMI; and

[instruction 5.1.4.10i.3] operator initiates the STOP SIMULFLOW command via the HMI; and

[instruction 5.1.4.10.i.4] operator disconnects the defuel vehicle from the CFR, and then the operator follows the SOP in accordance with [instruction 5.1.2] Operator instructions for Defuelling Operation; and

[instruction 5.1.4.10.i.5] operator disconnect the refuel vehicle from the CFR, and then follows the SOP in accordance with [instruction 5.1.3] Operator Instructions for Refuelling Operation; and

[instruction 5.1.4.10.i.6] operator removes the trucks from their stalls at the CFR.

[instruction 5.1.4.11] Operator instructions for Split Stop Sequence operation;

[instruction 5.1.4.11.i] operator follows these instructions for the case where defuelling may be finished before refuelling and the defuelled vehicle may be removed (indicated by an alternating green light and an amber by the status beacon); and

[instruction 5.1.4.11.i.1] operator listens for a hissing sound as the operator approaches the CFR and the vehicles, in which the hissing sound may indicate a potential leak; and

[instruction 5.1.4.11.i.1.a] IF operator detects (hears) the hissing sound, THEN the operator initiates the Emergency Response Procedure; and

[instruction 5.1.4.11.i.1.a] IF operator does NOT detect (hear) the hissing sound, THEN operator continues forward with the Split Stop Sequence operation; and

[instruction 5.1.4.11.i.2] operator enters the Operator PIN via the HMI; and

[instruction 5.1.4.11.i.3.a] operator initiates the PAUSE command via the HMI; and

[instruction 5.1.4.11.i.3.b] operator initiates the STOP DEFUEL command via the HMI; and

[instruction 5.1.4.11.i.4] operator notes (views) the Status beacon changing from an alternating green light and an amber light to a pulsating amber light.

[instruction 5.1.4.11.i.5] operator disconnects the defuel vehicle from the CFR, and then the operator follows the SOP in accordance with [instruction 5.1.2] Operator instructions for Defuelling Operation; and

[instruction 5.1.4.11.i.6.a] operator initiates the RESUME command via the HMI; and

[instruction 5.1.4.11.i.6.b] operator initiates the RESUME REFUEL command via the HMI; and

[instruction 5.1.4.11.i.7] operator notes that Refuelling resumes; and

[instruction 5.1.4.11.i.8] operator notes that the Status beacon changes from a pulsating amber light to a pulsating green light; and

[instruction 5.1.4.11.i.9] operator removes the defuelled vehicle from the stall; and

[instruction 5.1.4.11.ii] operator follows these instructions for the case where refuelling may be finished before defuelling and the refuelled vehicle may be removed (indicated by an alternating green light and an amber light provided by the status beacon); and

[instruction 5.1.4.11.ii.1] operator listens for a hissing sound as the operator approaches the CFR and vehicles, in which the hissing sound may indicate a fuel leak;

[instruction 5.1.4.11.ii.1.a] IF operator detects (hears) the hissing sound, then the operator initiates the Emergency Response Procedure; and

[instruction 5.1.4.11.ii.1.a] IF operator does NOT detect (hear) the hissing sound, then the operator continues forward with the stop sequence; and

[instruction 5.1.4.11.ii.2] operator enters the Operator PIN via the HMI; and

[instruction 5.1.4.11.ii.3.a] operator initiates the PAUSE command via the HMI; and

[instruction 5.1.4.11.ii.3.b] operator initiates the STOP REFUEL command via the HMI; and

[instruction 5.1.4.11.ii.4] operator notes that the Status beacon changes from an alternating green light and an amber light to a pulsating amber light; and

[instruction 5.1.4.11.ii.5] operator disconnects the refuel vehicle from the CFR, and then the operator follows the SOP in accordance with [instruction 5.1.3] Operator Instructions for Refuelling Operation; and

[instruction 5.1.4.11.ii.6.a] operator initiates the RESUME command via the HMI; and

[instruction 5.1.4.11.ii.6.b] operator initiates the Enter RESUME DEFUEL command via the HMI; and

[instruction 5.1.4.11.ii.7] operator notes that Defuelling resumes; and

[instruction 5.1.4.11.ii.8] operator notes that the Status beacon change from a pulsating amber light to a pulsating green light; and

[instruction 5.1.4.11.ii.9] operator removes the refuelled vehicle from the stall.

[instruction 5.1.5] Operator Instructions for Retail Fuel Sales instruction (Optional).

[instruction 5.1.5.1] Operator General Instructions for Retail Fuel Sales operation as follows:

[instruction 5.1.5.1.a] operator drives the vehicle into the single refuelling stall; and

[instruction 5.1.5.1.b] operator sets the parking brake of the vehicle; and

[instruction 5.1.5.1.c] operator performs the vehicle shutdown procedure as per OEM instructions of the vehicle.

[instruction 5.1.5.2] Operator instructions for the Start Sequence are as follows:

[instruction 5.1.5.2.1] operator enters the Operator PIN via the HMI; and

[instruction 5.1.5.2.2] operator enter the RETAIL SALE command via the HMI; and

[instruction 5.1.5.2.3] operator enters the vehicle VPN via the HMI; and

[instruction 5.1.5.2.4.a] operator selects FULL FILL or PART FILL via the HMI; and

[instruction 5.1.5.2.4.a] IF PART FILL is selected by the operator, the operator enters a value via the HMI, in which the value may be indicated in psig (etc.); and

[instruction 5.1.5.2.5] operator connect the vehicle to the CFR, and then the operator follows the SOP in accordance with [instruction 5.1.3] Operator Instructions for Refuelling Operation; and

[instruction 5.1.5.2.6] operator initiates the START REFUEL command via the HMI; and

[instruction 5.1.5.2.7] operator notes that the HMI screen provides an indication "Retail Fuel Sales in Progress"; and

[instruction 5.1.5.2.8] operator notes that fuel begins flowing within a predetermined time limit (preferably within seconds); preferably, an audible alarm may be annunciated; and

[instruction 5.1.5.2.9] operator notes that the Status beacon changes from a solid green light to a pulsating green light; and

[instruction 5.1.5.2.10] operator notes that the Fuelling time may depend on quantity of fuel dispensed; and

[instruction 5.1.5.2.11] operator may depart the area; and

[instruction 5.1.5.2.12] operator notes that the Status beacon changes from a pulsating green light to a solid green light once fuel dispensing is completed.

[instruction 5.1.5.3] Operator instructions for Stop Sequence are as follows:

[instruction 5.1.5.3.1] operator listens for a hissing sound as the operator approaches the CFR and the vehicle, in which the hissing sound may indicate a potential fuel leak; and

[instruction 5.1.5.3.1.a] IF operator hears a hissing sound, then the operator initiates the Emergency Response Procedure; and

[instruction 5.1.5.3.1.a] IF operator does NOT hear a hissing sound, then the operator continues forward with the stop sequence; and

[instruction 5.1.5.3.2] operator enters the Operator PIN via the HMI; and

[instruction 5.1.5.3.3] operator initiates the STOP REFUEL command via the HMI; and

[instruction 5.1.5.3.4] operator turns the valve of the nozzle to the VENT position (such as a counter clockwise rotation); and

[instruction 5.1.5.3.5] operator listens for a loud popping sound as the gas trapped in the nozzle body vents out (to atmosphere); and

[instruction 5.1.5.3.6] operator disconnects the fuelling nozzle from the vehicle and returns the fuelling nozzle to the nozzle holder; and

[instruction 5.1.5.3.7] operator installs the dust cap on the receptacle of the vehicle; and

[instruction 5.1.5.3.7] operator removes the truck from the Refuelling stall.

For the case where any non-emergency problems occur during the Start/Stop Sequence, proceed to the CNG station electrical hut and follow the posted instructions.

[Operation 6.0] Process Descriptions

[parameters 6.1] OPERATING PARAMETERS DESCRIPTION

[parameters 6.1.1] Suction side Compressor Inlet Pressure may be preferably about 5 psig (a predetermined limit); and

[parameters 6.1.2] Suction side Maximum Allowable Working Pressure may be preferably about 6 psig (a predetermined limit); and

[parameters 6.1.3] Discharge side Maximum Allowable Working Pressure may be preferably about 5500 psig (a predetermined limit); and

[parameters 6.1.4] Service Pressure may be preferably about 3600 psig (a predetermined limit) at preferably about 70° F. (Fahrenheit), etc.

[parameters 6.1.5.a] Defuelling availability: 24 hours per day, seven days per week (24/7) or until all storage banks are filled to Pscmax; and

[parameters 6.1.5.b] Refuelling availability: 24 hours per day, seven days per week (24/7) or until all storage banks are emptied to Psmin.

[Operation 6.2] General Requirements

A defuelling and/or refuelling event (or all such events) may require the Operator to enter a PIN in order to initiate the event. The defuelling and/or refuelling may proceed as an unattended process after the Operator has successfully connected the vehicle(s) to the CFR and entered the correct commands at the HMI of the CFR. The CFR may be configured to automatically stop when the event is complete or the CFR may operate in "fail safe" for the case where a problem arises at any time during the process. The CFR may be equipped with a multi-color status beacon: a green light, an amber light, a red light, a blue light are visible from a distance so the operator can be aware of the status of the process remotely, typically a visual check from within the repair garage to see whether the process may be still in progress or finished.

[Operation 6.3] Defuelling Process

The Defuelling process may be triggered by connecting a vehicle to the defuelling post and pressing the Defuel Authorization "soft" button on the HMI and entering the vehicle licence plate number using the keypad of the HMI. The system may automatically use the vehicle plate number to record information regarding the defuelling event. The goal of the Defuelling process may be to reduce the pressure on board the vehicle to the Pdt. The vehicle gas flows into the CFR by first free flowing into each of three banks of storage (HPS, MPS, LPS) in sequence. Although each bank of storage may be rated for the same pressure (Maximum Operating Pressure of about 4,500 psi) the system may be designed to try to keep HPS at a higher pressure than MPS and LPS, and also to keep MPS at a higher pressure than LPS. After gas has been transferred via free flow, if the Pdt has not been achieved then Compressor Flow may begin. The gas flows through a two-stage pressure cut that drops the pressure to about five (5) psi. In some cases, the first stage pressure cut may result in gas temperatures below about $-40$ degrees Celsius. For these cases, a bypass valve may open and allow gas to pass through a heat exchanger (Z1) (as depicted in FIG. 1, and also called a gas-and-air heat exchanger) to increase gas temperatures to near ambient prior to passing through the second stage. Each stage of storage may be filled to the Pscmax. The system may direct gas to HPS, MPS, and LPS (preferably in that order). IF (for the case where) Pdt has not been achieved after LPS is full, then the system may have to halt defuelling operations until some gas has been removed by refuelling other vehicles. At this point the system may estimate the amount of gas removed from the vehicle and store this information along with the VPN. When defuelling the vehicle resumes, the operator may be required to enter the VPN so that the subsequent amount of fuel removed may be added to the vehicle's fuel tally. For the case where the defuelling process has been completed the amount of fuel received by the system from this vehicle may be stored (to computer memory). This information may be used when refuelling the vehicle at a later time.

[Operation 6.4] Refuelling Process

The Refuelling process may be triggered once the operate (A) connects a vehicle to the Refuelling post, (B) presses the Refuel Authorization button located on the HMI, and (C) enters the vehicle licence plate number using the keypad (of the HMI). The system may require a valid VPN to dispense the proper amount of fuel and record information regarding the refuelling event. For the case where a VPN was not previously assigned to the vehicle, a valid VPN may be requested from the operator (if so desired). The Refuelling process returns the same amount of fuel to the vehicle as was removed during the defuelling process. At the same time the pressure on board the vehicle may not exceed Pvcf. Gas flows from the CFR by first free flowing from each of three banks of storage (LPS, MPS, HPS) in sequence. Although each bank of storage may be rated for the same pressure (Maximum Operating Pressure of about 4,500 psi) the system is configured to try to keep the HPS at a higher pressure than the MPS and the LPS, and the system may always try to keep MPS at a higher pressure than LPS. After gas has been transferred via free flow, Compressor Flow may begin IF the Prt has not been achieved. The gas then flows from each stage of storage through a two stage pressure cut that drops the pressure to about 5 psi. The system may first draw gas from LPS, then from MPS, and then from HPS as may be required. Preferably, at no time may Prt be allowed to exceed Pvcf. Preferably, at no time may the Pressure in any bank of storage be allowed to drop below Psmin. In some cases, the first stage pressure cut (reduction) may result in gas temperatures about below $-40$ degrees Celsius. In these cases, a bypass valve may open an allow gas to pass through a gas-air heat exchanger to increase gas temperatures to ambient prior to passing through the second stage. The vehicle may be filled until one of the following conditions may be met (A): the amount of gas removed from the vehicle during the Defuelling process has been returned to the vehicle, (B) the target Pvcf has been achieved, (c) a preauthorized volume assigned to the VPN has been dispensed, and/or (D) all three banks of storage are at Psmin. For the case where the refuelling process has been completed, the amount of fuel delivered to the vehicle may be stored in the event log.

[Operation 6.5] Simulflow

The SIMULFLOW process may be triggered once the operator (A) connects a vehicle to the Refuelling post and a second vehicle to the Defuelling post, and (B) presses the AUTHORIZE SIMULFLOW button on the HMI, and (C) enters the vehicle licence plate numbers using the keypad of the HMI. The system may require a valid VPN to dispense the proper amount of fuel to the refuel vehicle and record information regarding the refuelling event. Similarly, the system may require a valid VPN to remove fuel from the defuel vehicle and record information regarding the defuelling event.

For the case where the VPN was not previously assigned to one or both vehicles, valid VPN's may be requested by the system. The SIMULFLOW process may be configured to return the same amount of fuel to the refuel vehicle as was removed during the defuelling process (i.e., Prt as calculated by the CFR PLC and measured at the refuel pressure transmitter (the first pressure transmitter (C8.1)). The SIMULFLOW process may be also configured to remove the amount of fuel from the defuel vehicle that may be required to reduce the pressure in the vehicle fuel tanks to Pdt, as measured at the defuel pressure transmitter (the second pressure transmitter (C8.2). The SIMULFLOW process starts by initiating the free flow of gas from the defuel vehicle into the CFR gas control panel and from the gas control panel into the refuel vehicle fuel storage tanks. Free flow continues until the pressure on board the refuel vehicle approaches equilibrium as measured at the defuelling pressure transmitter (the second pressure transmitter (C8.2)) and the refuelling pressure transmitter (the first pressure transmitter (C8.1)).

For the case where free flow stops, the CFR may be configured to automatically initiate an action: in order to resume the flow of gas to the refuel vehicle, the controller initiates a pressure transfer flow from the CFR's storage module by free flowing from each of the three banks of storage (LPS, MPS, HPS) in sequence, into the refuel vehicle storage tanks. Pressure transfer flow to the refuel vehicle may continue until the pressure in HPS approaches equilibrium with the pressure on board the vehicle as measured at the HPS pressure transmitter (the third pressure transmitter (C8.3)) and the refuel pressure transmitter (the first pressure transmitter (C8.1)).

For the case where free flow stops, the CFR may be configured to automatically further initiate an action: in order to resume the flow of gas from the defuel vehicle, the controller initiates pressure transfer flow from the defuel vehicle storage tanks into the CFR's storage module by free flowing into each of the three banks of storage (HPS, MPS, LPS) in sequence. Pressure transfer flow from the defuel vehicle may continue until the pressure in LPS approaches equilibrium with the pressure on board the vehicle as measured at the LPS pressure transmitter (that is, the value provided by the fifth pressure transmitter (C8.5)).

For the case where pressure transfer flow from the HPS to the refuel vehicle finishes before Prt is reached and before pressure transfer flow from the defuel vehicle to LPS finishes, the CFR PLC may start the CFR compressor and gas may flow simultaneously from the defuel vehicle to the compressor D-01 and to LPS. This may continue until the following conditions are satisfied: (A) Prt is reached in which case flow to the refuel vehicle may stop, (B) The pressure on board the defuel vehicle approaches equilibrium with the pressure in LPS as measured at the second pressure transmitter (C8.2) and the fifth pressure transmitter (C8.5), in which case flow to LPS may stop, (C) Pdt is reached in which flow from the defuel vehicle may stop, (D) IF Pdt is reached before Prt then the compressor may draw from LPS, MPS, HPS in sequence until Prt is reached, (E) IF Prt is reached before Pdt then the compressor may continue to run and flow may be directed to HPS, MPS and LPS in sequence until Pdt is reached in which case the compressor may shutdown and the status beacon may indicate the completion of the event, and/or (F) IF HPS, MPS, LPS all reach Pscmax before Pdt the compressor may showdown and the status beacon may indicate a warning alarm.

Alternatively, for the case where pressure transfer flow from the defuel vehicle to LPS finishes before Pdt is reached and before pressure transfer flow from HPS to the refuel vehicle finishes, the CFR PLC may start the CFR compressor, and gas may flow from the defuel vehicle to the compressor and from the compressor to HPS, MPS, LPS in sequence. Simultaneously, free flow from HPS to the refuel vehicle may continue. This may continue until the following conditions are satisfied: (A) Pdt is reached in which case flow from the defuel vehicle may stop, (B) IF Prt has been reached by pressure transfer from HPS the compressor may stop when Pdt is reached, (C) IF Prt has not been reached before Pdt has been reached, the compressor may continue to run and draw from LPS, MPS, HPS in sequence until Prt is reached (the compressor may stop and the status beacon may indicate the completion of the event, such as a solid green light), and/or (D) IF Prt has not been reached before LPS, MPS, HPS each reach Psmin the compressor may stop and the status beacon may indicate a warning alarm (an alternating green and amber light).

[Operation 6.6] Retail Fuel Sales Description

The Retail Sales process may be identical to the Refuelling process except the HMI may have a different set of command prompts when the Operator selects the Retail Sales authorization button at the HMI.

[Operation 6.7] Storage Optimization Process Description

The Storage Optimization process ensures HPS and MPS are always topped up as close to Pscmax as possible without allowing MPS or LPS to fall below Psmin. The purpose of this is to ensure that subsequent defuelling and refuelling operations occur as quickly and efficiently as possible. The Storage Optimization process may be automatically triggered following any Defuelling or Refuelling event. HPS may be made the highest pressure of the storage banks by first free flowing gas between the banks so that HPS is at a higher pressure than MPS and MPS is at a pressure greater than or equal to LPS. Following this free flow activity HPS may be topped up as close to Pscmax as possible by compressing gas first from LPS and then from MPS. Following this, the compressor may be used to top up MPS as close to Pscmax as possible by compressing gas from LPS. Preferably, at no time may MPS or LPS be permitted to drop to a pressure below Psmin.

[Operation 6.8] Event Log

The date and time of all key events and actions are recorded in the PLC (date and time stamped, and stored in the active register in the computer memory, such as of the controller assembly (F1) or a database operatively connected to the controller assembly (F1), etc.). Data stored in the active register may be used to manage refuel queue. When this information is no longer useful for the purpose of controlling the queue, the data may be cleared from the active register and then the data may be stored in an event log. The Log information may be downloaded to provide a record of the history of the station.

The events that are recorded in the queue are as follows:
X indicates the defuel stall;
Y indicates the refuel stall;
DWX=Stall X Waiting to start defuel;
DIX=defuel initiated in Stall X;
DFX=defuel finished in Stall X;
DTX=defuel terminated in Stall X;
VRX=Vehicle removed from Stall X;
RWY=Stall Y waiting to start refuel;
RIY=refuel initiated in Stall Y;
RFY=Refuel finished in Stall Y;
RTY=refuel terminated in Stall Y; and
VRY=Vehicle removed from Stall Y.

The computer system, such as the controller assembly (F1), may be configured to provide memory for storage of Log data. Preferably, the computer system, such as the controller assembly (F1), may be configured to be connected to the PLC via an Ethernet cable. The data may be viewable as a spread sheet format for review.

[Operation 6.9] Compressor Operation The compressors start and stop operation based on pressure signals from the PT's in the main Gas Control Panel to perform the vehicle defuelling and/or refuelling processes described herein. Preferably, the process control set points and/or operating bands are settable values (user adjustable).

[Operation 6.10] Dryer System Operation

Operation of the dryer is, preferably, fully manual (that is, the dryer may be operated manually by the operator or user).

[Operation 6.11] Back-Up Power Requirements

[operation 6.11.1] Uninterruptible Power Supply (UPS): The UPS may be installed at or near the PCC Panel. The UPS may be rated at a predetermined output (measured in watt hours). The UPS may be configured to power (provided electricity to) the control and safety circuits in the station for a predetermined time limit. For instance, the UPS may provide power to (A) the PLC, (B) the safety loop devices (sensors, alarm lights, etc.), and/or (C) any other items as may be required.

[operation 6.11.2] Backup Generator: Preferably, the backup generator may be provided as may be required.

[Section 7.0 Controller Operations]

The controller assembly (F1) is configured to execute the operations (with assistance from computer-executable coded instructions as described above); the definition of operation includes process, routine, logic, and any equivalent hereof, etc.

[Operation 7.1] Defuelling Operations

FIG. 10A, FIG. 10B, FIG. 10C, FIG. 10D and FIG. 10E depict schematic views (flow charts) of embodiments of the defuelling operations of the apparatus 1100 of FIG. 1.

Referring to the embodiment as depicted in FIG. 10A, the following operations are depicted:

[operation 7.1.1] execute initial operations to DETERMINE whether the following initial conditions for Defuelling operation are satisfied (have been met); the controller OPENS (transmits a control signal for opening) the gas flow valve (such as, the second controllable valve (C9.2) or the fourth controllable valve (C9.4)) only AFTER the following initial conditions have been met (satisfied):

The controller executes the following operations during [operation 7.1.1]:

[for initial condition 1]:
(A) receive the Authorize Defuelling signal from "Authorize Defuelling" button via the HMI once the operator pushes (actuates) the "Authorize Defuelling" button; and (B) prompt the operator (via the HMI) to enter the vehicle's VPN in response to the controller receiving the "Authorize Defuelling" button via the HMI; and
(C) receive the vehicle's VPN via the HMI (by operator manual entry via the HMI); and record (write) the VPN to the computer memory (of the controller assembly (F1)); the VPN may be used to log the defuelling events; and
(D) initiate a timer countdown (to count down from a predetermined time limit, such as 15 minutes, to zero) in response to the controller receiving the actuation signal from the "Authorize Defuelling" button via the HMI (that is, once the operator pushes the "Authorize Defuelling" button); and
(E) record the Date and time stamp for receipt of the Authorize Defuelling signal (DCX=Defuelling Clock Started); and

[for initial condition 2]:
receive the "Start Defuelling" signal from the "Start Defuelling" button via the HMI in response to the operator pressing the "Start Defuelling" button of the HMI (after the operator connects the vehicle to the defuelling system).

[for initial condition 3]:
receive (monitor or wait for) the pressure signals from the defuel pressure gauge (the second pressure gauge (C7.2)) and the defuel pressure transmitter (the second pressure transmitter (C8.2)); and
DETERMINE whether a pressure rise has occurred at both the defuel pressure gauge (second pressure gauge (C7.2)) and the defuel pressure transmitter (second pressure transmitter (C8.2)) based on the pressure signals that were received.

[for initial condition 4]:
receive a pressure value (measurement) from the second pressure transmitter (C8.2); and
DETERMINE whether the pressure measurement indicates that the internal pressure from the vehicle is greater than Pdt psig, but less than about 4,500 psig (a predetermined limit).

[for initial condition 4a]:
receive, and read, a pressure signal from the second pressure transmitter (C8.2); and DETERMINE (compute) whether IF the value of the second pressure transmitter (C8.2) <Pdt psig IS TRUE; and
IF the controller computes (determines) that IF the value of the second pressure transmitter (C8) <Pdt psig IS TRUE, and THEN the controller terminates the defuelling process normally (i.e., the controller continues to execute operations starting from [operation 7.1.2.3a] of [operation 7.1.2] Defuelling operations.

[for initial condition 4b]:
receive, and read, a pressure signal from the second pressure transmitter (C8.2); and DETERMINE (compute) whether IF the value of the second pressure transmitter (C8.2) >4,500 psig IS TRUE; and
IF the controller computes that IF the value of the second pressure transmitter (C8.2) >4,500 psig IS TRUE, and THEN the controller terminates the defuelling process, and THEN the controller sets the P alarm to a HIGH state.

[for initial condition 5]:
DETERMINE whether the time span between [initial condition 1] and [initial condition 2] is greater than a predetermined time limit (such as 15 minutes); and initiate (set) a WARNING alarm (such as, an alternating green light and amber light) IF the controller makes a determination (computation) that the time span is greater than the predetermined time.

[for initial condition 5a]: DETERMINE whether the technician forgot to depress the Authorization Button of the HMI.
[for initial condition 5b]: acknowledge the WARNING alarm.
[for initial condition 5c]: wait for (and received) a signal from the HMI that indicates the operator has verified that everything is properly connected as per [SECTION 5.1.2] Operator Defuelling Instructions.
[for initial condition 5d]: change the Status beacon to a solid amber light.
[for initial condition 5e]: wait for (and receive) a signal from the HMI that indicate that the operator has initiated the re-authorization of the defuelling event via the HMI.
[for initial condition 5f]: initiate the Defuelling operations in response to the controller receiving the authorization signal via the defuelling event at the HMI.
[for initial condition 5g]: change (transmit control signal for changing) the Status beacon to a pulsating green light.

[for initial condition 6]:
record (write) the time and date stamp for the defuelling event; and record (write) the vehicle VPN (DI=Defuelling initiated) to the computer memory, such as of the controller assembly (F1), etc.;
Once the above conditions (operations) are satisfied (executed) successfully, the controller transmits an OPEN command signal to the second controllable valve (C9.2) or to the fourth controllable valve (C9.4); the command signal is configured to urge the gas flow valve (such as, the second controllable valve (C9.2) or the fourth controllable valve (C9.4)) to OPEN (in an open state or FLOW enabled state).

Referring to the embodiment as depicted in FIG. 10A, the following operations are depicted:

[operation 7.1.2] Execute Defuelling operation (only if or when [operation 7.1.1] determines that the initial conditions for Defuelling are satisfied).
[operation 7.1.2.1] initiate Defuelling Free Flow operation once [operation 7.1.1] is completed successfully.
[operation 7.1.2.1.a] includes the following operations:
request, and receive, the pressure indicated by the second pressure transmitter (C8.2); and DETERMINE whether the pressure indicated by the second pressure transmitter (C8.2) >1.05×HPS (maximum pressure of the HPS) IS TRUE; for instance, DETERMINE may include a computational comparison between (A) the value of the pressure indicated by the second pressure transmitter (C8.2) and (B) the value of 1.05×HPS; and IF the value provided by second pressure transmitter (C8) >1.05×HPS IS FALSE, THEN continue to [operation 7.1.2.1.b]; and IF the value provided by second pressure transmitter (C8.2) >1.05×HPS IS TRUE, THEN:

(A) initiate Free Flow to Storage 1 (VC1 for Defuelling: Free flow from vehicle to HPS) by engaging (turning ON) the valve of Storage 1 (for the case where the processor executes the control logic to compute that the free flow rate is equal to or less than the compressor flow rate plus 10%, the processor may proceed to execute the next operation), and (B) DETERMINE whether the value of the pressure signal received from the second pressure transmitter (C8.2) <Pdt (the value of the Defuelling target pressure) IS TRUE (Pdt is the value associated with a specific storage tank), and THEN execute the following operations:

(i) IF he value of the pressure signal received from the second pressure transmitter (C8.2) <=Pdt psig IS FALSE, THEN continue to operation [7.1.2.1.a] (continue to monitor the signal received from the second pressure transmitter (C8.2), and re-DETERMINE computation accordingly), and (ii) IF the value of the pressure signal received from the second pressure transmitter (C8.2) IS<=Pdt psig IS TRUE, THEN continue to [operation 7.1.2.3.a] for complete defuel operation (i.e., terminate defuelling process normally); it is understood that any for any given operation that specifies a given DETERMINATION operation, an operation for requesting, and receiving, a value that may be required by the given DETERMINATION operation is understood to be executed prior to execution of the given DETERMINATION operation.

[operation 7.1.2.1.b] includes the following operations:

request, and receive, the pressure indicated by (provided by) the second pressure transmitter (C8.2); and DETERMINE (compute) whether the value of the pressure signal received from the second pressure transmitter (C8) >1.05×MPS IS TRUE; and IF the value of the pressure signal received from the second pressure transmitter (C8.2) >{1.05×the value provided by the fourth pressure transmitter (C8.4) (for MPS) IS FALSE, THEN continue to [operation 7.1.2.1.c]; and IF the value of the pressure signal received from the second pressure transmitter (C8.2) >{1.05×the value provided by the fourth pressure transmitter (C8.4) (MPS)} IS TRUE, THEN:

(A) initiate Free Flow to Storage 2 (VC2 for Defuelling: Free flow from vehicle to MPS) (for the case where the processor executes the control logic to compute (determine) that the free flow rate is equal to or less than the compressor flow rate plus 10%, the processor may proceed to execute the next operation), and (B) DETERMINE whether the value of the pressure signal received from the second pressure transmitter (C8.2) <=Pdt psig IS TRUE, and THEN execute the following operations:

(i) IF the value of the pressure signal received from the second pressure transmitter (C8.2) <=Pdt psig IS FALSE, THEN continue to [operation 7.1.2.1.b], and (ii) IF the value of the pressure signal received from the second pressure transmitter (C8.2) <=Pdt psig IS TRUE, THEN continue to operation [7.1.2.3.a] for complete defuel operation (i.e., terminate defuelling process normally).

[operation 7.1.2.1.c] includes the following operations:

DETERMINE whether the value of the pressure signal received from the second pressure transmitter (C8) >1.05×LPS is TRUE;

If the value of the pressure signal received from the second pressure transmitter (C8.2) >1.05×LPS IS FALSE, then continue to [operation 7.1.2.2] for executing compressor flow operation (i.e., begin compressor flow operations);

IF the value of the pressure signal received from the second pressure transmitter (C8.2) >1.05×LPS IS TRUE, THEN:

(A) initiate free flow to Storage 3 (VC3) (for the case where the processor executes the control logic to compute (determine) that the free flow rate is equal to or less than the compressor flow rate plus 10%, the processor may proceed to execute the next operation), and (B) DETERMINE whether the value of the pressure signal received from the second pressure transmitter (C8.2) <Pdt IS TRUE: and THEN execute the following operations:

(i) IF the value of the pressure signal received from the second pressure transmitter (C8.2) <=Pdt psig IS FALSE, then continue to [operation 7.1.2.1.c], and (ii) IF the value of the pressure signal received from the second pressure transmitter (C8.2) <=Pdt psig IS TRUE, then continue to [operation 7.1.2.3.a] for completing defuel operation (i.e., terminate defuelling process normally).

Figure 10B:
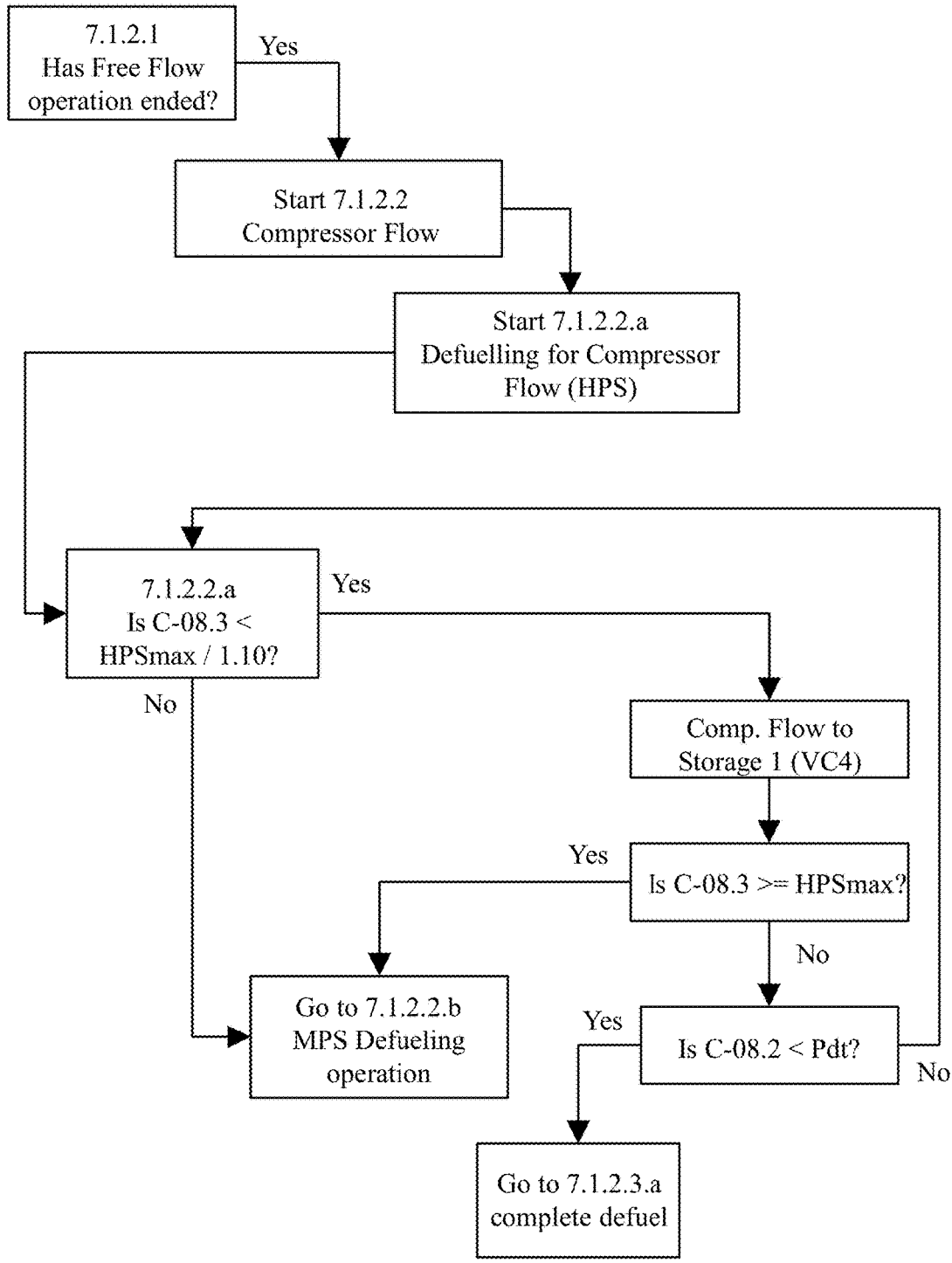

FIG. 10B depicts [operation 7.1.2.2] defuelling for compressor flow. Referring to the embodiment as depicted in FIG. 10B, the following operations are depicted:

[operation 7.1.2.2] initiate execution of the Defuelling Compressor Flow operations once

[operation 7.1.2.1.c] is completed accordingly;

[operation 7.1.2.2.a] includes the following operations:

DETERMINE the current condition of the HPS by executing the following operations:

DETERMINE whether HPS (the value provided by the third pressure transmitter (C8.3)) <HPSmax/1.10 IS TRUE;

IF HPS (the value provided by the third pressure transmitter (C8.3)) <HPSmax/1.10 IS FALSE, THEN continue to [operation 7.1.2.2.b] for execution of MPS operation;

IF HPS (the value provided by the third pressure transmitter (C8.3)) <HPSmax/1.10 IS TRUE, THEN: (A) initiate compressor flow to Storage 1 (VC4); this process continues until Storage 1 is full, or until the compressor's low inlet set pressure is achieved (i.e.; the vehicle is deemed empty of fuel), and at this point, fuel flow may switch to the next bank of storage; and THEN (B) DETERMINE whether HPS (the value provided by the third pressure transmitter (C8.3)) >=HPS (MAX) IS TRUE;

IF HPS (the value provided by the third pressure transmitter (C8.3)) >=HPSmax IS TRUE, THEN continue to [operation 7.1.2.2.b] for execution of MPS operation (subroutine); and If HPS (the value provided by the third pressure transmitter (C8.3)) >=HPSmax IS FALSE, THEN COMPUTE WHETHER the pressure value from the second pressure transmitter (C8.2) <Pdt psig IS TRUE; and IF (the value provided by the second pressure transmitter (C8.2) <Pdt psig IS FALSE, THEN continue to [operation 7.1.2.2.a]; and IF (the value provided by the second pressure transmitter (C8.2) <Pdt psig IS TRUE, THEN continue to [operation 7.1.2.3.a] for execution of complete defuel operation (i.e., terminate defuelling process normally).

Figure 10C:
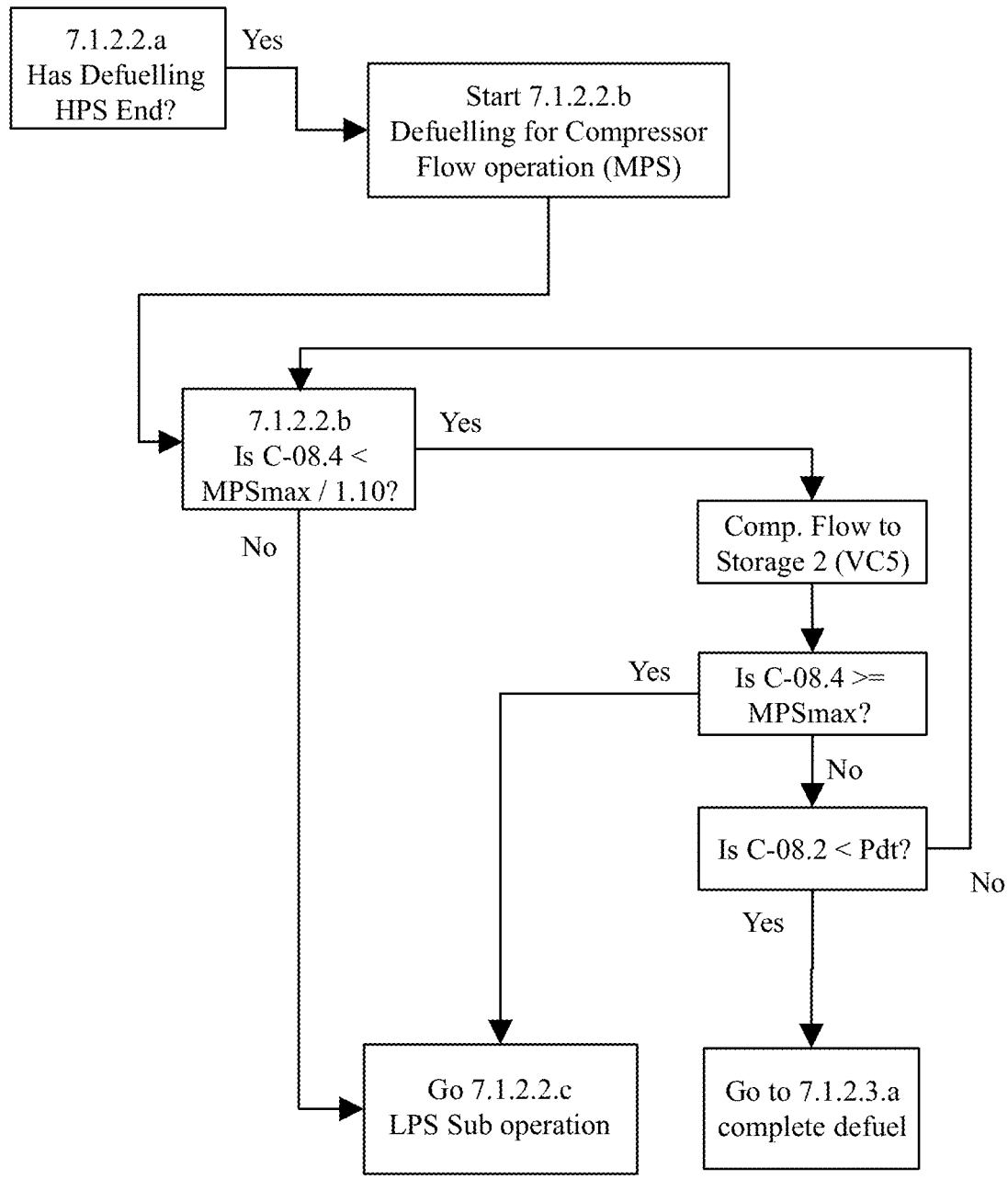
Figure 10D:
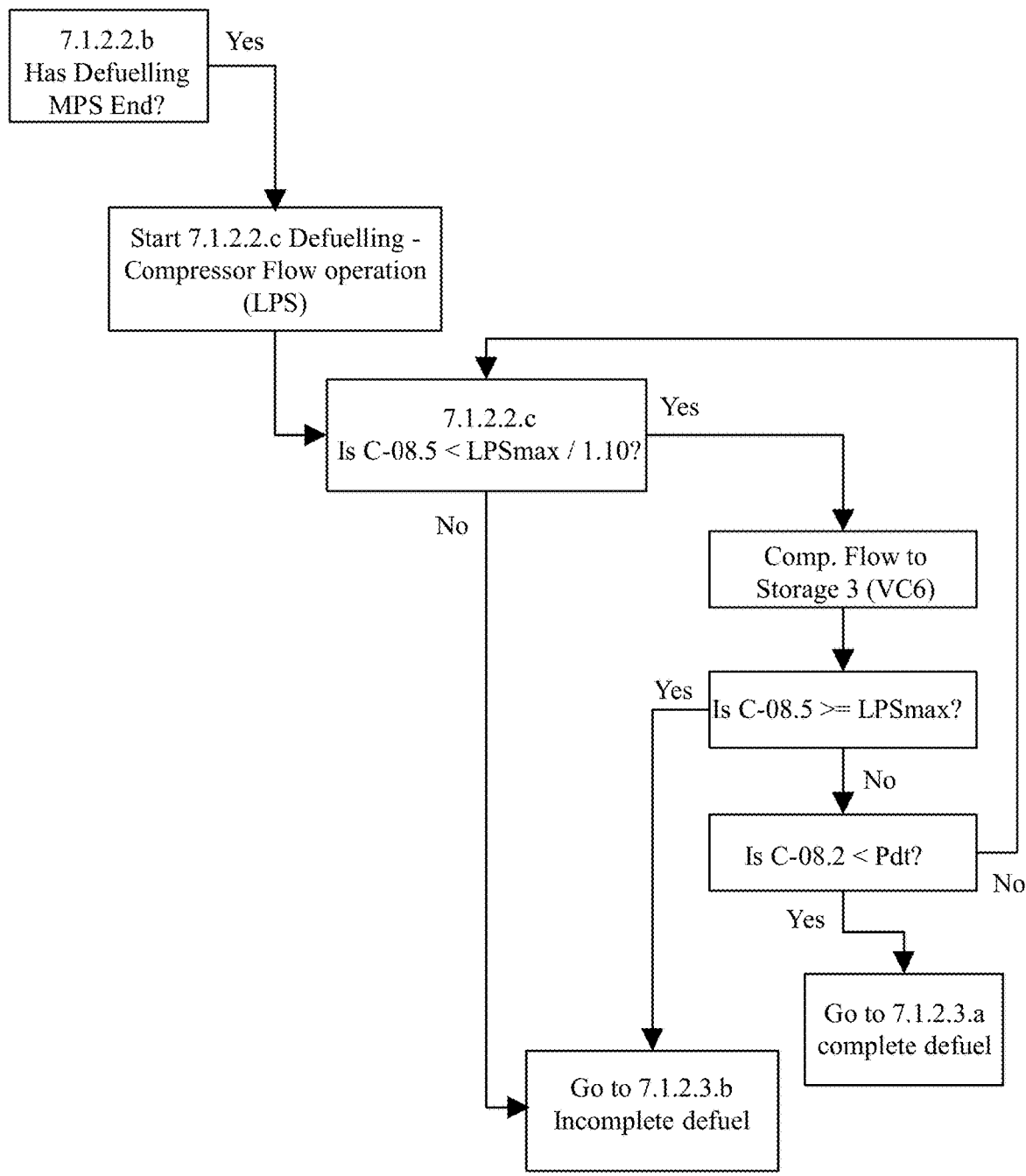

FIG. 10C and FIG. 10D depict [operation 7.1.2.2] defuelling for compressor flow. Referring to the embodiment as depicted in FIG. 10C, the following operations are depicted:

[operation 7.1.2.2.b] includes the following operations:

DETERMINE the current condition of the MPS by executing the following operations:

DETERMINE whether MPS (the value provided by the fourth pressure transmitter (C8.4)) <MPSmax/1.10 IS TRUE;

IF MPS (the value provided by the fourth pressure transmitter (C8.4)) <MPSmax/1.10 IS FALSE, THEN continue to operation [7.1.2.2.c] for executing LPS sub-operation;

IF MPS (the value provided by the fourth pressure transmitter (C8.4)) <MPSmax/1.10 IS TRUE, THEN execute the following operations: (A) initiate compressor flow to Storage 2 (VC5); this process continues until Storage 2 is full, or until the compressor's low inlet set pressure is achieved (i.e.; the vehicle is deemed empty of fuel); and at this point, fuel flow may switch to the next bank of storage; and THEN (B) DETERMINE whether MPS (the value provided by the fourth pressure transmitter (C8.4)) >=MPSmax IS TRUE;

IF MPS (the value provided by the fourth pressure transmitter (C8.4)) >=MPSmax IS TRUE, THEN continue to operation [7.1.2.2.c] for executing LPS sub-operation;

IF MPS (the value provided by the fourth pressure transmitter (C8.4)) >=MPSmax IS FALSE, THEN compute whether the pressure value from the second pressure transmitter (C8.2) <Pdt psig IS TRUE;

IF (the value provided by the second pressure transmitter (C8.2)) <Pdt psig IS FALSE, THEN continue to [operation 7.1.2.2.b];

IF (the value provided by the second pressure transmitter (C8.2)) <Pdt psig IS TRUE, THEN continue to [operation 7.1.2.3.a] for execution of complete defuel operation (i.e., terminate defuelling process normally).

Referring to the embodiment as depicted in FIG. 10D, the following operations are depicted:

[operation 7.1.2.2.c] includes the following operations:

DETERMINE a condition of the LPS by executing the following operations:

DETERMINE whether LPS (the value provided by the fifth pressure transmitter (C8.5)) <LPSmax/1.10 IS TRUE;

IF LPS (the value provided by the fifth pressure transmitter (C8.5)) <LPSmax/1.10 IS FALSE, THEN continue to [operation 7.1.2.3.b] for execution of incomplete defuel operation;

IF LPS (the value provided by the fifth pressure transmitter (C8.5)) <LPSmax/1.10 IS TRUE, THEN (A) initiate compressor flow to Storage 3 (VC6); this process continues until Storage 3 is full, or until the compressor's low inlet set pressure is achieved (i.e.; the vehicle is deemed empty of fuel); for the case where Storage 3 is full before the low inlet set pressure is achieved, fuel flow stops; and THEN (B) DETERMINE whether LPS (the value provided by the fifth pressure transmitter (C8.5)) >=LPSmax is TRUE; IF LPS (the value provided by the fifth pressure transmitter (C8.5)) >=LPSmax IS TRUE, THEN continue to [operation 7.1.2.3.b] for execution of incomplete defuel operation;

IF LPS (the value provided by the fifth pressure transmitter (C8.5)) >=LPSmax IS FALSE, THEN compute (determine whether) LPS (the value provided by the fifth pressure transmitter (C8.5)) <LPSmax;

IF LPS (the value provided by the fifth pressure transmitter (C8.5)) <Pdt psig IS FALSE, THEN continue to [operation 7.1.2.2.c];

IF LPS (the value provided by the fifth pressure transmitter (C8.5)) <Pdt psig IS TRUE, THEN continue to [operation 7.1.2.3.a] for execution of complete defuel operation (i.e., terminate defuelling process normally).

Figure 10E:
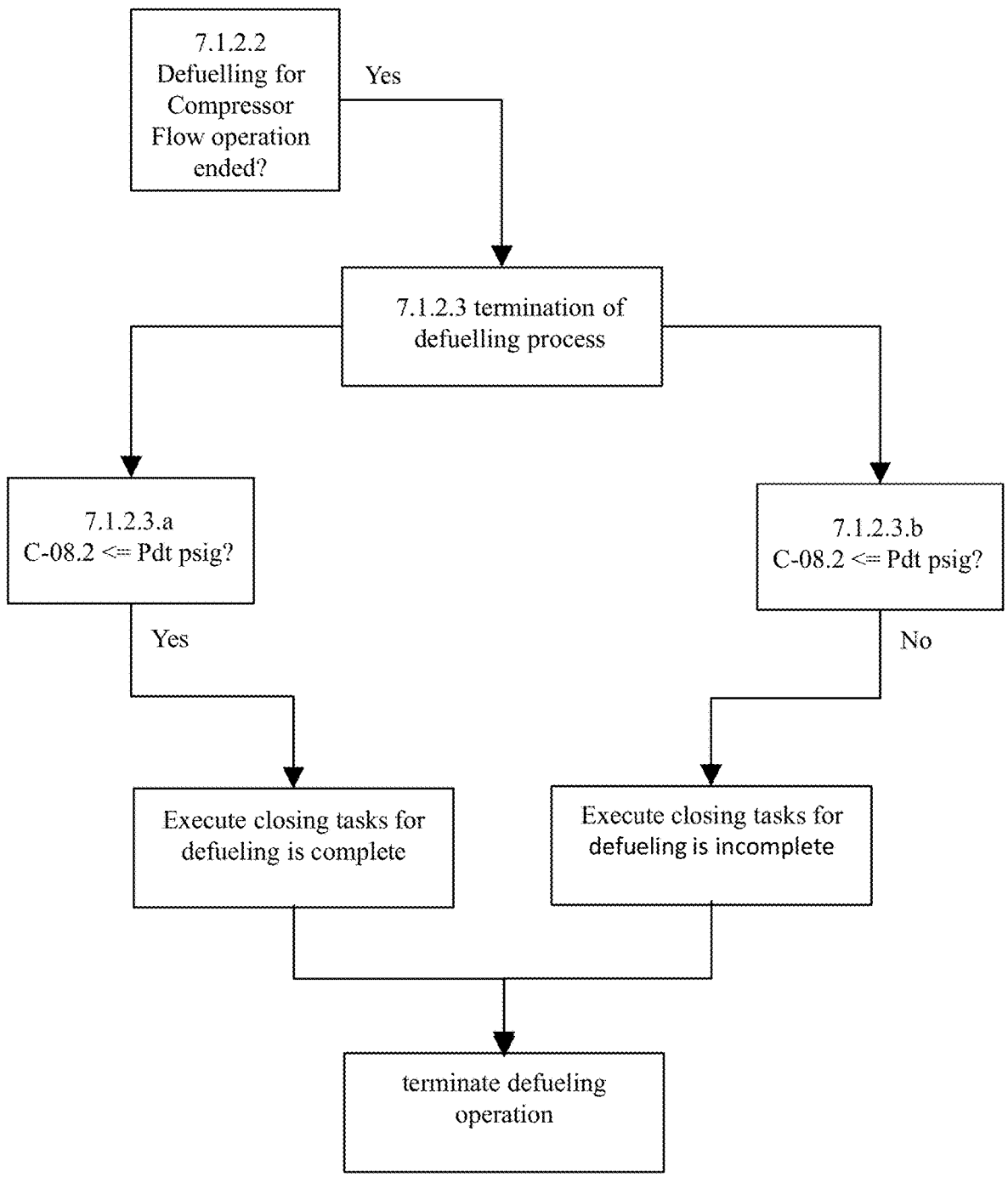

FIG. 10E depicts [operation 7.1.2.3] termination of defuelling. Referring to the embodiment as depicted in FIG. 10E, the following operations are depicted:

[operation 7.1.2.3] includes the following operations:

execute termination of defuelling process once [operation 7.1.2.2.c] indicates that defuelling is complete).

[operation 7.1.2.3.a] includes the following operations:

execute Completed Defuel operation once [operation 7.1.2.2.c] is completed accordingly;

COMPUTE whether (the value provided by the second pressure transmitter (C8.2)) <=Pdt psig IS TRUE;

IF (the value provided by the second pressure transmitter (C8.2)) IS<=Pdt psig, THEN execute operation to (A) store date and time of defuel completion with fuel quantity data and vehicle PIN (see fuel quantity estimation logic); and (B) turn on Defuel Complete indicator on the HMI; and (C) change the Status beacon to a solid green light.

[operation 7.1.2.3.b] includes the following operations:

execute Incomplete Defuel operation once [operation 7.1.2.2.c] indicates that defuelling is incomplete; and DETERMINE (compute) whether (the value provided by the second pressure transmitter (C8.2)) <=Pdt psig IS TRUE;

IF (the value provided by the second pressure transmitter (C8.2)) IS NOT<=Pdt psig, THEN execute the following operations: (A) set the Incomplete Defuel alarm on the HMI; and (B) change the status beacon to alternating green/amber (note that the vehicle may (should) wait until gas is drawn from the system before defuelling may continue to completion); and IF the operator chooses to terminate the defuelling process, THEN execute operation to (A) record pressure and/or temperature data, (B) calculate the amount of gas transferred, and (C) store the data with the defuelling log for the VPN.

FIG. 10F, FIG. 10G, FIG. 10H, FIG. 10I and FIG. 10J depict schematic views (flow charts) of embodiments of the refuelling operations of the apparatus 1100 of FIG. 1.

Figure 10F:
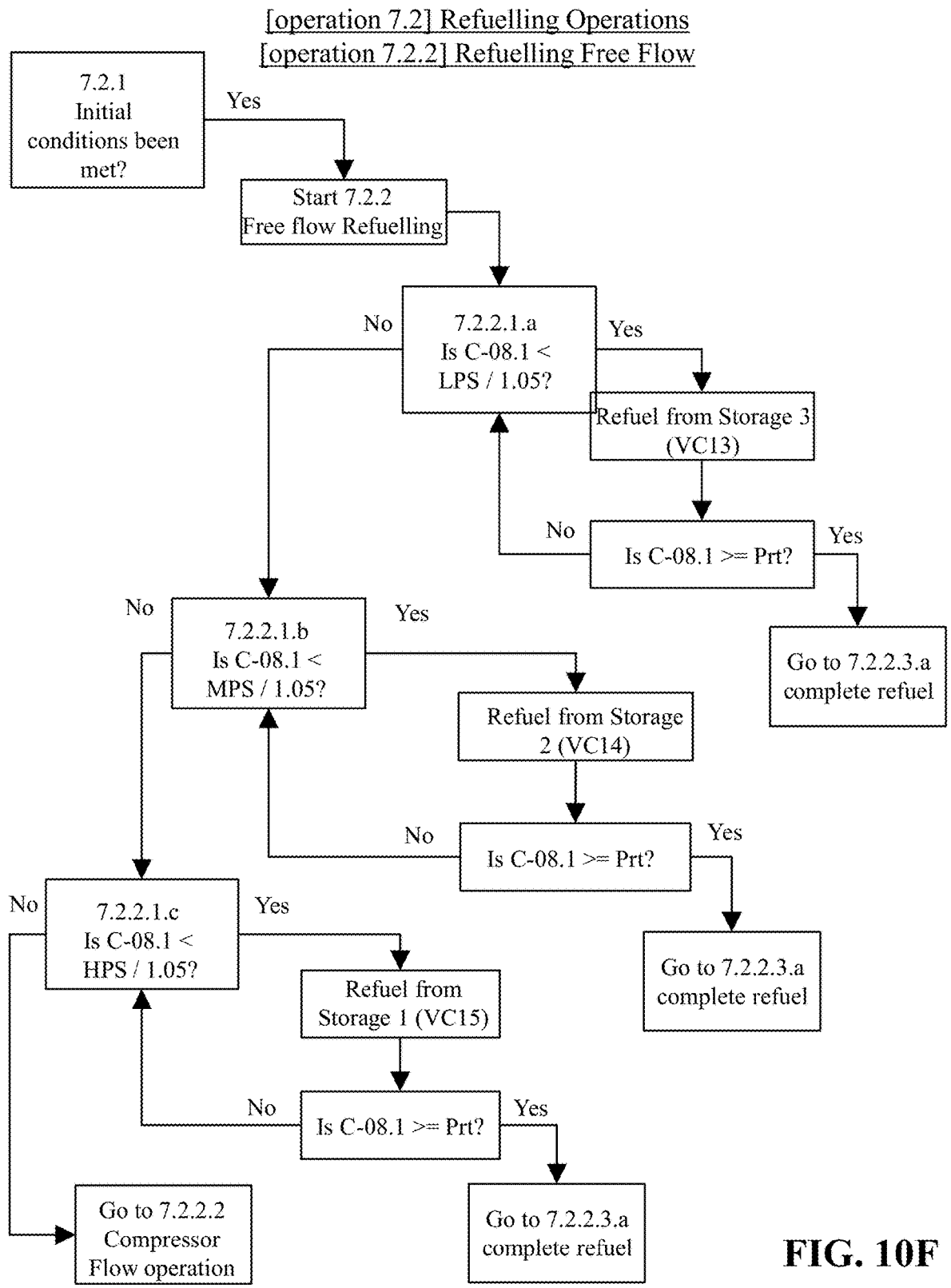
FIG. 10F, FIG. 10G, FIG. 10H, FIG. 10I and FIG. 10J depict schematic views (flow charts) of embodiments of the refuelling operations of the apparatus of FIG. 1.

Referring to the embodiment as depicted in FIG. 10F, there the following operations are depicted:

[operation 7.2] Refuelling operations include the execution of the following the refuelling operations.

[operation 7.2.1] includes the following operations:

DETERMINE WHETHER the initial conditions for refuelling are satisfied (been met): the controller issues a command signal (OPEN or FLOW ENABLE) to the gas flow valve (such as, the first controllable valve (C9.1) or the eighth controllable valve (C9.8)) ONLY WHEN the following conditions have been met:

[operation 7.2.1.a] includes the following operations (not depicted):
detect whether the "Authorize Refuelling" button of the HMI was activated (pushed) by the operator; and
request input from the operator, via the HMI, to enter the vehicle's VPN (once the "Authorize Refuelling" button of the HMI is activated by the operator); and receive and record the VPN (the VPN that was received via the HMI) to the memory assembly 1102 (as depicted in FIG. 1, in which the VPN may be used to log the refuelling events); and
initiate a predetermined countdown (such as, a 15-minute countdown); and record the date and time stamp for the occurrence of this event (that is, RCX=Refuelling Clock Started).

[operation 7.2.1.b] includes the following operations:
wait for the operator to connect the vehicle to the refuelling system; and receive an indication (via the HMI) that the operated activated the "Start Refuelling" button.

[operation 7.2.1.c] includes the following operations: wait for a pressure drop at the refuel pressure gauge (the first pressure gauge (C7.1)) and at the refuel pressure transmitter (first pressure transmitter (C8.1)).

[operation 7.2.1.d] includes the following operation: receive (read) the value of the first pressure transmitter (C8.1) that indicates the starting pressure of the vehicle.

[sub-operation 7.2.1.d.1] includes the following operations:
receive the signal indicating the value of the pressure measured by the first pressure transmitter (C8.1); and
DETERMINE WHETHER the value provided by the first pressure transmitter (C8.1) >Prt/1.10 psig IS TRUE; and
IF the value provided by the first pressure transmitter (C8) >Prt/1.10 psig IS TRUE, THEN terminate the refuelling process normally (i.e.; proceed to operation [operation 7.2.2.3.a] of [operation 7.2.2] for Refuelling Operation.

[sub-operation 7.2.1.d.2] includes the following operation: IF the value provided by the first pressure transmitter (C8) >4,500 psig, THEN terminate refuelling process, and set the P alarm to HIGH state.

[sub-operation 7.2.1.d.3] includes the following operations: IF the VPN that was received from the HMI is recorded, THEN use the volume recorded during the defuelling event and the pressure value provided by the first pressure transmitter (C8.1) to DETERMINE the volume to be dispensed to the vehicle.

[operation 7.2.1.e] includes the following operations: IF the value of a predetermined countdown timer (such as a 15-minute countdown timer) is greater than the upper countdown limit (such as 15 minutes), THEN set a WARNING alarm (such as, alternating green light and amber light).

[sub-operation 7.2.1.e.1] includes the following operation: transmit an indication to the HMI that the operator (the technician) may have forgotten to depress the Authorization Button (of the HMI);

[sub-operation 7.2.1.e.2] includes the following operation: acknowledge the WARNING alarm;

[sub-operation 7.2.1.e.3] includes the following operation: verify that the equipment is properly connected per [SECTION 5.1.3] Refuelling Instructions;

[sub-operation 7.2.1.e.4] includes the following operation: change the Status beacon to a solid amber light;

[sub-operation 7.2.1.e.5] includes the following operation: wait for re-authorization signal indicating to begin the refuelling event via the HMI;

[sub-operation 7.2.1.e.6] includes the following operation: initiate refuelling in response to receiving the for re-authorization signal;

[sub-operation 7.2.1.e.7] includes the following operations: change the Status beacon to a pulsating green light;

[sub-operation 7.2.1.1] includes the following operation: record (write) the time and date stamp for this event with the vehicle VPN (RI=Refuelling Initiated) to computer memory.

[operation 7.7.2] Refuelling Free Flow operation includes the following operations:

[operation 7.2.2] start refuelling operation (once [operation 7.2.1] confirms determination for satisfying that initial conditions have been met (DETERMINE a cascade flow).

[operation 7.2.2.1.a] includes the following operations:
DETERMINE (compute) WHETHER the value provided by the first pressure transmitter (C8) <{the value provided by the fifth pressure transmitter (C8.5) (for LPS)/1.05} IS TRUE;
IF the value provided by the first pressure transmitter (C8) <{the value provided by the fifth pressure transmitter (C8.5) (for LPS)/1.05}, IS FALSE, THEN continue to operation [7.2.2.1.b]; and
IF the value provided by the first pressure transmitter (C8) <{the value provided by the fifth pressure transmitter (C8.5) (for LPS)/1.05} IS TRUE, THEN refuel from Storage 3 (VC13), and THEN DETERMINE (compute) whether the value provided by the first pressure transmitter (C8) >=Prt psig] is TRUE; and
IF the value provided by the first pressure transmitter (C8) >=Prt psig IS FALSE, THEN continue to [operation 7.2.2.1.a]; and
IF
the value provided by the first pressure transmitter (C8) >=Prt psig IS TRUE, THEN continue to [operation 7.2.2.3.a] for complete refuel (i.e., terminate defuelling process normally).

[operation 7.2.2.1.b] includes the following operations:
DETERMINE WHETHER the value provided by the first pressure transmitter (C8.1) <{the value provided by the fourth pressure transmitter (C8.4) (for MPS)/1.05} IS TRUE; and
IF the value provided by the first pressure transmitter (C8) <{the value provided by the fourth pressure transmitter (C8.4) (for MPS)/1.05}, IS FALSE THEN continue to [operation 7.2.2.1.c]; and
IF the value provided by the first pressure transmitter (C8.1) IS<{the value provided by the fourth pressure transmitter (C8.4) (for MPS)/1.05}, THEN refuel from Storage 2 (VC14), and then compute (identify) whether the value provided by the first pressure transmitter (C8) >=Prt psig IS TRUE; and
IF the value provided by the first pressure transmitter (C8) >=Prt psig IS FALSE, THEN continue to [operation 7.2.2.1.b]; and
IF the value provided by the first pressure transmitter (C8) >=Prt psig IS TRUE, THEN continue to [operation 7.2.2.3.a] for complete refuel (i.e., terminate defuelling process normally).

[operation 7.2.2.1.c] includes the following operations:
DETERMINE whether the value provided by the first pressure transmitter (C8) <{the value provided by the third pressure transmitter (C8.3) (for HPS)/1.05}; and
IF the value provided by the first pressure transmitter (C8) <{the value provided by the third pressure transmitter (C8.3) (for HPS)/1.05} IS FALSE, THEN continue to [operation 7.2.2.2] for compressor flow operation (routine) to begin compressor flow routine; and
IF the value provided by the first pressure transmitter (C8) <{the value provided by the third pressure transmitter (C8.3) (for HPS)/1.05}, THEN refuel from Storage 1 (VC15), and THEN DETERMINE whether the value provided by the first pressure transmitter (C8) >=Prt psig IS TRUE; and
IF the value provided by the first pressure transmitter (C8) >=Prt psig IS FALSE, THEN continue to [operation 7.2.2.1.c];
IF the value provided by the first pressure transmitter (C8.1)=Prt psig IS TRUE, THEN continue to [operation 7.2.2.3.a] for complete refuel (i.e., terminate defuelling process normally).

Figure 10G:
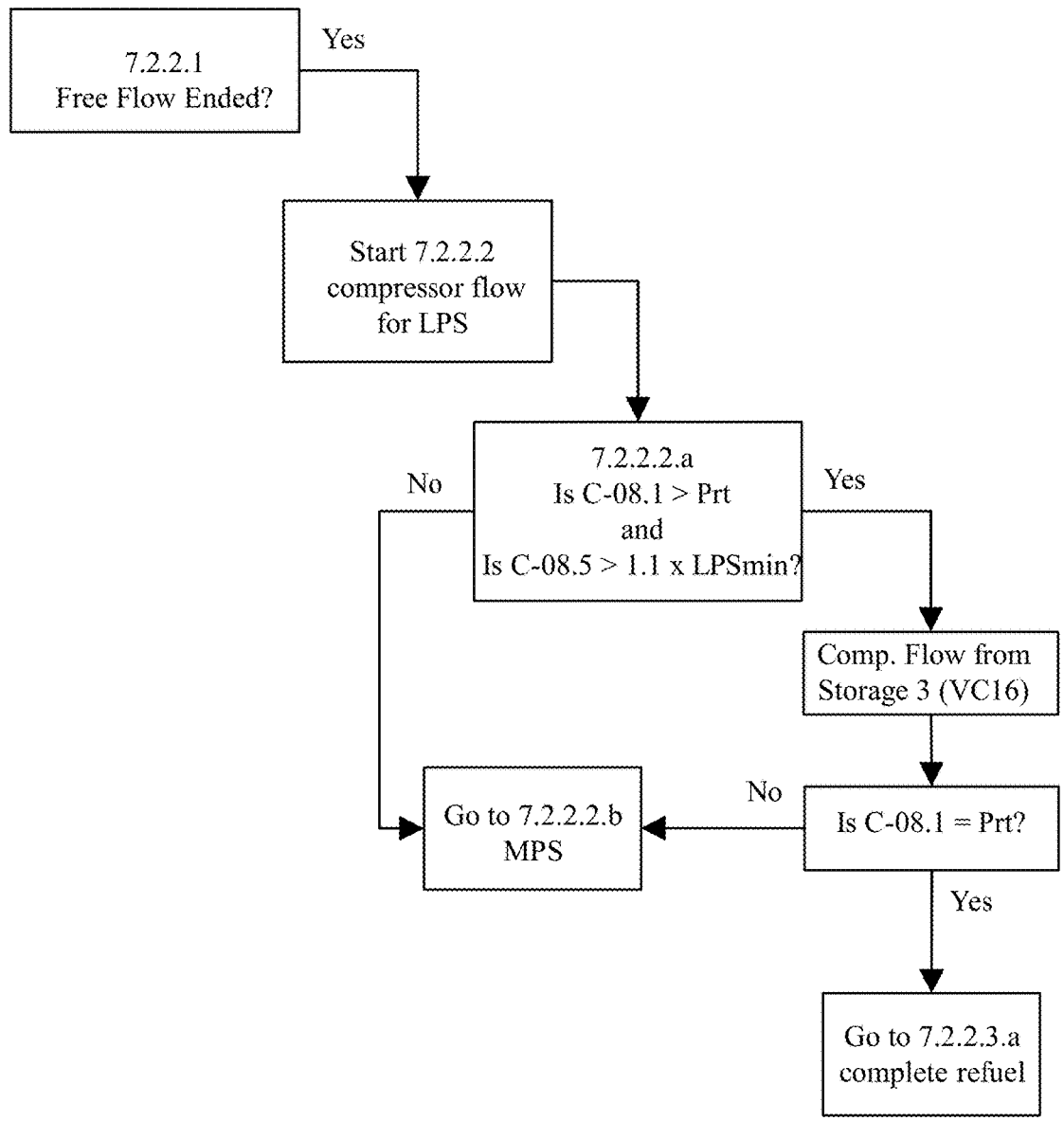

Referring to the embodiment as depicted in FIG. 10G, there is depicted the following operations:
[operation 7.2.2.2] start compressor flow operation (routine) for LPS (once [operation 7.2.2.1] has completed accordingly);
[operation 7.2.2.2.a] includes the following operations:
compute (identify or DETERMINE) whether {the value provided by the first pressure transmitter (C8) >Prt} AND {the value provided by the fifth pressure transmitter (C8) >1.1×LPSmin}; and
IF ANY ONE OF {the value provided by the first pressure transmitter (C8) >Prt} IS TRUE AND {the value provided by the fifth pressure transmitter (C8) >1.1× LPSmin IS TRUE} IS FALSE, THEN continue to [operation 7.2.2.2.b] for MPS sub-operation; and
IF {the value provided by the first pressure transmitter (C8) >Prt IS TRUE} AND {the value provided by the fifth pressure transmitter (C8) >1.1×LPSmin IS TRUE}) that is, BOTH TRUE), THEN (A) initiate compressor flow to Storage 3 (VC16); this process continues until the calculated refuel volume is achieved, or the vehicle has achieved a full fill of fuel (of a reasonable quantity of fuel), or the compressor's low inlet set pressure is achieved, and THEN (B) DETERMINE whether the value provided by the first pressure transmitter (C8.1)=Prt psig; and
IF the value provided by the first pressure transmitter (C8.1)=Prt psig IS TRUE, THEN continue to [operation 7.2.2.3.a] for complete refuel (i.e., terminate defuelling process normally); and
IF the value provided by the first pressure transmitter (C8.1)=Prt psig IS FALSE, THEN continue to [operation 7.2.2.2.b] for MPS sub-operation (subroutine).

Figure 10H:
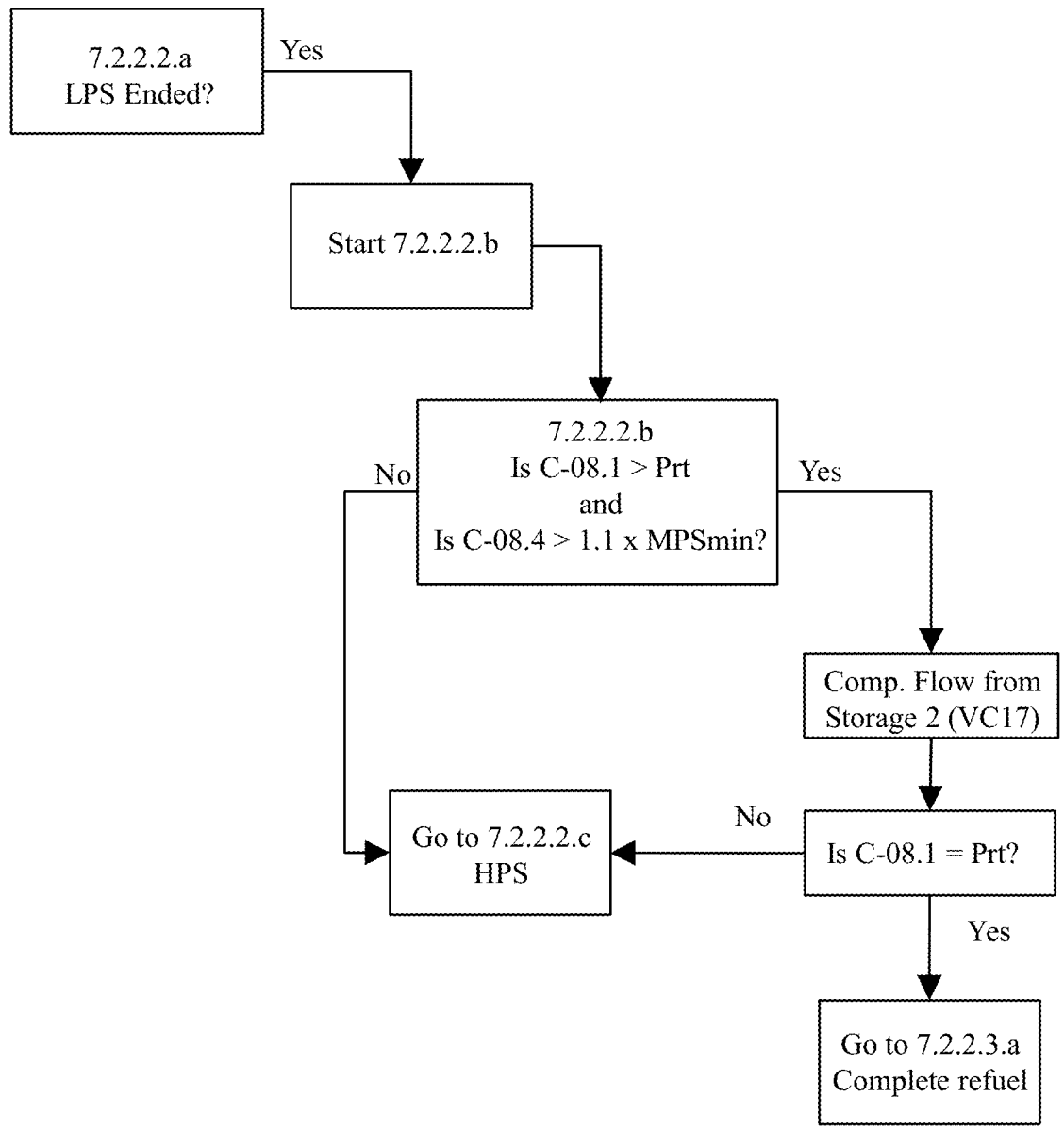

Referring to the embodiment as depicted in FIG. 10H, there is depicted the following operations:
[operation 7.2.2.2.b] includes the following operations:
DETERMINE whether the value provided by the first pressure transmitter (C8) >Prt AND the value provided by the fourth pressure transmitter (C8) >{1.1×MPSmin IS TRUE once [operation 7.2.2.2.a] is completed; and
IF the value provided by the first pressure transmitter (C8) >Prt IS TRUE AND the value provided by the fourth pressure transmitter (C8) >{1.1×MPSmin} IS TRUE, THEN (A) initiate compressor flow to Storage 2 (VC17); this process continues until the calculated refuel volume is achieved, or the vehicle has achieved a full fill of fuel, or the compressor's low inlet set pressure is achieved, and THEN (B) DETERMINE whether the value provided by the first pressure transmitter (C8.1)=Prt psig IS TRUE; and
IF the value provided by the first pressure transmitter (C8.1)=Prt psig IS FALSE, THEN continue to [operation 7.2.2.2.c] for HPS sub-operation (subroutine) for refuelling compressor flow routine for HPS; and
IF the value provided by the first pressure transmitter (C8.1)=Prt psig IS TRUE, THEN continue to [operation 7.2.2.3.a] for complete refuel (i.e., terminate defuelling process normally).

Figure 10I:
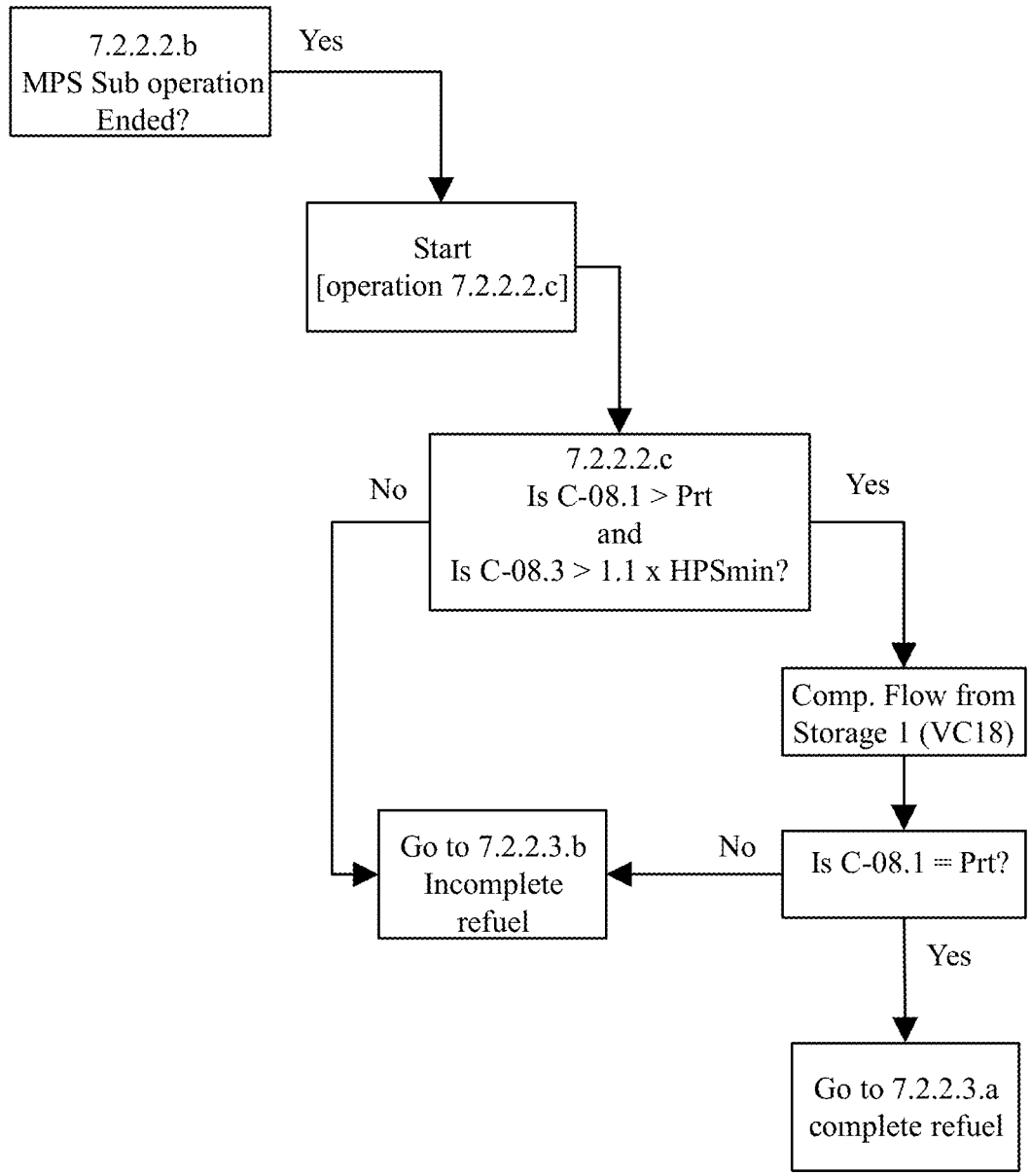

Referring to the embodiment as depicted in FIG. 10I, there is depicted the following operations:
[operation 7.2.2.2.c] includes the following operations:
DETERMINE whether {the value provided by the first pressure transmitter (C8) >Prt IS TRUE} AND {the value provided by the third pressure transmitter (C8) >{1.1×HPSmin} IS TRUE} once [operation 7.2.2.2.b] is completed); and
IF ANY ONE OF {the value provided by the first pressure transmitter (C8) >Prt IS TRUE} AND {the value provided by the third pressure transmitter (C8) >{1.1× HPSmin} IS TRUE} IS FALSE, THEN continue to [operation 7.2.2.3.b] for incomplete refuel operation; and
IF {the value provided by the first pressure transmitter (C8) >Prt} AND {the value provided by the third pressure transmitter (C8) >{1.1×HPSmin} are BOTH TRUE, (A) THEN initiate compressor flow to Storage 1 (VC18); this process continues until the calculated refuel volume is achieved, or the vehicle has achieved a full fill, or the compressor's low inlet set pressure is achieved, and THEN (B) DETERMINE whether the value provided by the first pressure transmitter (C8.1)= Prt psig IS TRUE; and IF the value provided by the first pressure transmitter (C8.1)=Prt psig IS FALSE, THEN continue to [operation 7.2.2.3.b] for incomplete refuel operation; and
IF the value provided by the first pressure transmitter (C8.1)=Prt psig IS TRUE, THEN continue to [operation 7.2.2.3.a] for complete refuel (i.e., terminate defuelling process normally).

Figure 10J:
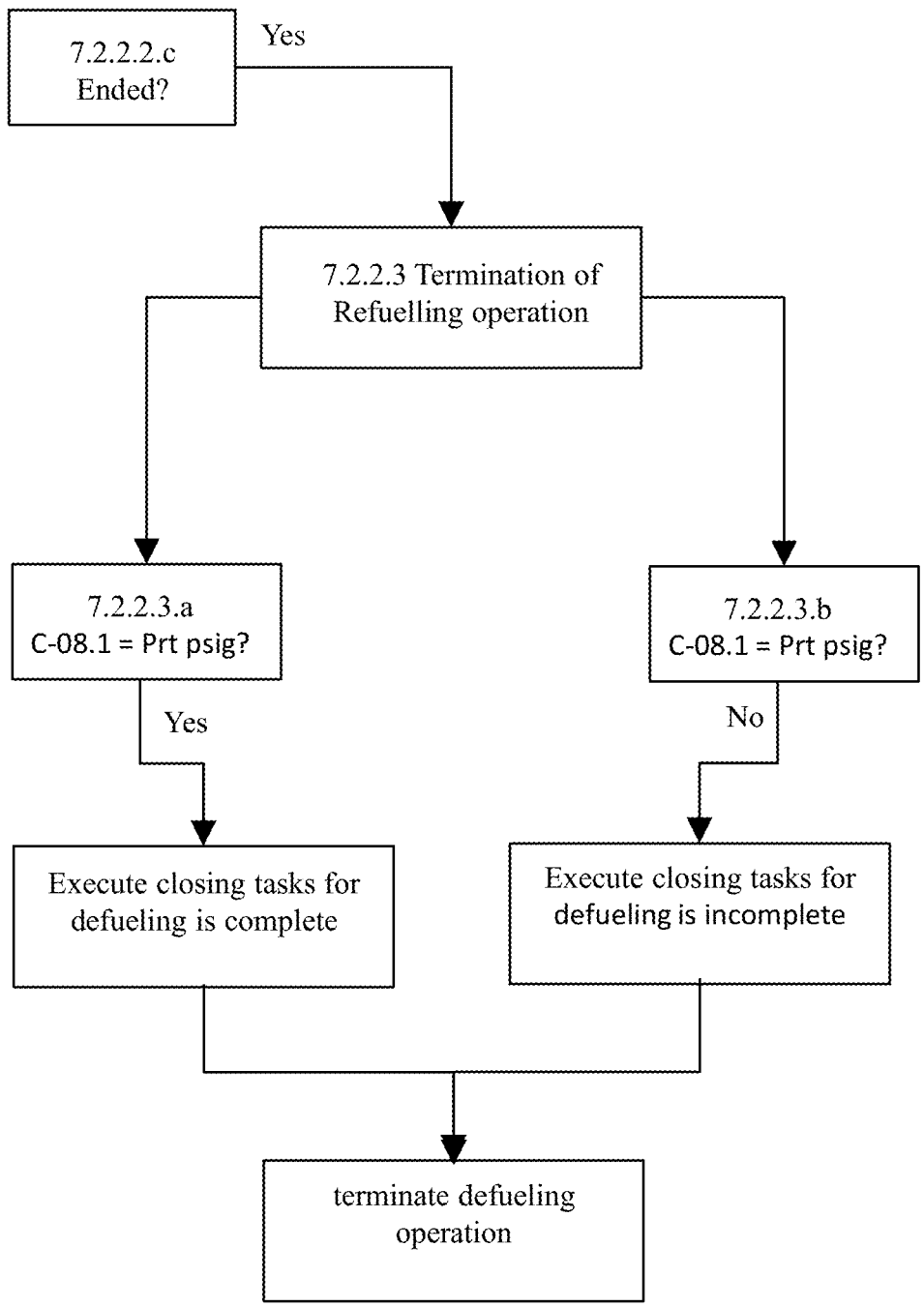
Figure 10K:
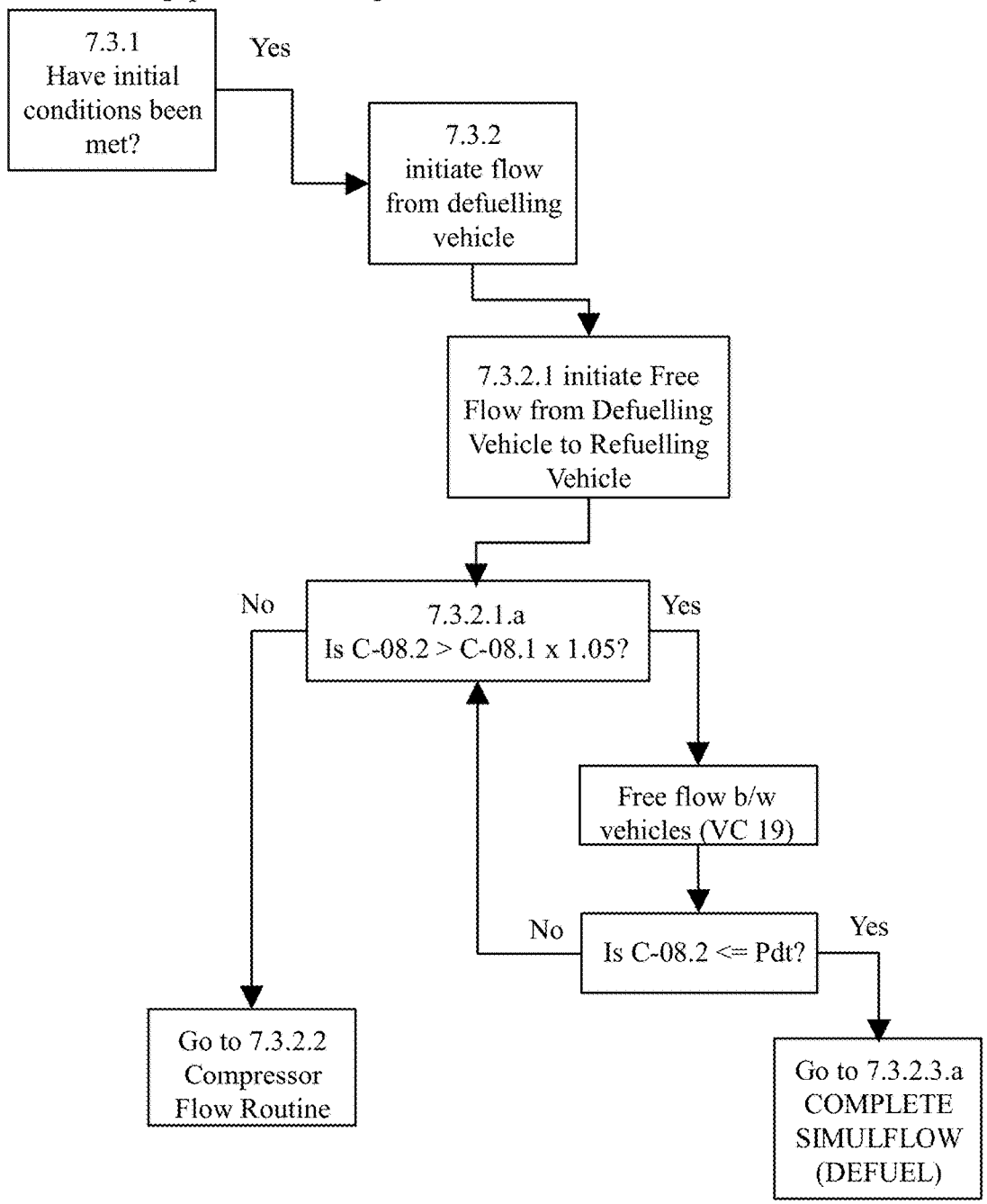
FIG. 10K and FIG. 10L depict schematic views (flow charts) of embodiments of simulflow operations (simultaneous flow operations) of the apparatus of FIG. 1.
Figure 10L:
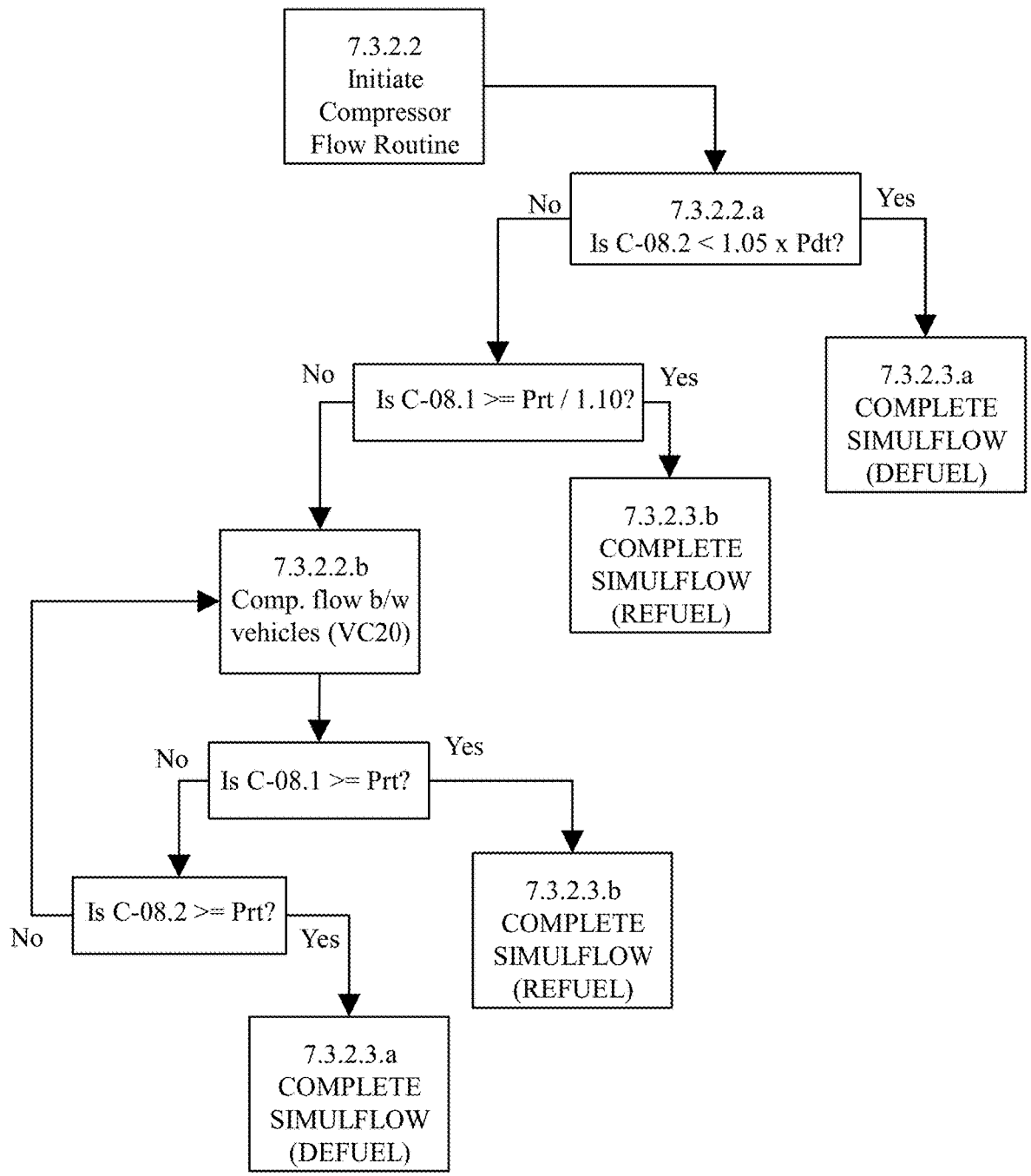

Referring to the embodiment as depicted in FIG. 10J, there is depicted the following operations:
[operation 7.2.2.3] execute Termination of Refuelling operation with the following operations:
[operation 7.2.2.3.a] includes the following operations:
DETERMINE WHETHER the value provided by the first pressure transmitter (C8.1)=Prt psig IS TRUE;
IF the value provided by the first pressure transmitter (C8.1)=Prt psig IS TRUE, THEN (A) store date and time of refuel completion with fuel quantity data and vehicle PIN (see fuel quantity estimation logic), (B) turn on "Refuel Complete" indicator on HMI, and (C) change status beacon to solid green.
[operation 7.2.2.3.b] includes the following operations:
execute incomplete refuel operation by executing the following operations:
(A) Set an "Incomplete Refuel" alarm on HMI; and
(B) change Status beacon to alternating green light and amber light; and
(C) if a full fill may be required, then the vehicles may (should) wait until more gas is introduced to the system before refuelling may continue to completion.

[operation 7.2.2.3.c] includes the following operations:
transfer data associated with the VPN defuelling and refuelling events to computer memory (storage), and clear these events from the active register (of the controller).

FIG. 10K and FIG. 10L depict schematic views (flow charts) of embodiments of simulflow operations (simultaneous flow operations) of the apparatus 1100 of FIG. 1.

Referring to the embodiment as depicted in FIG. 10K, the following operations are depicted:

[operation 7.3] execute the SIMULFLOW operations (to be executed by the controller);

[operation 7.3.1] includes the following operations: DETERMINE WHETHER initial conditions for SIMULFLOW operation are satisfied; Issue control signal (for opening or flow enabling) the gas flow valve (such as the second controllable valve (C9.2) or the fourth controllable valve (C9.4)) ONLY when ALL of the following operations have been executed or met (satisfied):

[operation 7.3.1.1] includes the following operations:
DETERMINE WHETHER the "AUTHORIZE SIMULFLOW" command was received from (via) the HMI (in response to operator initiating command via pushing a button); and
transmit a prompt signal to the HMI, in which the prompt signal urges the HMI to indicate to the operator a request to enter, via the HMI, the VPN (VPNd) of the Decanting vehicle and the VPN (VPNr) of the Receiving vehicle; and
receive, via the HMI, the VPN (VPNd) of the Decanting vehicle, and the's VPN (VPNr) of the Receiving vehicle (information to be netered by the operator via the HMI); and write (record) the VPNs to computer memory (in which the VPNS may be used to track the SIMULFLOW events); and
start a predetermined countdown (such as, a 15-minute timer countdown); and record the Date and time stamp for the event (SCX=SIMULFLOW clock started) to the computer memory (such as, of the controller assembly (F1)).

[operation 7.3.1.2] includes the following operations:
receive the "START SIMULFLOW" signal from the HMI in response to the operator pressing the "START SIMULFLOW" button via the HMI (prior to the operator pressing the "START SIMULFLOW" button, it is presumed that the operator has performed the following user actions: (A) connect the defuelling vehicle to the defuelling system; and
(B) connect the refuelling vehicle to the refuelling hose); and
transmit a display signal to the HMI, in which the HMI indicates to the operator that the SIMULFLOW operations are in progress.

[operation 7.3.1.3] includes the following operations:
DETERMINE WHETHER (detect or wait for) a pressure rise occurred for both the defuel pressure gauge (second pressure gauge (C7.2)) and the defuel pressure transmitter (first pressure transmitter (C8.1)).

[operation 7.3.1.4] includes the following operations:
read (receive) the pressure value indicated by (provided by) the second pressure transmitter (C8.2), in which the pressure value indicates that the pressure of the decanting vehicle is greater than Pdt psig, but less than an upper predetermined limit (such as, about 4,500 psig).

[operation 7.3.1.4.a] includes the following operations:
DETERMINE WHETHER IF the pressure value from the second pressure transmitter (C8) <=1.05×Pdt psig IS TRUE; and
IF the pressure value provided by the second pressure transmitter (C8) <=1.05×Pdt psig IS TRUE, THEN terminate the SIMULFLOW process normally (i.e.; proceed to [operation 7.3.2.3a] of [operation 7.3.2] SIMULFLOW operations.

[operation 7.3.1.4.b] includes the following operations:
DETERMINE WHETHER IF the pressure value provided by the second pressure transmitter (C8) >4,500 psig IS TRUE; and
IF the pressure value provided by the second pressure transmitter (C8) >4,500 psig IS TRUE, THEN terminate the SIMULFLOW process, and set the P alarm to a HIGH STATE.

[operation 7.3.1.5] includes the following operations:
wait for a predetermined time duration (such as, for about one second), and then read (detect) whether the flow of gas from the decanting vehicle to the refuelling vehicle (VC19); and
DETERMINE WHETHER there was a pressure rise followed by a pressure drop at both the refuel pressure gauge (the first pressure gauge (C7.1)) and the refuel pressure transmitter (first pressure transmitter (C8.1)).

[operation 7.3.1.5.a] includes the following operations:
IF the value provided by the first pressure transmitter (C8.1) does not show a pressure rise followed by a pressure drop, THEN continue to SIMULFLOW Compressor Flow Routine, per [operation 7.3.2.2.a] of [operation 7.3.2] SIMULFLOW operations.

[operation 7.3.1.6] includes the following operations:
read (receive) the pressure value provided by the first pressure transmitter (C8.1), in which the pressure value indicates the starting pressure of the refuelling vehicle.

[operation 7.3.1.6.a] includes the following operations:
DETERMINE WHETHER the value provided by the first pressure transmitter (C8.1) >Prt/1.10 psig IS TRUE; and
IF the value provided by the first pressure transmitter (C8) >Prt/1.10 psig IS TRUE, THEN terminate SIMULFLOW process normally (i.e.; continue to [operation 7.3.2.3b] of [operation 7.3.2] SIMULFLOW operations.

[operation 7.3.1.6b] includes the following operations:
DETERMINE WHETHER IF the value provided by the first pressure transmitter (C8.1) >4,500 psig IS TRUE; and
IF the value provided by the first pressure transmitter (C8) >4,500 psig IS TRUE, THEN terminate SIMULFLOW process and set High P alarm.

[operation 7.3.1.6c] includes the following operations:
IF the difference in time between the state of [operation 7.3.1.1] and the start of [operation 7.3.1.2] is greater than a predetermined time limit (such as, 15 minutes), THEN set a WARNING alarm (such as, alternating green light and amber light) to indicate that the operator (technician) may have forgotten to depress the Start SIMULFLOW button of the HMI.

[operation 7.3.1.6d] includes the following operations:
acknowledge the alarm.

[operation 7.3.1.6e] includes the following operations:
verify that everything is properly connected per [SECTION 5.1.4] SIMULFLOW Instructions.

[operation 7.3.1.6f.1] includes the following operations:
change the Status beacon to a solid amber light.

[operation 7.3.1.6f.2] includes the following operations:
receive the re-authorize signal via the HMI for the defuelling event, in which case once received, the SIMULFLOW operations may proceed accordingly.

[operation 7.3.1.6g] includes the following operations: change Status beacon to a pulsating green light.

[operation 7.3.1.7] includes the following operations: record (write) the time and date stamp for the event along with the vehicle VPN (SI=SIMULFLOW initiated).

Referring to the embodiment as depicted in FIG. 10K, the following operations are depicted:

[operation 7.3.2] SIMULFLOW operation; initiate fuel flow from defuelling vehicle to refuelling vehicle only IF the conditions of [operation 7.3.1] for determination of initial conditions for SIMULFLOW is satisfactory (acceptable).

[operation 7.3.2.1] initiate Free Flow from Defuelling Vehicle to Refuelling Vehicle.

[operation 7.3.2.1.a] includes the following operations:
receive the pressure value from the second pressure transmitter (C8.2); and
DETERMINE (compute) whether the pressure value from the second pressure transmitter (C8) >{1.05×the pressure value provided by the first pressure transmitter (C8.1)} IS TRUE; and
IF the pressure value from the second pressure transmitter (C8) >{1.05×the pressure value provided by the first pressure transmitter (C8.1)} IS FALSE, THEN continue to [operation 7.3.2.2] Compressor Flow operation, including [operation 7.3.2.2.a] to initiate compressor flow; and
IF the pressure value from the second pressure transmitter (C8) >{1.05×the pressure value provided by the first pressure transmitter (C8.1)} IS TRUE, THEN (A) initiate Free Flow between vehicles (VC19) (that is, flow from Defuelling Vehicle to Refuelling vehicle) (for the case where the processor uses the control logic to calculate that the free flow rate is equal to or less than the compressor flow rate plus 10%, the processor may execute the next operation); and THEN (B) DETERMINE whether the pressure value from the second pressure transmitter (C8) <=Pdt psig IS TRUE; and
IF the pressure value from the second pressure transmitter (C8.2) IS<=Pdt psig IS TRUE, THEN continue to [operation 7.3.2.3.a] to terminate SIMULFLOW on completed defuel; and IF the pressure value from the second pressure transmitter (C8) <=Pdt psig IS FALSE, THEN continue to [operation 7.3.2.1.a].

Referring to the embodiment as depicted in FIG. 10L, the following operations are depicted:

[operation 7.3.2.2] initiate (begin) Compressor Flow operation by executing the following operations:

[operation 7.3.2.2.a] includes the following operations:
DETERMINE WHETHER the pressure value from the second pressure transmitter (C8) <{1.05×the pressure value of Pdt psig} IS TRUE; and IF the pressure value from the second pressure transmitter (C8) <{1.05×Pdt psig} IS TRUE, THEN (defuel is effectively complete) and THEN continue to [operation 7.3.2.3.a] complete simulflow (defuel) operation (i.e.; terminate SIMULFLOW on completed defuel); and
IF the pressure value from the second pressure transmitter (C8) <{1.05×Pdt psig} IS FALSE, THEN DETERMINE whether the value provided by the first pressure transmitter (C8.1)=>{Prt/1.10 psig} IS TRUE; and IF the value provided by the first pressure transmitter (C8.1)=>{Prt/1.10 psig} IS TRUE, THEN (refuel is effectively complete) continue to [operation 7.3.2.3.b] complete SIMULFLOW (refuel) operation (i.e.; terminate SIMULFLOW on completed refuel); and
IF the value provided by the first pressure transmitter (C8.1)=>{Prt/1.10 psig} IS FALSE, THEN continue to [operation 7.3.2.2.b] Compressor flow between the vehicles (VC20) (i.e., initiate compressor flow).

[operation 7.3.2.2.b] includes the following operations:
initiate compressor flow between vehicles (VC20) (for the case where the processor uses the control logic to calculate that the free flow rate is equal to or less than the compressor flow rate plus 10%, the processor may proceed to the next operation); and
DETERMINE WHETHER the value provided by the first pressure transmitter (C8.1)=>Prt psig IS TRUE; and
IF the value provided by the first pressure transmitter (C8.1)=>Prt psig IS TRUE, THEN continue to [operation 7.3.2.3.b] complete SIMULFLOW refuel (i.e.; terminate SIMULFLOW on completed refuel); and
IF the value provided by the first pressure transmitter (C8.1)=>Prt psig IS FALSE, THEN DETERMINE whether the pressure value from the second pressure transmitter (C8.2)=>Pdt psig IS TRUE; and
IF the pressure value from the second pressure transmitter (C8.2)=>Pdt psig IS TRUE, THEN continue to [operation 7.3.2.3.a] complete SIMULFLOW defuel (i.e.; terminate SIMULFLOW on completed defuel); and
IF the pressure value from the second pressure transmitter (C8.2)=>Pdt psig IS FALSE, THEN continue to [operation 7.3.2.2.b].

[operation 7.3.2.3] initiate Terminate SIMULFLOW operation by executing the following operations:

[operation 7.3.2.3.a] includes the following operations:
initiate Completed Defuel operation; and
write (store, save) date and time of defuel completion with fuel quantity data and vehicle PIN (see fuel quantity estimation logic) to computer memory; and
turn ON indicator for annunciation of "SIMULFLOW Terminated by Completed Defuel" indicator located on the HMI; and
change Status beacon to solid green light.

[operation 7.3.2.3.b]
initiate Completed Refuel operation; and
write (store, save) date and time of defuel completion with fuel quantity data and vehicle PIN (see fuel quantity estimation logic) to computer memory; and
turn on indicator for annunciation of "SIMULFLOW Terminated by Completed Refuel" indicator located on the HMI; and
change Status beacon to solid green light.

Figure 10M:
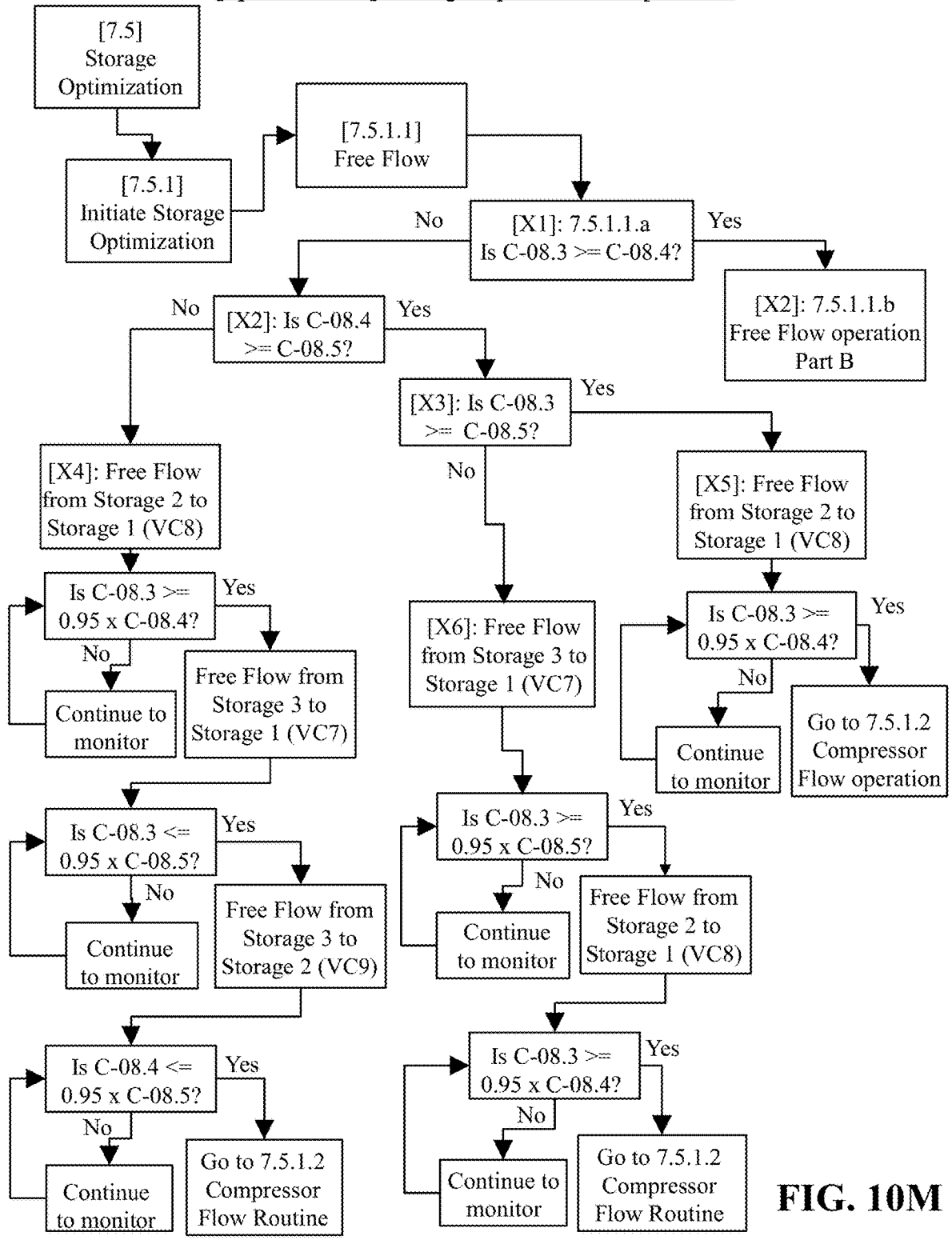
FIG. 10M, FIG. 10N and FIG. 10O depict schematic views (flow charts) of embodiments of a storage optimization operation of the apparatus of FIG. 1.
Figure 10N:
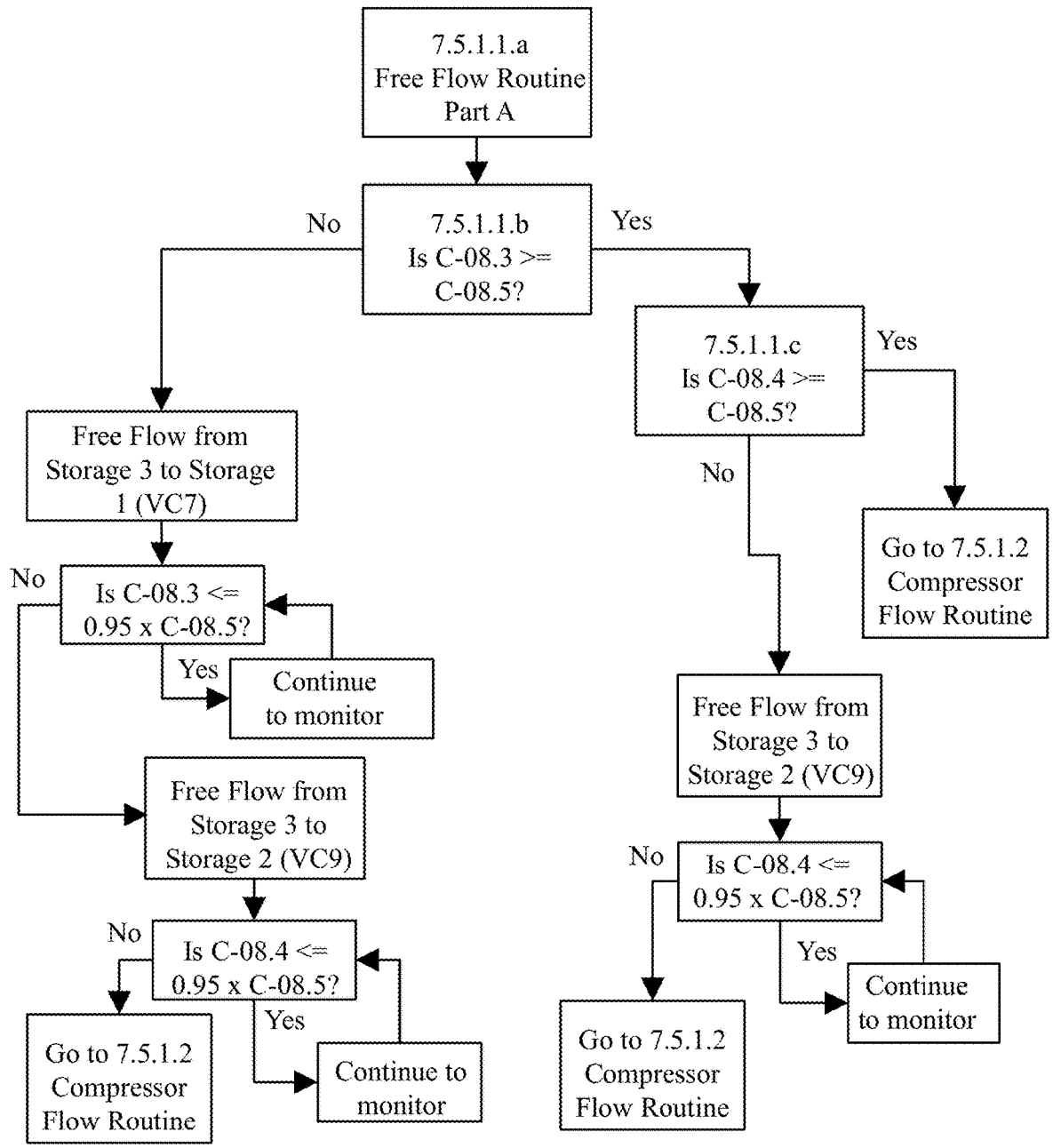
Figure 10O:
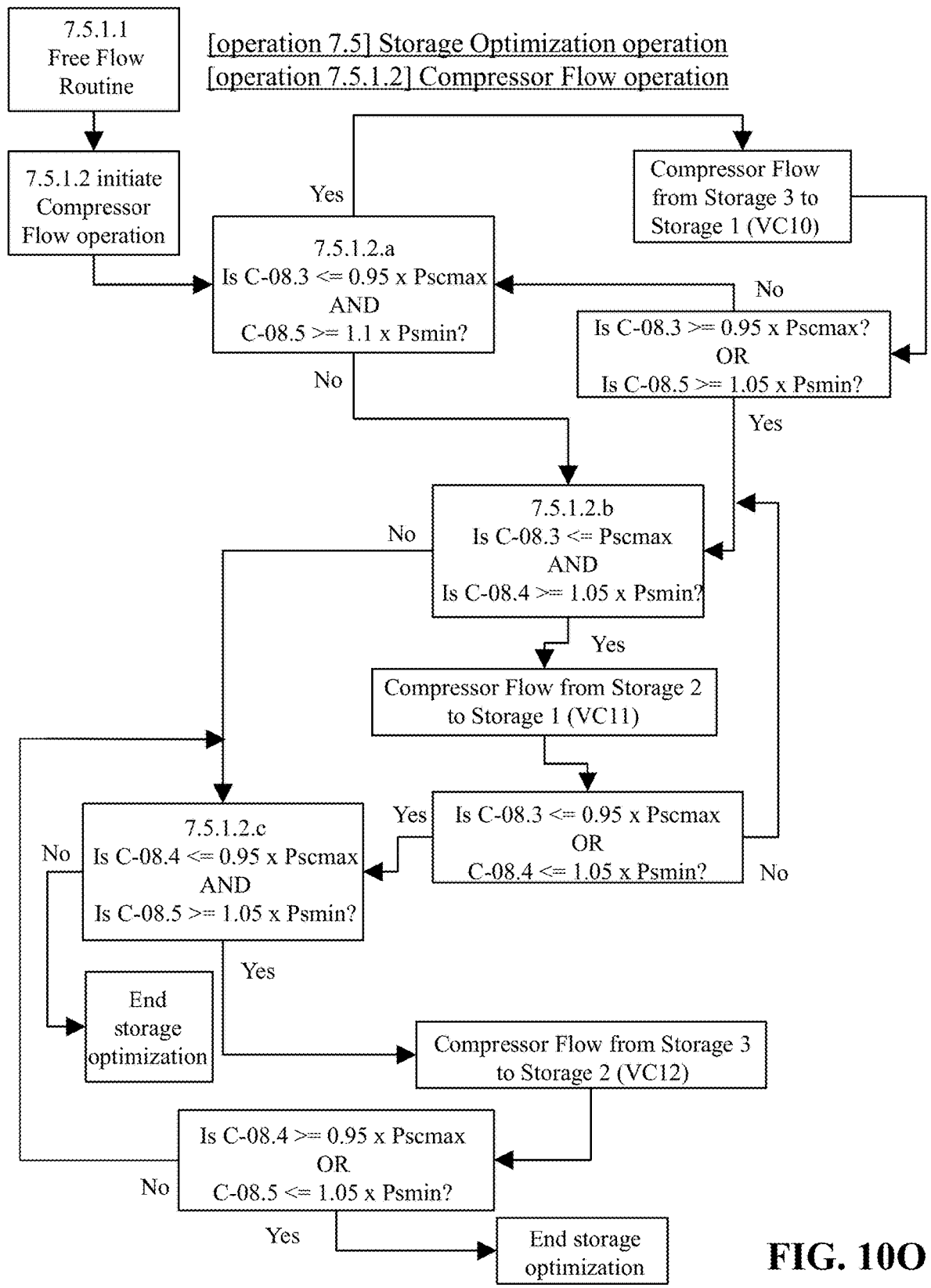

FIG. 10M, FIG. 10N and FIG. 10O depict schematic views (flow charts) of embodiments of a storage optimization operation of the apparatus 1100 of FIG. 1.

Referring to the embodiment as depicted in FIG. 10M, the following operations are depicted:

[operation 7.5] initiate the Storage Optimization operations;

[operation 7.5.1] initiate Storage Optimization operation for FREE FLOW condition;

[operation 7.5.1.1] initiate Free Flow operation; this operation ensures (A) the HPS is the highest pressure of the three banks, or equal to MPS, and (B) the MPS is either (A) equal to HPS, (B) greater than LPS, or (C) equal to LPS.

[operation 7.5.1.1.a] includes the following operations:
[operation X1] includes the following operations:
DETERMINE whether IF the value provided by the third pressure transmitter (C8.3) (for HPS) >=the value provided by the fourth pressure transmitter (C8.4) (for MPS) IS TRUE, and THEN:
(A) IF the value provided by the third pressure transmitter (C8.3) (for HPS) >=the value provided by the fourth pressure transmitter (C8.4) (for MPS) IS TRUE continue to [operation 7.5.1.1.b] (in which case HPS is higher than MPS); and
(B) IF the value provided by the third pressure transmitter (C8.3) (for HPS) >=the value provided by the fourth pressure transmitter (C8.4) (for MPS) IS FALSE continue to [operation X2].

[operation X2] includes the following operations:
DETERMINE whether IF the value provided by the fourth pressure transmitter (C8.4) (for MPS) >=the value provided by the fifth pressure transmitter (C8.5) (for LPS) IS TRUE, THEN execute the following operations:
(A) IF the value provided by the fourth pressure transmitter (C8.4) (for MPS) >=the value provided by the fifth pressure transmitter (C8.5) (for LPS) IS TRUE THEN continue to [operation X3]; and
(B) IF the value provided by the fourth pressure transmitter (C8.4) (for MPS) >=the value provided by the fifth pressure transmitter (C8.5) (for LPS) IS FALSE (in which case LPS is highest, then MPS, then HPS is lowest; then equalize HPS with MPS, and then equalize HPS with LPS), and then continue to [operation X4].

[operation X3] includes the following operations:
DETERMINE whether IF the value provided by the third pressure transmitter (C8.3) (for HPS) >=the value provided by the fifth pressure transmitter (C8.5) (for LPS) IS TRUE, and THEN execute the following operations:
(A) IF the value provided by the third pressure transmitter (C8.3) (for HPS) >=the value provided by the fifth pressure transmitter (C8.5) (for LPS) IS TRUE (in which case MPS is higher than HPS which is higher than LPS) continue to [operation X5]; and
(B) IF the value provided by the third pressure transmitter (C8.3) (for HPS) >=the value provided by the fifth pressure transmitter (C8.5) (for LPS) IS FALSE continue to [operation X6].

[operation X4] includes the following operations:
SINCE the value provided by the fourth pressure transmitter (C8.4) (for MPS) >=the value provided by the fifth pressure transmitter (C8.5) (for LPS) IS FALSE (in which case LPS is highest, then MPS, then HPS is lowest, then equalize HPS with MPS, and then equalize HPS with LPS), THEN (A) initiate Free Flow from Storage 2 (MPS) to Storage 1 (HPS) (VC8) (for the case where the processor uses the control logic to calculate that the free flow rate is equal to or less than the compressor flow rate plus 10%, the processor may proceed to execute the next operation); and THEN (B) DETERMINE whether IF the value provided by third pressure transmitter (C8) >={0.95×the value provided by the fourth pressure transmitter (C8.4)} IS TRUE; and
IF the value provided by third pressure transmitter (C8) >={0.95×the value provided by the fourth pressure transmitter (C8.4)} IS FALSE, THEN continue monitoring IF the value provided by third pressure transmitter (C8) >={0.95×the value provided by the fourth pressure transmitter (C8.4)} IS TRUE (until value changes from FALSE to TRUE); and
IF the value provided by third pressure transmitter (C8) >={0.95×the value provided by the fourth pressure transmitter (C8.4)} IS TRUE, THEN (A) initiate Free Flow from Storage 3 (LPS) to Storage 1 (HPS) (VC7) (for the case where the processor uses the control logic to calculate that the free flow rate is equal to or less than the compressor flow rate plus 10%, the processor may proceed to the next operation); and THEN (B) DETERMINE whether IF the value provided by third pressure transmitter (C8) >={0.95×the value provided by the fifth pressure transmitter (C8.5)} IS TRUE; and IF the value provided by third pressure transmitter (C8) >={0.95×the value provided by the fifth pressure transmitter (C8.5)} IS FALSE, THEN continue to monitor IF the value provided by third pressure transmitter (C8) >={0.95×the value provided by the fifth pressure transmitter (C8.5)} IS TRUE (until value changes from FALSE to TRUE); and
IF the value provided by third pressure transmitter (C8) >={0.95×the value provided by the fifth pressure transmitter (C8.5)} IS TRUE (in which case MPS is lowest and HPS and LPS are equal), THEN (A) initiate Free Flow from Storage 3 (LPS) to Storage 2 (MPS) (VC9) (for the case where the processor uses the control logic to calculate that the free flow rate is equal to or less than the compressor flow rate plus 10%, the processor may proceed to the next operation); and THEN (B) DETERMINE whether the value provided by the fourth pressure transmitter (C8) <={0.95×the value provided by the fifth pressure transmitter (C8.5)} IS TRUE; and
IF the value provided by the fourth pressure transmitter (C8) <={0.95×the value provided by the fifth pressure transmitter (C8.5)} IS FALSE, THEN continue to monitor
IF the value provided by the fourth pressure transmitter (C8) <={0.95×the value provided by the fifth pressure transmitter (C8.5)} IS TRUE (until value changes from FALSE to TRUE); and
IF the value provided by the fourth pressure transmitter (C8) <={0.95×the value provided by the fifth pressure transmitter (C8.5)} IS TRUE (in which case HPS is highest and MPS and LPS are equal), THEN continue to [operation 7.5.1.2] compressor flow operation.

[operation X5] includes the following operations:
SINCE the value provided by the third pressure transmitter (C8.3) (for HPS) >=the value provided by the fifth pressure transmitter (C8.5) (for LPS) IS TRUE, THEN (A) initiate Free flow of fuel gas from Storage 2 (MPS) to Storage 1 (HPS) (VC8) (for the case where the processor uses the control logic to calculate that the free flow rate is equal to or less than the compressor flow rate plus 10%, the processor may proceed to the next operation); and THEN (B) DETERMINE whether IF the value provided by the third pressure transmitter (C8.3) (for HPS) >={0.95×the value provided by the fourth pressure transmitter (C8.4)} (for MPS) IS TRUE; and
IF the value provided by the third pressure transmitter (C8.3) (for HPS) >={0.95×the value provided by the fourth pressure transmitter (C8.4)} (for MPS) IS FALSE, THEN continue to monitor WHETHER IF the value provided by the third pressure transmitter (C8.3) (for HPS) >={0.95×the value provided by the fourth pressure transmitter (C8.4)} (for MPS) IS TRUE (until value changes from FALSE to TRUE); and IF the value provided by the third pressure transmitter (C8.3) (for HPS) >={0.95×the value provided by the fourth pressure transmitter (C8.4)} (for MPS) IS TRUE, THEN continue to [operation 7.5.1.2].

[operation X6] includes the following operations:

SINCE the value provided by the third pressure transmitter (C8.3) (for HPS) >=the value provided by the fifth pressure transmitter (C8.5) (for LPS) IS FALSE, THEN (A) initiate Free flow of fuel gas from Storage 3 (LPS) to Storage 1 (HPS) (VC7) (for the case where the processor uses the control logic to calculate that the free flow rate is equal to or less than the compressor flow rate plus 10%, the processor may proceed to the next operation); and THEN (B) DETERMINE whether IF the value provided by the third pressure transmitter (C8.3) (for HPS) {0.95×the value provided by the fifth pressure transmitter (C8.5)} (for LPS) IS TRUE; and IF the value provided by the third pressure transmitter (C8.3) (for HPS) >={0.95×the value provided by the fifth pressure transmitter (C8.5)} (for LPS) IS FALSE, THEN continue to DETERMINE whether IF the value provided by the third pressure transmitter (C8.3) (for HPS) >={0.95×the value provided by the fifth pressure transmitter (C8.5)} (for LPS) IS TRUE (until value changes from FALSE to TRUE, in which case MPS is highest and HPS and LPS are equal); and IF the value provided by the third pressure transmitter (C8.3) (for HPS) >={0.95×the value provided by the fourth pressure transmitter (C8.4)} (for MPS) IS TRUE, THEN (A) initiate Free flow gas from MPS to HPS (VC8) (for the case where the processor uses the control logic to calculate that the free flow rate is equal to or less than the compressor flow rate plus 10%, the processor may proceed to the next operation); and THEN (B) DETERMINE WHETHER IF the value provided by the third pressure transmitter (C8.3) (for HPS) >={0.95×the value provided by the fifth pressure transmitter (C8.5)} (for LPS) IS TRUE; and IF the value provided by the third pressure transmitter (C8.3) (for HPS) >={0.95×the value provided by the fifth pressure transmitter (C8.5)} (for LPS) IS FALSE (in which case MPS is lowest and HPS and LPS are equal), THEN continue to monitor whether IF the value provided by the third pressure transmitter (C8.3) (for HPS) >={0.95×the value provided by the fifth pressure transmitter (C8.5)} (for LPS) IS TRUE (until value changes from FALSE to TRUE); and IF the value provided by the third pressure transmitter (C8.3) (for HPS) >={0.95×the value provided by the fifth pressure transmitter (C8.5)} (for LPS) IS TRUE (in which case HPS is highest, then MPS, then LPS), THEN (A) initiate Free flow fuel gas from Storage 3 (LPS) to Storage 2 (MPS) (VC9) (for the case where the processor uses the control logic to calculate that the free flow rate is equal to or less than the compressor flow rate plus 10%, the processor may proceed to the next operation); and THEN (B) DETERMINE whether IF the value provided by the fourth pressure transmitter (C8.4) (for MPS) <=0.95×the value provided by the fifth pressure transmitter (C8.5) (LPS) IS TRUE; and IF the value provided by the fourth pressure transmitter (C8.4) (for MPS) <=0.95×the value provided by the fifth pressure transmitter (C8.5) (LPS) IS FALSE (in which case HPS is highest and MPS and LPS are equal), THEN continue to monitor whether IF the value provided by the fourth pressure transmitter (C8.4) (for MPS) <=0.95×the value provided by the fifth pressure transmitter (C8.5) (LPS) IS TRUE (until state changes from FALSE to TRUE); and IF the value provided by the fourth pressure transmitter (C8.4) (for MPS) <=0.95×the value provided by the fifth pressure transmitter (C8.5) (for LPS) IS TRUE, THEN continue to [operation 7.5.1.2].

Referring to the embodiment as depicted in FIG. 10N, the following operations are depicted:

[operation 7.5.1.1.b] includes the following operations:

DETERMINE WHETHER the value provided by the third pressure transmitter (C8.3) (for HPS) >=the value provided by the fifth pressure transmitter (C8.5) (for LPS) IS TRUE (read or obtain the measured pressure value provided by the third pressure transmitter (C8.3), and the measured pressure value provided by the fifth pressure transmitter (C8.5), and compare the measured values with each other); and IF the value provided by the third pressure transmitter (C8.3) (for HPS) >=the value provided by the fifth pressure transmitter (C8.5) (for LPS) IS TRUE, THEN (HPS is highest, only need to check MPS and LPS) continue to [operation 7.5.1.1.c]; and IF the value provided by the third pressure transmitter (C8.3) (for HPS) >=the value provided by the fifth pressure transmitter (C8.5) (for LPS) IS FALSE (in which case LPS is highest and MPS is lowest—equalize HPS and LPS), THEN (LPS is highest and MPS is lowest—equalize HPS and LPS), THEN (A) initiate Free flow gas from LPS to HPS (VC7) (for the case where the processor uses the control logic to calculate that the free flow rate is equal to or less than the compressor flow rate plus 10%, the processor may proceed to the next operation); and THEN (B) DETERMINE whether IF the value provided by the third pressure transmitter (C8.3) (for HPS) <={0.95×the value provided by the fifth pressure transmitter (C8.5)} (for LPS) IS TRUE; and IF the value provided by the third pressure transmitter (C8.3) (for HPS) <={0.95×the value provided by the fifth pressure transmitter (C8.5)} (for LPS) IS FALSE, THEN continue to monitor whether IF the value provided by the third pressure transmitter (C8.3) (for HPS) <={0.95×the value provided by the fifth pressure transmitter (C8.5)} (for LPS) IS TRUE (until the state changes from FALSE to TRUE); and IF the value provided by the third pressure transmitter (C8.3) (for HPS) <={0.95×the value provided by the fifth pressure transmitter (C8.5)} (for LPS) IS TRUE, THEN (A) initiate Free flow gas from LPS to MPS (VC9) (for the case where the processor uses the control logic to calculate that the free flow rate is equal to or less than the compressor flow rate plus 10%, the processor may proceed to the next operation); and THEN (B) DETERMINE whether IF the value provided by the fourth pressure transmitter (C8.4) (for MPS) <={0.95×the value provided by the fifth pressure transmitter (C8.5) (for LPS)} IS TRUE; and IF the value provided by the fourth pressure transmitter (C8.4) (for MPS) <={0.95×the value provided by the fifth pressure transmitter (C8.5) (for LPS)} IS FALSE, THEN continue to monitor whether IF the value provided by the fourth pressure transmitter (C8.4) (for MPS) <={0.95×the value provided by the fifth pressure transmitter (C8.5) (for LPS)} IS TRUE (until state changes from FALSE to TRUE); and IF the value provided by the fourth pressure transmitter (C8.4) (for MPS) <={0.95×the value provided by the fifth pressure transmitter (C8.5) (LPS)} IS TRUE, THEN continue to [operation 7.5.1.2].

[operation 7.5.1.1.c] includes the following operations:
DETERMINE WHETHER IF the value provided by the fourth pressure transmitter (C8.4) (for MPS) >=the value provided by the fifth pressure transmitter (C8.5) (for LPS) IS TRUE (read or obtain the measured value provided by the value provided by the fourth pressure transmitter (C8.4), and the measured value provided by the value provided by the fifth pressure transmitter (C8.5), and compare the measured values to each other); and IF the value provided by the fourth pressure transmitter (C8.4) (for MPS) >=the value provided by the fifth pressure transmitter (C8.5) (for LPS) IS TRUE, THEN continue to [operation 7.5.1.2]; and IF the value provided by the fourth pressure transmitter (C8.4) (for MPS) >=the value provided by the fifth pressure transmitter (C8.5) (for LPS) IS FALSE, THEN (A) initiate Free flow gas from LPS to MPS (VC9) (for the case where the processor uses the control logic to calculate that the free flow rate is equal to or less than the compressor flow rate plus 10%, the processor may proceed to the next operation); and THEN (B) DETERMINE whether IF the value provided by the fourth pressure transmitter (C8.4) (for MPS) <={0.95×the value provided by the fifth pressure transmitter (C8.5) (for LPS)} IS TRUE; and IF the value provided by the fourth pressure transmitter (C8.4) (for MPS) <={0.95×the value provided by the fifth pressure transmitter (C8.5) (for LPS)} IS TRUE, THEN continue to monitor whether IF the value provided by the fourth pressure transmitter (C8.4) (for MPS) <={0.95×the value provided by the fifth pressure transmitter (C8.5) (for LPS)} IS FALSE (until state changes from TRUE to FALSE); and IF the value provided by the fourth pressure transmitter (C8.4) (for MPS) <={0.95×the value provided by the fifth pressure transmitter (C8.5) (for LPS)} IS FALSE, THEN continue to [operation 7.5.1.2].

Referring to the embodiment as depicted in FIG. 10O, the following operations are depicted:

[operation 7.5.1.2] execute the Compressor Flow operations after the completion of [operation 7.5.1.1] Free Flow operation; once the free flow operations are completed, HPS is greater than or equal to MPS, and MPS is be greater than or equal to LPS.

[operation 7.5.1.2.a] includes the following operations:
DETERMINE WHETHER IF {the value provided by the third pressure transmitter (C8.3) (for HPS) {0.95× Pscmax}} AND {the value provided by the fifth pressure transmitter (C8.5) (for LPS) >={1.1×Psmin}} IS TRUE; and IF {the value provided by the third pressure transmitter (C8.3) (for HPS) {0.95×Pscmax}} AND {the value provided by the fifth pressure transmitter (C8.5) (for LPS) >={1.1×Psmin}} IS FALSE, THEN continue operation at [operation 7.5.1.2b]; and IF {the value provided by the third pressure transmitter (C8.3) (for HPS) {0.95×Pscmax}} AND {the value provided by the fifth pressure transmitter (C8.5) (for LPS) >={1.1×Psmin}} IS TRUE, THEN execute the following operations:
(A) initiate compressor flow from Storage 3 to Storage 1 (VC10); this process continues until storage is full, or until the compressor's low inlet set pressure is achieved (i.e., the vehicle is deemed empty of fuel); and at this point, fuel flow may switch to the next bank of fuel storage; and THEN run (operate) the compressor assembly (D1), which is depicted, for instance, in FIG. 1; and (B) DETERMINE whether IF {the value provided by the third pressure transmitter (C8.3) (for HPS) >={0.95× Pscmax}} OR {the value provided by the fifth pressure transmitter (C8.5) (for LPS) >={1.05×Psmin}} IS TRUE; and (C) IF {the value provided by the third pressure transmitter (C8.3) (for HPS) >={0.95×Pscmax}} AND (the value provided by the fifth pressure transmitter (C8.5) (for LPS) >={1.05×Psmin}} IS FALSE, THEN continue to [operation 7.5.1.2.a]; and (D) IF {the value provided by the third pressure transmitter (C8.3) (for HPS) >={0.95×Pscmax}} AND {the value provided by the fifth pressure transmitter (C8.5) (for LPS) >={1.05×Psmin}} IS TRUE, THEN continue to [operation 7.5.1.2.b].

[operation 7.5.1.2.b] includes the following operations:
DETERMINE WHETHER IF {the value provided by the third pressure transmitter (C8.3) (for HPS) <=Pscmax} AND {the value provided by the fourth pressure transmitter (C8.4) (for MPS) >={1.05×Psmin}} IS TRUE; and IF {the value provided by the third pressure transmitter (C8.3) (for HPS) <=Pscmax} AND {the value provided by the fourth pressure transmitter (C8.4) (for MPS) >=1.05×Psmin} IS FALSE, THEN continue to [operation 7.5.1.2.c]; and IF {the value provided by the third pressure transmitter (C8.3) (for HPS) <=Pscmax} AND {the value provided by the fourth pressure transmitter (C8.4).4 (MPS) >=1.05×Psmin} IS TRUE, THEN execute the following operations:

(A) initiate compressor flow from Storage 2 to Storage 1 (VC11) and operate the compressor; this process continues until storage is full, or until the compressor's low inlet set pressure is achieved (i.e.; the vehicle is deemed empty of fuel); and at this point, fuel flow may switch to the next bank of fuel storage; and (B) DETERMINE whether IF {the value provided by the third pressure transmitter (C8) <=0.95×Pscmax} OR {the value provided by the fourth pressure transmitter (C8) <={1.05×Psmin}} IS TRUE;

(C) IF {the value provided by the third pressure transmitter (C8) <=0.95×Pscmax} OR {the value provided by the fourth pressure transmitter (C8) <={1.05× Psmin}} IS FALSE, THEN continue to [operation 7.5.2.1b]; and (D) IF {the value provided by the third pressure transmitter (C8) <=0.95×Pscmax} OR {the value provided by the fourth pressure transmitter (C8) <={1.05× Psmin}} IS TRUE, THEN continue to [operation 7.5.1.2.c].

[operation 7.5.1.2.c] includes the following operations:
DETERMINE WHETHER IF {the value provided by the fourth pressure transmitter (C8.4) (for MPS) <=0.95× Pscmax} AND {the value provided by the fifth pressure transmitter (C8.5) (for LPS) >{1.05×Psmin}} IS TRUE; and IF {the value provided by the fourth pressure transmitter (C8.4) (for MPS) <=0.95×Pscmax} AND {the value provided by the fifth pressure transmitter (C8.5) (for LPS) >{1.05×Psmin}} IS FALSE, THEN terminate the storage optimization operation (shut down the compressor);

IF {the value provided by the fourth pressure transmitter (C8.4) (for MPS) <=0.95×Pscmax} AND {the value provided by the fifth pressure transmitter (C8.5) (for LPS) >{1.05×Psmin}} IS TRUE, THEN execute the following operations:

(A) initiate compressor flow from Storage 3 to Storage 2 (VC12) (operate the compressor); this process continues until storage is full, or until the compressor's low inlet set pressure is achieved (i.e.; the vehicle is deemed empty of fuel); and at this point, fuel flow may switch to the next bank of fuel storage; and (B) DETERMINE whether IF {the value provided by the fourth pressure transmitter (C8.4) (for MPS) >=0.95× Pscmax} OR {the value provided by the fifth pressure transmitter (C8.5) (for LPS) <={1.05×Psmin}} IS TRUE; and (C) IF {the value provided by the fourth pressure transmitter (C8.4) (for MPS) >=0.95×Pscmax} OR {the value provided by the fifth pressure transmitter (C8.5) (for LPS) <={1.05×Psmin}} IS FALSE, THEN continue to [operation 7.5.1.2.c]; and (D) IF {the value provided by the fourth pressure transmitter (C8.4) (MPS) >=0.95×Pscmax} AND {the value provided by the fifth pressure transmitter (C8.5) (for LPS) <={1.05×Psmin} } IS TRUE, THEN terminate storage optimization operation (shut down the compressor).

[Operation 7.6] Defuel/Refuel Volume Estimation & Use of VPNS

The volume estimation uses Ideal Gas Law (PV=nRT) to calculate the volume of gas at the beginning and the end of the process. More specifically, we can use the initial pressure and temperature conditions to calculate the volume at the beginning of the process, and the final pressure and temperature conditions to calculate the residual volume. The difference between the two volumes is the amount of gas that was transferred from one tank to the other. The system may employ a tracking system configured to track the amount of gas removed from, or delivered to, a vehicle using the VPN. The value of the amount of fuel removed from a vehicle may be calculated using standard P-V relationships.

This value may be retained in system memory until either any one of: (A) the vehicle is refuelled, at which time the system may use the stored data to fill the vehicle with the same amount of fuel that was removed; or (B) following the refuelling of a previously defueled vehicle the VPN, and all associate data, may be removed from active memory; or (C) it is determined that the vehicle may not be refuelled. This amount is now considered excess and may be used to fill other vehicles. The optimal method for accomplishing this may depend on the specific operation and may be custom designed.

The system may be programmed so that a vehicle that is being refuelled may stop refilling when either: (A) the temperature compensated fill pressure is reached, or (B) the amount of gas that had been previously defueled from the vehicle has been delivered back to the vehicle. In order to accomplish this, the system may calculate a target pressure based on the initial system pressure and temperature at the time of refuelling plus the quantity of gas that was calculated to have been removed at the time of defuelling. Standard PV relationships are used in performing these calculations.

[Operation 7.7] Storage Quantity Balance

There is no flow chart for this process. The volume estimation simply uses Ideal Gas Law (PV=nRT) to calculate the volume of gas at the beginning and the end of the process. More specifically, we can use the initial pressure and temperature conditions to calculate the volume at the beginning of the process, and the final pressure and temperature conditions to calculate the residual volume. The difference between the two volumes is the amount of gas that was transferred from one tank to the other. A storage balance function may be required to: (A) ensure that the system has enough gas to refill all vehicles that have been previously defuelled; and (B) ensure that the system does not build up an excess of gas that necessitates the occasional vent to atmosphere in order to defuel additional vehicles. Ideally, the system may balance the gas it received from defuelled vehicles. The storage balance operation or subroutine (computer-executable instructions) may calculate the amount of gas in the system and compare this to the total of all Vvpnd in memory. If there is a discrepancy of greater than 10%, then the Vvpnd may be adjusted.

[Operation 8.0] Emergency and Process Stops and Sensors

[Section 8.1] Definitions of Shutdowns and Alarms

[Section 8.1.1] Shutdowns

Local Shutdown refers to a shutdown that is local to a single piece of equipment or a group of equipment within a defined boundary. This occurs when: (A) a local e-stop has been pressed; (B) a safety instrument on a piece of equipment triggers: for example, shuts off a compressor but allows other compressors to run, (C) a process instrument on a piece of equipment triggers; for example, shuts off the flow of gas to one piece of equipment but allows the flow of gas to the balance of plant, and/or (D) local shutdowns initiated by: a) gas sensors; b) rate of rise heat sensors; c) smoke sensors; require continuous monitoring subsequent to the initial alarm event to confirm that the local shutdown event has been successful and the conditions that triggered the local shutdown have been controlled. Gas sensors may register <40% LEL within a predetermined time duration; the rate of rise heat sensor may (should) be automatically reset with a predetermined time duration; smoke sensors may (should) automatically reset within a predetermined time duration; otherwise, the local shutdown shall automatically escalate to the global shutdown event.

Global Shutdown refers to a Shutdown of all systems throughout the facility except for UPS and Back-up Power. This occurs when: (A) a global e-stop has been pressed; (B) an instrumented system has reached its failsafe setting (e.g., flame scanner has been tripped). Preferably, when this occurs all remotely controlled valves (solenoid and gas controllable valves) at this facility may fail safe in a closed position.

[Section 8.1.2] Alarms

Normal Alarm includes (A) solid Green light (indicating all systems normal and on standby); (B) pulsating green light (indicating all systems are operating inside their normal operational bands).

Pause Alarm may include (A) pulsating Amber (indicating that the Operator has interrupted the process to make a process adjustment, for example, adding a second vehicle for defuelling/refuelling).

Warning Alarm may include (A) alternating amber and green light (indicating that an operating parameter is outside of its normal operational band (e.g. gas sensor above 20% LFL but below 40% LFL). Depending on the nature of the event there may be no shutdown or limited to a local shutdown. (A) If a no shutdown event occurred the condition may automatically reset when the operational parameter returns to a normal condition; (B) If a local shutdown event occurred the cause of the condition may (should) be cleared and affected equipment may (should) be manually reset, or locked out/tagged out. This may return the status beacon to green and (A) initiates a Warning alarm communications protocol, and (B) the event is recorded and logged. Danger Alarm may include flashing Red beacon and audible "chirping" alarm indicating that a global shutdown has occurred); the condition may (should) be acknowledged locally. This changes the beacon to flashing amber and shuts off the audible alarm. The cause of the condition may (should) be cleared and the affected equipment may (should) be manually reset. This may return the status beacon to green. Initiates a Danger alarm communication protocol. The event is recorded and logged.

Repair Alarm may include flashing blue light (indicates that an instrument is at its threshold detection value and equipment inspection is recommended, or an instrument has failed). No systems are shutdown. The condition may (should) be acknowledged locally. This changes the beacon to flashing amber. The cause of the condition may (should) be cleared and the affected equipment may (should) be manually reset. This may return the status beacon to green. Initiates a Repair alarm communication protocol. The event may be recorded and logged.

Acknowledge Alarm may include a solid amber light (indicating that an alarm situation has been acknowledged). The event is recorded and logged.

Fire alarm may include a flashing white strobe and audible "klaxon" alarm. Initiates a global shutdown. Initiates a fire alarm communication protocol. The cause of the condition may be cleared and the affected equipment may (should) be manually reset. Record and log the event

[Section 8.2] Alarm and Shutdown Devices

[Section 8.2.1] Requirements for Safety Shutdown Devices

The overall safety system has not been subject to a formal safety integrity level (SIL) analysis. The system relies on our standard offering for relay devices, based on their track record of safety and reliability. In addition, all devices shall be rated for the appropriate electrical classification area in which they are to be located.

[Section 8.2.2] Manual Controls

[Section 8.2.2.1] E-Stop Buttons

The emergency stop (E-Stop) buttons are positioned or located at the Station initiate a global Shutdown. This is a hardwired safety circuit. Shuts down all gas systems when actuated. All controllable valves return to their de-energized position. Normally Open valves may open, and Normally Closed valves may close. Shuts down all electrical systems except safety circuit (safety circuit may include PLCs, and UPSs): initiates Danger alarm. The following E-Stops may be included at the Station: Defuel Post, Refuel Post, PCC Panel, and/or compressor.

[Section 8.2.2.2] Fire Pull Stations (Optional)

Fire pull Stations are located on the PCC Panel. If activated then (A) initiate Fire Alarm; (B) initiate Danger Alarm.

[Section 8.2.2.3] Remote E-Stop (Optional)

A remote service provider may be available to monitor the station "24/7" and has the ability to remotely initiate a station shutdown.

[Section 8.2.3] Automated Safety Controls: Heat Sensor/Smoke Sensor/Gas Sensor/Flame Sensor (Optional)

These units shall be provided with an override so that they may not shut down the system until they have been properly set up. Optional flame sensors may be pole mounted providing full coverage of the CFR. The following control logic (controller operations) may be utilized:

IF activated THEN (A) place a warning on the HMI; (B) verify the event by voting logic (i.e., at least two sensors may (should) activate), (C) IF the fire is real, THEN activate a fire alarm, and (D) IF the fire is false, THEN acknowledge heat and smoke are located in the PCCP and Compressor; and IF activated THEN: (A) the heat sensor uses "rate of rise" logic and initiates a local shutdown and warning alarm; or (B) the smoke sensor initiates a local shutdown and warning alarm; and Gas sensors are located in all equipment enclosures where gas could become trapped; and IF sensor reading is between 20% of LFL AND 40% of LFL, THEN (A) initiate a warning alarm; and IF sensor reading drops below 20% of LFL, THEN cancel warning alarm;

IF sensor reading is >40% of LFL, THEN (A) Initiate a global shutdown, and (B) initiate a danger alarm.

[Section 8.2.4] Automated Process Controls

[Section 8.2.4.1] Equipment Temperature Sensor

Equipment temperature sensors located in vendor supplied equipment generally has two settings and operate as follows:

If Sensor reading is ≥T High then Initiate a Warning alarm

If Sensor reading drops below T High then Cancel Warning alarm

If Sensor reading is ≥T High High then (A) Initiate a local shutdown, and (B) Initiate a Warning alarm Temperature sensors may also provide T Low and T LowLow control logic.

[Section 8.2.4.2] Equipment Pressure Sensor

Equipment pressure sensors located in vendor supplied equipment generally have 2 settings and operate as follows: (A) IF Sensor reading is >P High then Initiate a Warning alarm; and/or (B)

IF Sensor reading drops below P High then cancel Warning alarm; and/or (C) IF Sensor reading is ≥P High High then (A) initiate a local shutdown, and (B) initiate a Warning alarm. Pressure sensors may also provide P Low and P Low control logic.

[Section 8.2.4.3] Equipment Vibration

Equipment vibration sensors located in vendor supplied equipment generally are switch devices. If excess vibration is sensed, shut down compressor: (A) Initiate local shutdown; and/or (B) Initiate a Warning alarm.

[Section 8.2.4.4] Fuel Dispensing Pressure

If at any time after the start of a refuelling vehicle event, the first pressure transmitter (C8.1) experiences a pressure drop ≥about 500 psi (a predetermined limit), a global shutdown may be triggered.

If at any time after the start of a defuelling vehicle event, the third pressure transmitter (C8.3), the fourth pressure transmitter (C8.4), or the fifth pressure transmitter (C8.5) experiences a pressure drop ≥about 500 psi (a predetermined limit), a global shutdown may be triggered.

In addition to the Pressure Transmitter controls, the compressor packages are equipped with numerous instruments that may cause them to fail safe if an instrument reads conditions outside its normal set point/operating band.

If at any time following the establishment of flow from the compressors (i.e.; 30-60 seconds after compressor start-up) there may be an increase of >about 500 psi per 20 seconds (a predetermined rate) at a refuelling hose then trigger a global shutdown at the compressor(s); It is likely that the flow of gas has become obstructed.

[Section 8.3] Fail Safe Position of Valves

All remotely controlled valves (solenoid and gas controllable valves) at this facility may fail safe in the closed position. A global shutdown event may cause all controllable valves on all vendor supplied equipment to close. A local shutdown event may cause the controllable valves on the locally affected equipment to close.

[Section 9.0] Communications and Interfaces

[Section 9.1] Alarm Communications

Normal Alarm: (A) Local display: a solid or pulsating green light at the Status Beacon, and/or (B) Optional remote display: Green banner, operating status printed on HMI screen Pause Alarm: (A) Local display: a pulsating amber light at the Status Beacon, and/or (B) Optional remote display: Amber banner, operating status printed on HMI screen.

Warning alarm: (A) Local display: Alternating Amber and Green at Status Beacon, (B) Optional remote display: Yellow banner with nature of alarm printed on the HMIs, (C) Optional external notification depends on installation requirements, (D) Acknowledge: Switches beacon to solid Amber Reset alarm: (A) If no local shutdown, automatic when fault clears, restores green status, and/or (B) If local shutdown occurred, manual reset at HMI when fault may be cleared, restores green status, etc.

Danger alarm: (A) Local display: Flashing red and horn at Status Beacon, (B) Optional remote display: Red banner with nature of alarm printed on the HMIs, (C) Optional external notification depends on installation requirements, (D) acknowledge: Switches beacon to solid Amber and stops horn, (E) Reset: Manually from an HMI at the station. When the fault may be cleared, restores green status, etc.

Repair alarm: (A) Local display: Flashing blue light at Status Beacon, (B) Optional remote display: Blue banner with nature of faulty instrument displayed on HMI's Acknowledge alarm (A) Local display: Solid amber light at Status Beacon, and/or (B) Optional remote display: Amber banner with acknowledge displayed on HMI's, A Status Annunciation summary may be provided in FIG. 10Q (the Status Annunciation Matrix).

[Section 9.2] Fire Alarm System (Optional)

A Fire Alarm System can be provided for the CFR. The system includes the following items (and may depend on installation requirements):

Initiating devices include (A) Manual Pull Stations (located at the PCCP), (B) Heat Sensors (located at the PCCP and/or the compressor), (C) Smoke Sensors (located at the PCCP and/or the compressor), and/or (D) Flame Scanners (located at the CFR). Preferably, the feature of these initiating devices may be disabled until commissioning may be complete and the equipment may be deemed to be operating reliably. Preferably, these initiating devices are all either hazardous rated or are located in non-hazardous locations.

Local Signaling Devices: Strobe/Horn Units: There may be one in total, located at the PCCP. A fire alarm can only be acknowledged at the Master Control panel in the PCCP. These signaling devices may be located in non-hazardous locations. Interlocking the CNG Station Fire Alarm System with Customer Fire Alarm System may be provided as follows:

The CNG Fire Alarm System may be interlocked with the PLC System as follows: (A) CNG Fire Alarm System Signals to Master PLC: (a) Fire alarm activated: This signal may be used to shut down the process. It may be activated by any of the initiating devices listed above, and/or (b) fire Alarm System Trouble: This signal may be used to display the status of the Fire Alarm System at the Station HMI remote, (B) Master PLC Signal to Customer Fire Alarm Panel: The systems are completely independent, (C) CNG Fire Alarm System Signals to PLC Remote I/O: When a Fire Alarm may be activated, individual E-Stop signals are sent by the Master PLC to each of the following pieces of equipment, (D) Compressors, and/or (E) Gas Control Panel. Remote Alarm Annunciation: the Master PLC may automatically dial out to a 3rd party service contractor for the following alarm conditions (such as, Fire Detected and/or System Trouble).

[Section 9.3] Security System

A security system may be installed.

[Section 9.4] Communications (Optional)

The CFR communication panel utilizes internet technology. A cellular phone may be installed in the PCCM to provide connectivity between the com panel and the internet. Alarm signals may be communicated to: (A) the user, (B) a third party service contractor, (C) a service support centre, and/or (D) a Fire Department (for fire events). Operating data may be communicated periodically to the service support center.

[Section 9.5] HMI and Controls

[Section 9.5.1] General Information

HMIs may display: (A) a high level P & ID, (B) the position (open/closed) of controllable valves, (B) pressures throughout system (when available), (C) temperatures throughout system (when available), (D) the status of each fill zone, (E) the compressor status, (F) the dryer status (including dew point), (G) alarm conditions (Warning/Danger/Repair and/or point of origin), and/or (H) trending of data recorded (such as, every minute).

[Section 9.5.2] Locations

In PCCP: (A) HMI shows the station status and alarm conditions, (B) able to change Station set points (password protected), (C) ESD function. Remote reset and restart may be provided if so required.

[Section 9.5.3] Acknowledge Button and Reset Function

An acknowledge button may be located at the PCCP. The acknowledge button may be located on the PCCP HMI. For the case where the button may be activated, the Acknowledge Button causes the status of the alarm beacon to change to flashing amber light and/or horn off condition. The Acknowledge Button may have no further effect until the triggering local or global system fault (or E-Stop button) has been cleared. A reset button may be located on the PCCM HMI. Reset is not possible until all faults are cleared.

[Section 10.0] Lightning Protection

Lightning protection may be installed.

[Section 11.0] Operating Logic Actuator Truth Table

FIG. 10P depicts a schematic view of an embodiment of the operating logic of an actuator truth table utilized by a controller assembly of the apparatus 1100 of FIG. 1. Referring to the embodiment as depicted in FIG. 10P, there is depicted the operating logic actuator truth table. GEM CCC: NOTE TO INVENTORS: Please add in any description here for FIG. 10P.

[Section 12.0] Status Annunciation Matrix

FIG. 10Q and FIG. 10R depict schematic views of embodiments of a status annunciation matrix utilized by a controller assembly of the apparatus 1100 of FIG. 1. Referring to the embodiments as depicted in FIG. 10Q and FIG. 10R, embodiments of the status annunciation matrix is depicted.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as they do not materially change the operability of the invention. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the invention. The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
a fluid-distribution assembly having controllable components; and
the fluid-distribution assembly also having a vehicle-fuelling connection configured to be selectively connectable to a first compressed-natural-gas tank of a first compressed-natural-gas-powered vehicle; and
the fluid-distribution assembly also having a fuel-storage connection configured to be selectively connectable to a fuel storage assembly; and
the fluid-distribution assembly configured to be electrically connected to a controller assembly, in which the controller assembly is configured to monitor and control operations of the controllable components of the fluid-distribution assembly; and
the controllable components of the fluid-distribution assembly configured to selectively distribute, under control by way of the controller assembly, a fluid flow of a compressed natural gas between the first compressed-natural-gas tank and the fuel storage assembly;
the fluid-distribution assembly configured to receive a flow of fluid fuel from the first compressed-natural-gas tank of the first compressed-natural-gas-powered vehicle and depending on execution of the preprogrammed operations of the controller assembly, convey the flow of fluid fuel from the first compressed-natural-gas tank of the first compressed-natural-gas-powered vehicle to a second compressed-natural-gas tank of a second compressed-natural-gas-powered vehicle.

2. The apparatus of claim 1, wherein:
the fluid-distribution assembly is configured to receive a flow of fluid fuel from a compressor assembly which is selectively fluidly connected to the fluid-distribution assembly and, depending on execution of preprogrammed operations of the controller assembly for the control of the controllable components of the fluid-distribution assembly, convey the flow of fluid fuel from the compressor assembly to:
the first compressed-natural-gas tank of the first compressed-natural-gas-powered vehicle; or
the second compressed-natural-gas tank of the second compressed-natural-gas-powered vehicle; or
the fuel storage assembly.

3. The apparatus of claim 1, wherein:
the fluid-distribution assembly is configured to receive a flow of fluid fuel from the fuel storage assembly and, depending on execution of preprogrammed operations of the controller assembly for the control of the controllable components of the fluid-distribution assembly, convey the flow of fluid fuel from the storage assembly to:
the first compressed-natural-gas tank of the first compressed-natural-gas-powered vehicle; or
the second compressed-natural-gas tank of the second compressed-natural-gas-powered vehicle; or
a compressor assembly which is selectively fluidly connected to the fluid-distribution assembly.

4. The apparatus of claim 1, wherein:
the fluid-distribution assembly is configured to receive a flow of fluid fuel from a gas-source connection and, depending on execution of preprogrammed operations of the controller assembly for the control of the controllable components of the fluid-distribution assembly, convey the flow of fluid fuel from the gas-source connection to a compressor assembly which is selectively fluidly connected to the fluid-distribution assembly and then to:
the fuel storage assembly; or
the first compressed-natural-gas tank of the first compressed-natural-gas-powered vehicle; or the second compressed-natural-gas tank of the second compressed-natural-gas-powered vehicle.

5. An apparatus comprising:
a fluid-distribution assembly having controllable components; and
the fluid-distribution assembly also having a vehicle-fuelling connection configured to be selectively connectable to a first compressed-natural-gas tank of a first compressed-natural-gas-powered vehicle; and
the fluid-distribution assembly also having a fuel-storage connection configured to be selectively connectable to a fuel storage assembly; and
the fluid-distribution assembly configured to be electrically connected to a controller assembly, in which the controller assembly is configured to monitor and control operations of the controllable components of the fluid-distribution assembly; and
the controllable components of the fluid-distribution assembly configured to selectively distribute, under control by way of the controller assembly, a fluid flow of a compressed natural gas between the first compressed-natural-gas tank and the fuel storage assembly;
the fluid-distribution assembly is configured to receive a flow of fluid fuel from the second compressed-natural-gas tank of a second compressed-natural-gas-powered vehicle and, depending on execution of preprogrammed operations of the controller assembly for the control of the controllable components of the fluid-distribution assembly, convey the flow of fluid fuel from the second compressed-natural-gas tank of a second compressed-natural-gas-powered vehicle to the first compressed-natural-gas tank of the first compressed-natural-gas-powered vehicle.

6. An apparatus, comprising:
a controller assembly configured to be electrically connected to controllable components of a fluid-distribution assembly; and
the controller assembly also configured to monitor and control operations of the controllable components of the fluid-distribution assembly, in which:
the fluid-distribution assembly also has a vehicle-fuelling connection configured to be selectively connectable to a first compressed-natural-gas tank of a first compressed-natural-gas-powered vehicle; and
the fluid-distribution assembly also has a fuel-storage connection configured to be selectively connectable to a fuel storage assembly; and
the controllable components of the fluid-distribution assembly configured to selectively distribute, under control by way of the controller assembly, a fluid flow of a compressed natural gas between the first compressed-natural-gas tank and the fuel storage assembly; and
the fluid-distribution assembly configured to receive a flow of fluid fuel from the first compressed-natural-gas tank of the first compressed-natural-gas-powered vehicle and, depending on execution of preprogrammed operations of the controller assembly for the control of the controllable components of the fluid-distribution assembly, convey the flow of fluid from the first compressed-natural-gas tank of the first compressed-natural-gas-powered vehicle to a second compressed-natural-gas tank of a second compressed-natural-gas-powered vehicle.

7. The apparatus of claim 6, wherein:
the fluid-distribution assembly is configured to receive a flow of fluid fuel from a compressor assembly which is selectively fluidly connected to the fluid-distribution assembly and, depending on execution of preprogrammed operations of the controller assembly for the control of the controllable components of the fluid-distribution assembly, convey the flow of fluid fuel from the compressor assembly to:
the first compressed-natural-gas tank of the first compressed-natural-gas-powered vehicle; or
the second compressed-natural-gas tank of the second compressed-natural-gas-powered vehicle; or
the fuel storage assembly.

8. The apparatus of claim 6, wherein:
the fluid-distribution assembly is configured to receive a flow of fluid fuel from the fuel storage assembly and, depending on execution of preprogrammed operations of the controller assembly for the control of the controllable components of the fluid-distribution assembly, convey the flow of fluid fuel from the fuel storage assembly to:
the first compressed-natural-gas tank of the first compressed-natural-gas-powered vehicle; or
the second compressed-natural-gas tank of the second compressed-natural-gas-powered vehicle; or
a compressor assembly which is selectively fluidly connected to the fluid-distribution assembly.

9. The apparatus of claim 6, wherein:
the fluid-distribution assembly is configured to receive a flow of fluid fuel from a gas-source connection and, depending on execution of preprogrammed operations of the controller assembly for the control of the controllable components of the fluid-distribution assembly, convey the flow of fluid fuel from the fuel storage assembly to a compressor assembly which is selectively fluidly connected to the fluid-distribution assembly and then to:
the fuel storage assembly; or
the first compressed-natural-gas tank of the first compressed-natural-gas-powered vehicle; or
the second compressed-natural-gas tank of the second compressed-natural-gas-powered vehicle.

10. The apparatus of claim 6, wherein:
the controller assembly includes:
a processor assembly; and
a memory assembly including a controller-executable program being executable by the processor assembly in such a way that the processor assembly is urged to perform monitoring and controlling operations on the controllable components of the fluid-distribution assembly.

11. An apparatus, comprising:
a controller assembly configured to be electrically connected to controllable components of a fluid-distribution assembly; and
the controller assembly also configured to monitor and control operations of the controllable components of the fluid-distribution assembly, in which:
the fluid-distribution assembly also has a vehicle-fuelling connection configured to be selectively connectable to a first compressed-natural-gas tank of a first compressed-natural-gas-powered vehicle; and
the fluid-distribution assembly also has a fuel-storage connection configured to be selectively connectable to a fuel storage assembly; and
the controllable components of the fluid-distribution assembly configured to selectively distribute, under control by way of the controller assembly, a fluid flow of a compressed natural gas between the first compressed-natural-gas tank and the fuel storage assembly; and the fluid-distribution assembly configured to receive a flow of fluid fuel from a second compressed-natural-gas tank of a second compressed-natural-gas-powered vehicle; and, depending on execution of preprogrammed operations of the controller assembly for the control of the controllable components of the fluid-distribution assembly, convey the flow of fluid fuel from a second compressed-natural-gas tank of a second compressed-natural-gas-powered vehicle to the first compressed-natural-gas tank of the first compressed-natural-gas-powered vehicle.

12. An apparatus, comprising:

a compressed-natural-gas vehicle repair facility defining an interior space therein, in which the interior space is configured to receive a first compressed-natural-gas-powered vehicle; and a fuel storage assembly positioned exteriorly of the compressed-natural-gas vehicle repair facility; and a fluid-distribution assembly positioned in the interior space of the compressed-natural-gas vehicle repair facility; and a controller assembly positioned in the interior space of the compressed-natural-gas vehicle repair facility; and the fluid-distribution assembly having controllable components; and the controller assembly configured to be electrically connected to the controllable components of the fluid-distribution assembly; and the fluid-distribution assembly also having a vehicle-fuelling connection configured to be selectively connectable to a first compressed-natural-gas tank of the first compressed-natural-gas-powered vehicle; and the fluid-distribution assembly also having a fuel-storage connection configured to be selectively connectable to the fuel storage assembly; and the fluid-distribution assembly configured to be electrically connected to the controller assembly, in which the controller assembly is configured to monitor and control operations of the controllable components of the fluid-distribution assembly; and the controllable components of the fluid-distribution assembly configured to selectively distribute, under control by way of the controller assembly, a fluid flow of a compressed natural gas between the first compressed-natural-gas tank and the fuel storage assembly; and the fluid-distribution assembly configured to receive a flow of fluid fuel from the first compressed-natural-gas tank of the first compressed-natural-gas-powered vehicle, and depending on execution of preprogrammed operations of the controller assembly for the control of the controllable components of the fluid-distribution assembly, convey the flow of fluid fuel from the first compressed-natural-gas tank of the first compressed-natural-gas-powered vehicle to a second compressed-natural-gas tank of a second compressed-natural-gas-powered vehicle.

13. The apparatus of claim 12, wherein:

the fluid-distribution assembly is configured to receive a flow of fluid fuel from a compressor assembly which is selectively fluidly connected to the fluid-distribution assembly and, depending on execution of preprogrammed operations of the controller assembly for the control of the controllable components of the fluid-distribution assembly, convey the flow of fluid fuel from the compressor assembly to:

the first compressed-natural-gas tank of the first compressed-natural-gas-powered vehicle; or the second compressed-natural-gas tank of the second compressed-natural-gas-powered vehicle; or the fuel storage assembly.

14. The apparatus of claim 12, wherein:

the fluid-distribution assembly is configured to receive a flow of fluid fuel from the fuel storage assembly and, depending on execution of preprogrammed operations of the controller assembly for the control of the controllable components of the fluid-distribution assembly, convey the flow of fluid fuel from the fuel storage assembly to:

the first compressed-natural-gas tank of the first compressed-natural-gas-powered vehicle; or the second compressed-natural-gas tank of the second compressed-natural-gas-powered vehicle; or a compressor assembly which is selectively fluidly connected to the fluid-distribution assembly.

15. The apparatus of claim 12, wherein:

the fluid-distribution assembly is configured to receive a flow of fluid fuel from a gas-source connection and, depending on execution of preprogrammed operations of the controller assembly for the control of the controllable components of the fluid-distribution assembly, convey the flow of fluid fuel from the gas-source connection to a compressor assembly which is selectively fluidly connected to the fluid-distribution assembly, and then to:

the fuel storage assembly; or the first compressed-natural-gas tank of the first compressed-natural-gas-powered vehicle; or the second compressed-natural-gas tank of the second compressed-natural-gas-powered vehicle.

16. An apparatus, comprising:

a compressed-natural-gas vehicle repair facility defining an interior space therein, in which the interior space is configured to receive a first compressed-natural-gas-powered vehicle; and a fuel storage assembly positioned exteriorly of the compressed-natural-gas vehicle repair facility; and a fluid-distribution assembly positioned in the interior space of the compressed-natural-gas vehicle repair facility; and a controller assembly positioned in the interior space of the compressed-natural-gas vehicle repair facility; and the fluid-distribution assembly having controllable components; and the controller assembly configured to be electrically connected to the controllable components of the fluid-distribution assembly; and the fluid-distribution assembly also having a vehicle-fuelling connection configured to be selectively connectable to a first compressed-natural-gas tank of the first compressed-natural-gas-powered vehicle; and the fluid-distribution assembly also having a fuel-storage connection configured to be selectively connectable to the fuel storage assembly; and the fluid-distribution assembly configured to be electrically connected to the controller assembly, in which the controller assembly is configured to monitor and control operations of the controllable components of the fluid-distribution assembly; and the controllable components of the fluid-distribution assembly configured to selectively distribute, under control by way of the controller assembly, a fluid flow of a compressed natural gas between the first compressed-natural-gas tank and the fuel storage assembly; and the fluid-distribution assembly is configured to receive a flow of fluid fuel from a second compressed-natural-gas tank of a second compressed-natural-gas-powered vehicle and, depending on execution of preprogrammed operations of the controller assembly for the control of the controllable components of the fluid-distribution assembly, convey the flow of fluid fuel from a second compressed-natural-gas tank of a second compressed-natural-gas-powered vehicle to the first compressed-natural-gas tank of the first compressed-natural-gas-powered vehicle.

17. A memory assembly, comprising:

a controller-executable program that, when executed by a processor assembly of a controller assembly, causes the processor assembly to perform monitoring and controlling operations of controllable components of a fluid-distribution assembly, in which:
  the controller assembly is configured to be electrically connected to the controllable components of the fluid-distribution assembly; and
  the fluid-distribution assembly has a vehicle-fuelling connection configured to be selectively connectable to a first compressed-natural-gas tank of a first compressed-natural-gas-powered vehicle; and
  the fluid-distribution assembly also has a fuel-storage connection configured to be selectively connectable to a fuel storage assembly; and
  the controllable components of the fluid-distribution assembly configured to selectively distribute, under control by way of the controller assembly, a fluid flow of a compressed natural gas between the first compressed-natural-gas tank and the fuel storage assembly; and
wherein:
  the fluid-distribution assembly is configured to receive a flow of fluid fuel from the first compressed-natural-gas tank of the first compressed-natural-gas-powered vehicle and, depending on execution of preprogrammed operations of the controller assembly, convey the flow of fluid fuel from the first compressed-natural-gas tank of the first compressed-natural-gas-powered vehicle to a second compressed-natural-gas tank of a second compressed-natural-gas-powered vehicle wherein:
  the fluid-distribution assembly is configured to receive the flow of fluid fuel from the second compressed-natural-gas tank of the second compressed-natural-gas-powered vehicle and, depending on execution of preprogrammed operations of the controller assembly, convey the flow of fluid fuel from the second compressed-natural-gas tank of the second compressed-natural-gas-powered vehicle to the first compressed-natural-gas tank of the first compressed-natural-gas-powered vehicle
wherein:
  the fluid-distribution assembly is configured to receive the flow of fluid fuel from the compressor assembly and depending on execution of preprogrammed operations of the controller assembly, convey the flow of fluid fuel from the compressor assembly to:
    the first compressed-natural-gas tank of the first compressed-natural-gas-powered vehicle; or
    the second compressed-natural-gas tank of the second compressed-natural-gas-powered vehicle; or
    the fuel storage assembly; and
wherein:
  the fluid-distribution assembly is configured to receive the flow of fluid fuel from the fuel storage assembly and, depending on execution of preprogrammed operations of the controller assembly, convey the flow of fluid fuel from the fuel storage assembly to:
    the first compressed-natural-gas tank of the first compressed-natural-gas-powered vehicle; or
    the second compressed-natural-gas tank of the second compressed-natural-gas-powered vehicle; or
    the compressor assembly; and
wherein:
  the fluid-distribution assembly is configured to receive the flow of fluid fuel from a gas-source connection and, depending on execution of preprogrammed operations of the controller assembly, convey the flow of fluid fuel from the gas-source connection to the compressor assembly, and then to:
    the fuel storage assembly; or
    the first compressed-natural-gas tank of the first compressed-natural-gas-powered vehicle; or
    the second compressed-natural-gas tank of the second compressed-natural-gas-powered vehicle.

* * * * *